United States Patent
Chen et al.

(10) Patent No.: US 10,929,762 B1
(45) Date of Patent: Feb. 23, 2021

(54) DISTRIBUTABLE EVENT PREDICTION AND MACHINE LEARNING RECOGNITION SYSTEM

(71) Applicant: SAS Institute Inc., Cary, NC (US)

(72) Inventors: Xu Chen, Cary, NC (US); Brett Alan Wujek, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/940,501

(22) Filed: Jul. 28, 2020

Related U.S. Application Data

(63) Continuation-in-part of application No. 16/904,818, filed on Jun. 18, 2020, and a continuation-in-part of application No. 16/816,382, filed on Mar. 12, 2020.

(60) Provisional application No. 63/023,022, filed on May 11, 2020, provisional application No. 62/991,973, filed on Mar. 19, 2020, provisional application No. 62/990,399, filed on Mar. 16, 2020, provisional application No. 62/914,790, filed on Oct. 14, 2019.

(51) Int. Cl.
  *G06N 5/04* (2006.01)
  *G06N 20/00* (2019.01)
  *G06N 5/00* (2006.01)

(52) U.S. Cl.
  CPC .............. *G06N 5/04* (2013.01); *G06N 20/00* (2019.01); *G06N 5/003* (2013.01)

(58) Field of Classification Search
  CPC ........... G06N 20/00; G06N 5/003; G06N 5/04
  USPC .......................................................... 706/46
  See application file for complete search history.

(56) References Cited

U.S. PATENT DOCUMENTS

| | | |
|---|---|---|
| 9,792,562 B1 | 10/2017 | Chen et al. |
| 10,127,477 B2 | 11/2018 | Chen et al. |
| 10,275,690 B2 | 4/2019 | Chen et al. |
| 10,354,204 B2 | 7/2019 | Chen et al. |
| 10,430,690 B1 | 10/2019 | Chen |
| 10,521,734 B2 | 12/2019 | Chen et al. |

OTHER PUBLICATIONS

Zhou et al ("Learning with Local and Global Consistency" 2004) (Year: 2004).*
Zhang et al ("Prototype Vector Machine for Large Scale Semi-Supervised Learning" 2009) (Year: 2009).*

(Continued)

*Primary Examiner* — Lut Wong
(74) *Attorney, Agent, or Firm* — Bell & Manning, LLC

(57) ABSTRACT

Data is classified using corrected semi-supervised data. Cluster centers are defined for unclassified observations. A class is determined for each cluster. A distance value is computed between a classified observation and each cluster center. When the class of the classified observation is not the class determined for the cluster center having a minimum distance, a first distance value is selected as the minimum distance, a second distance value is selected as the distance value computed to the cluster center having the class of the classified observation, a ratio value is computed between the second distance value and the first distance value, and the class of the classified observation is changed to the class determined for the cluster center having the minimum distance value when the computed ratio value satisfies a label correction threshold. A classification matrix is defined using corrected observations to determine the class for the unclassified observations.

30 Claims, 23 Drawing Sheets

(56) References Cited

OTHER PUBLICATIONS

Sindhwani, Vikas, "On Semi-Supervised Kernel Methods," Dec. 2007, Dissertation University of Chicago, pp. i-190.
Wu et al., "A Quest for Structure: Jointly Learning the Graph Structure and Semi-Supervised Classification," *CIKM '18* Oct. 22-26, 2018, arXiv:1909.12385v1 [cs.LG] Sep. 26, 2019.
Berikov et Litvinenko, "Semi-Supervised Regression using Cluster Ensemble and Low-Rank Co-Association Decomposition Under Uncertainties" Jan. 13, 2019.
Beck et al., Siam J. Imaging Sciences, vol. 2, No. 1, pp. 183-202, 2009.
Zhou, Dengyong, et al. "Learning with local and global consistency." *Advances in neural information processing systems.* 2004, 8 pages.
Dong-Hyun Lee, Pseudo-Label: The Simple and Efficient Semi-Supervised Learning Method for Deep Neural Networks, ICML 2013 Workshop, Challenges in Representation Learning 2013, 6 pages.
Konyushkova et al., Learning Active Learning from Data, $31^{st}$ Conference on Neural Information Processing, 2017, pp. 1-11.
Dempster, A.P.; Laird, N.M.; Rubin, D.B. (1977). "Maximum Likelihood from Incomplete Data via the EM Algorithm". Journal of the Royal Statistical Society, Series B. 39 (1): 1-38. JSTOR 2984875. MR 0501537.
1.14. SemiSupervised—scikit-learn 0.17.1 documentation, Apr. 27, 2016, pp. 1-2.
Scikit-learn: machine learning in Python—scikit-learn 0.17.1 documentation, Apr. 27, 2016, pp. 1-3.
S. Baluja ,Probabilistic modeling for face orientation discrimination: Learning from labeled and unlabeled data, Neural Information Processing Systems, 1998.
Bennett et al., Semi-supervised support vector machines, Advances in Neural Information Processing Systems, 1998, pp. 368-374.
Blum et al., Combining Labeled and Unlabeled Data with Co-Training, COLT, 1998.
Castelli et al., On the exponential value of labeled samples, Pattern Recognition Letters 16, Jan. 1995, pp. 105-111.
Cozman et al., Semi-Supervised Learning of Mixture Models, Proceedings of the Twentieth International Conference on Machine Learning (ICML-2003), Washington DC, 2003.
Fergus et al., Semi-supervised Learning in Gigantic Image Collections, Advances in Neural Information Processing Systems, Jan. 2009.
Kullback et al., On Information and Sufficiency, Annals of Mathematical Statistics 22 (1), 1951, pp. 79-86.
T. Mitchell, The Role of Unlabeled Data in Supervised Learning, In Proceedings of the Sixth International Colloquium on Cognitive Science, San Sebastian, Spain, May 1999.
Nigam et al., Text Classification from Labeled and Unlabeled Documents using EM, Machine Learning 39, May 2000, pp. 103-134.
Pitelis et al., Semi-Supervised Learning Using an Unsupervised Atlas, Proceedings of the European Conference on Machine Learning , Sep. 2014, pp. 565-580.
Ranzato et al., Semi-supervised Learning of Compact Document Representations with Deep Networks, Proceedings of the 25 th International Conference on Machine Learning, Helsinki, Finland, 2008.
Rifai et al., The Manifold Tangent Classifier, Advances in Neural Information Processing Systems, 2011.
Riloff et al., Learning Subjective Nouns using Extraction Pattern Bootstrapping, Proceedings of the Seventh Conference on Natural Language Learning, 2003.
Rosenberg et al., Semi-Supervised Self-Training of Object Detection Models, Seventh IEEE Workshop on Applications of Computer Vision, Jan. 2005.
Vapnik, SV Machines for Pattern Recognition, Chapter 12 in Statistical Learning Theory, Wiley-Interscience, Sep. 1998.

Weston, Deep Learning via Semi-Supervised Embedding, Proceedings of the 25th International Conference on Machine Learning, Helsinki, Finland, 2008.
D. Yarowsky, Unsupervised word sense disambiguation rivaling supervised methods, Proceedings of the 33rd Annual Meeting of the Association for Computational Linguistics, 1995, pp. 189-196.
X. Zhu, Semi-Supervised Learning Literature Survey, Computer Sciences TR 1530, University of Wisconsin—Madison, 2005.
Fung et al., Semi-supervised support vector machines for unlabeled data classification, Optimization Methods and Software, 2001.
Mahapatra et al., Semi-Supervised and Active Learning for Automatic Segmentation of Crohn's Disease, Medical Image Computing and Computer-Assisted Intervention (MICCAI), 2013, pp. 214-221.
Mahapatra et al., Combining Multiple Expert Annotations Using Semi-Supervised Learning and Graph Cuts for Crohn's Disease Segmentation, Medical Image Computing and Computer-Assisted Intervention, 2014.
Badrinarayanan et al., Semi-Supervised Video Segmentation Using Tree Structured Graphical Models, IEEE Transactions on Pattern Analysis and Machine Intelligence, vol. 35, No. 11, 2013.
Su et al., Interactive Cell Segmentation based on Active and Semi-supervised Learning, IEEE Transactions on Medical Imaging, vol. 35, Issue 3, Mar. 2016.
Onofrey et al., Low-Dimensional Non-Rigid Image Registration Using Statistical Deformation Models From Semi-Supervised Training Data, IEEE Transactions on Medical Imaging, Feb. 16, 2015.
Meier et al., Patient-Specific Semi-Supervised Learning for Postoperative Brain Tumor Segmentation, Medical Image Computing and Computer-Assisted Intervention MICCAI, 2014, pp. 714-721.
Turian et al., Word representations: A simple and general method for semi-supervised learning , ACL Proceedings of the 48th Annual Meeting of the Association for Computational Linguistics, Jul. 2010, pp. 384-394.
Tur et al., Combining active and semi-supervised learning for spoken language understanding, Speech Communications 45, 2005, pp. 171-186.
Zhu et al., Combining Active Learning and Semi=Supervised Learning Using Gaussian Fields and Harmonic Functions, Proceedings of the ICML—2003 Workshop on the Continuum from Labeled to Unlabeled Data, 8 pages, 2003.
Kawano et al., "Semi-Supervised Logistic Discrimination Via Graph-Based Regularization," Neural Process Lett (2012) 36, pp. 203-216.
Zhang et al., "Prototype Vector Machine for Large Scale Semi-Supervised Learning," Lawrence Berkeley National Laboratory, May 29, 2012, 9 pages.
Vaswani et al., "Principal Components Null Space Analysis for Image and Video Classification," IEEE Transactions on Image Processing, vol. 15, No. 7, Jul. 2006, pp. 1816-1830.
Balcan et al., Improved Distributed Principal Component Analysis, arXiv:1408.5823v3, Nov. 13, 2014, pp. 1-9.
Datta et al., Approximate Distributed K-Means Clustering, IEEE Transactions on Knowledge and Data Engineering, ol. 21, No. 10, Oct. 2009, pp. 1372-1388.
Bhat et al., On the derivation of the Bayesian Information Criterion, Nov. 8, 2010, pp. 1-8.
Xanthopoiflos P., Pardalos P.M., Trafaks T.B. (2013) Linear Discriminant Analysis In: Robust Data Mining, SpringerBriefs in Optimization, Springer, New York, NY.
Forero et al., Consensus-Based Distributed Support Vector Machines, Journal of Machine Learning Research 11, 2010, pp. 1663-1707.
Carpenter, Gail A., dARTMAP: A Neural Network for Fast Distributed Supervised Learning, Technical Reports, Neural Networks, Dec. 1997, pp. 1-46.
Balcan et al., Distributed k-means and K-median Clustering on General Topologies, arXiv:1306.0604 [cs.LG], Jun. 2013, pp. 1-9.
Silva et al., Distributed Text Classification With an Ensemble Kernel-Based Learning Approach, IEEE Transactions on Systems, Man, and Cybernetics—Part C: Applications and Reviews, 2009, pp. 1-11.
MacQueen, J. B. (1967). Some Methods for classification and Analysis of Multivariate Observations. Proceedings of 5th Berkeley Symposium on Mathematical Statistics and Probability. 1. University of California Press. pp. 281-297.

(56) References Cited

OTHER PUBLICATIONS

Chen et al., Combining Active Learning and Semi-supervised Learning by Using Selective Label Spreading, 2017 IEEE International Conference on Data Mining Workshops, 2017, pp. 850-857.
Lv et al., Positional Relevance Model for Pseudo-Relevance Feedback, SIGIR' 10, Jul. 19, 2010, pp. 1-8.
P. S. Bradley, O. L. Mangasarian, and W. N. Street, "Clustering via Concave Minimization," in Advances in Neural Information Processing Systems, vol. 9, 1997, pp. 368-374.
P.E.Black, "Manhattan Distance", in Dictionary of Algorithms and Data Structures, 2006.
Cheng, Yizong (Aug. 1995). "Mean Shift, Mode Seeking, and Clustering". IEEE Transactions on Pattern Analysis and Machine Intelligence. IEEE. 17 (8): 790-799.
Hamming, R. W. (Apr. 1950). "Error detecting and error correcting codes". The Bell System Technical Journal. 29 (2): 147-16.
Mackiewicz et al., Principal Components Analysis (PCA)*, Computers & Geosciences vol. 19, No. 3, 1993, pp. 303-342.
Jagannathan et al., Privacy-Preserving Distributed -Means Clustering over Arbitrarily Partitioned Data, KDD'05, Aug. 2005, pp. 593-599.
Van der Maaten et al., Visualizing Data using t-SNE, Journal of Machine Learning Research, 2008, pp. 2579-2605.
SAS Institute Inc. 2017. SAS® Visual Data Mining and Machine Learning 8.1: Data Mining and Machine Learning Procedures. Cary, NC: SAS Institute Inc., Mar. 2017.
SAS Institute Inc. 2016. SAS® Enterprise Miner 14.2: High-Performance Procedures, Cary, NC: SAS Institute Inc., Nov. 2016.

\* cited by examiner

US 10,929,762 B1

DISTRIBUTABLE EVENT PREDICTION AND MACHINE LEARNING RECOGNITION SYSTEM

CROSS-REFERENCE TO RELATED APPLICATIONS

The present application claims the benefit of and priority based on 35 U.S.C. § 119(e) to U.S. Provisional Patent Application No. 62/914,790 filed Oct. 14, 2019, the entire contents of which are hereby incorporated by reference. The present application claims the benefit of and priority based on 35 U.S.C. § 119(e) to U.S. Provisional Patent Application No. 62/990,399 filed Mar. 16, 2020, the entire contents of which are hereby incorporated by reference. The present application claims the benefit of and priority based on 35 U.S.C. § 119(e) to U.S. Provisional Patent Application No. 62/991,973 filed Mar. 19, 2020, the entire contents of which are hereby incorporated by reference. The present application claims the benefit of and priority based on 35 U.S.C. § 119(e) to U.S. Provisional Patent Application No. 63/023,022 filed May 11, 2020, the entire contents of which are hereby incorporated by reference.

The present application is a continuation-in-part of U.S. patent application Ser. No. 16/816,382 that was filed Mar. 12, 2020, the entire contents of which are hereby incorporated by reference. The present application is a continuation-in-part of U.S. patent application Ser. No. 16/904,818 that was filed Jun. 18, 2020, the entire contents of which are hereby incorporated by reference.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning (SSL). Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data. Supervised learning requires that the target (dependent) variable y be labeled in training data so that a model can be built to predict the label of new unlabeled data. A supervised learning system discards an observation in the training data that is not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the classification (data labeling) model.

Semi-supervised learning systems have many application areas such as image analysis tasks and microarray gene expression classification where measurements require expensive machinery and labels take significant time-consuming analysis and human effort. Due to the subjective nature of manual classification, human fatigue, and the difficulty of the classification task, class labels obtained from various sources such as crowdsourcing, synthetic labeling, and data programming inevitably contain noise. However, traditional learning techniques are not particularly designed for noise reduction. As a result, the semi-supervised classification performance is reduced dramatically when the class labels are inaccurate. Further, various semi-supervised classification algorithms perform differently based on how noisy the labeled data is though this information is typically unavailable.

SUMMARY

In an example embodiment, a non-transitory computer-readable medium is provided having stored thereon computer-readable instructions that when executed by a computing device, cause the computing device to predict occurrence of an event or to classify an object using semi-supervised data to label unlabeled data in a dataset. A plurality of observation vectors is accessed. The plurality of observation vectors includes a plurality of unclassified observation vectors and a plurality of classified observation vectors. Cluster centers are defined for the plurality of unclassified observation vectors using a clustering algorithm. A number of the cluster centers is a number of unique values of a target variable value of the plurality of classified observation vectors. The target variable value is defined to represent a class of each respective observation vector of the plurality of classified observation vectors. The target variable value is not defined to represent the class of each respective observation vector of the plurality of unclassified observation vectors. A unique class is determined for each cluster of the defined cluster centers. The unique class is selected from a plurality of classes that each represent unique values of the target variable value of the plurality of classified observation vectors. (A) A next classified observation vector is selected from the plurality of classified observation vectors. (B) A distance value is computed between the selected next classified observation vector and each cluster center of the defined cluster centers. (C) When the target variable value of the selected next classified observation vector is not the unique class determined for a cluster center having a minimum computed distance value, a first distance value is selected as the minimum computed distance value, a second distance value is selected as the computed distance value to the cluster center having the unique class of the target variable value of the selected next classified observation vector, a ratio value is computed between the selected second distance value and the selected first distance value, and the target variable value of the selected next classified observation vector is changed to the unique class determined for the cluster center having the minimum computed distance value when the computed ratio value satisfies a predefined label correction threshold. (D) (A) through (C) are repeated until each observation vector of the plurality of classified observation vectors is selected in (A). (E) A classification matrix is defined using the plurality of observation vectors. (F) The target variable value is determined for each observation vector of the plurality of unclassified observation vectors based on the defined classification matrix. (G) The target variable value is output for each observation vector of the plurality of observation vectors, wherein the target variable value selected for each observation vector of the plurality of observation vectors is defined to represent the label for a respective observation vector.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to predict occurrence of an event or to classify an object using semi-supervised data to label unlabeled data in a dataset.

In yet another example embodiment, a method of predicting occurrence of an event or of classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 12A to 12C depict a flow diagram illustrating examples of operations performed by the session worker device of FIG. 8B in accordance with an illustrative embodiment.

DETAILED DESCRIPTION

Noisy labels indicate that some of the human classified observation vectors have been classified incorrectly. Existing classification methods are not designed to work effectively when some of the classified observation vectors have been classified incorrectly. These methods assume that the classifications provided as input are correct as a basis for training the method to classify unclassified observation vectors. The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image thus incorrectly classifying the image as non-cancerous. As another example, it is often challenging to distinguish images such as classifying an image as including a wolf or a dog such as a German shepherd.

Classification application 122 and/or a classification model tuning application 622 (shown referring to FIG. 6) are capable of not only correcting corrupted labeled data but also of achieving a higher classification accuracy on unclassified data based on a determination of how noisy the labeled data is so that an appropriate classification algorithm can be selected. The major contributions and desirable properties of classification application 122 and/or a classification model tuning application 622 include increased efficiency, the capability to automate hyperparameter selection, improved accuracy, and scalability based on optional application in a distributed computing system. There are applications for classification application 122 and/or a classification model tuning application 622 in many areas such as process control and equipment health monitoring, image processing and classification, data segmentation, data analysis, etc.

Figure 1:
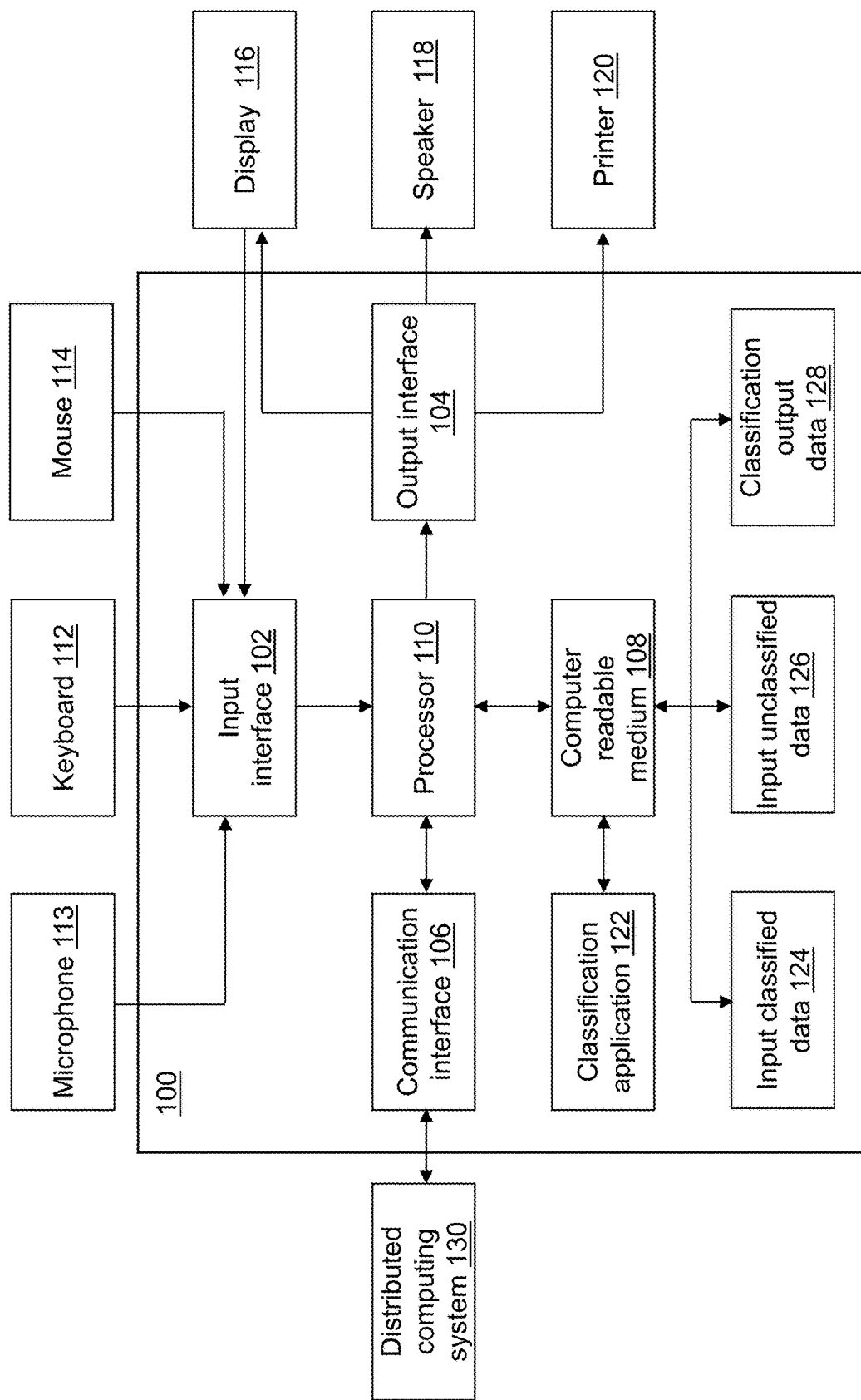
FIG. 1 depicts a block diagram of a classification device in accordance with an illustrative embodiment.

Referring to FIG. 1, a block diagram of a classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, and classification output data 128. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116.

The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth antenna, a telephone jack, a USB port, etc. Data and/or messages may be transferred between classification device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables define a vector $x_i$ for each observation vector $i=1, 2, \ldots, N$, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for $i=1, 2, \ldots, n_l$, where $n_l$ is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

Input unclassified data 126 includes observation vectors $x_i$ that have not been labeled such that the $y_i$ value has not been determined though a value such as zero may be included in a column associated with the $y_i$ values. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefor, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 130 and accessed by classification device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 130. Classification device 100 may coordinate access to input classified data 124 and input unclassified data 126 that is distributed across distributed computing system 130 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Referring to FIGS. 2A and 2B, 3A and 3B, and 4, example operations associated with classification application 122 are described when input classified data 124 and input unclassified data 126 are stored on classification device 100 and accessed by a single thread of classification device 100. Additional, fewer, or different operations may be performed depending on the embodiment of classification application 122. The order of presentation of the operations of FIGS. 2A and 2B, 3A and 3B, and 4 is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art.

The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122.

Figure 2A:
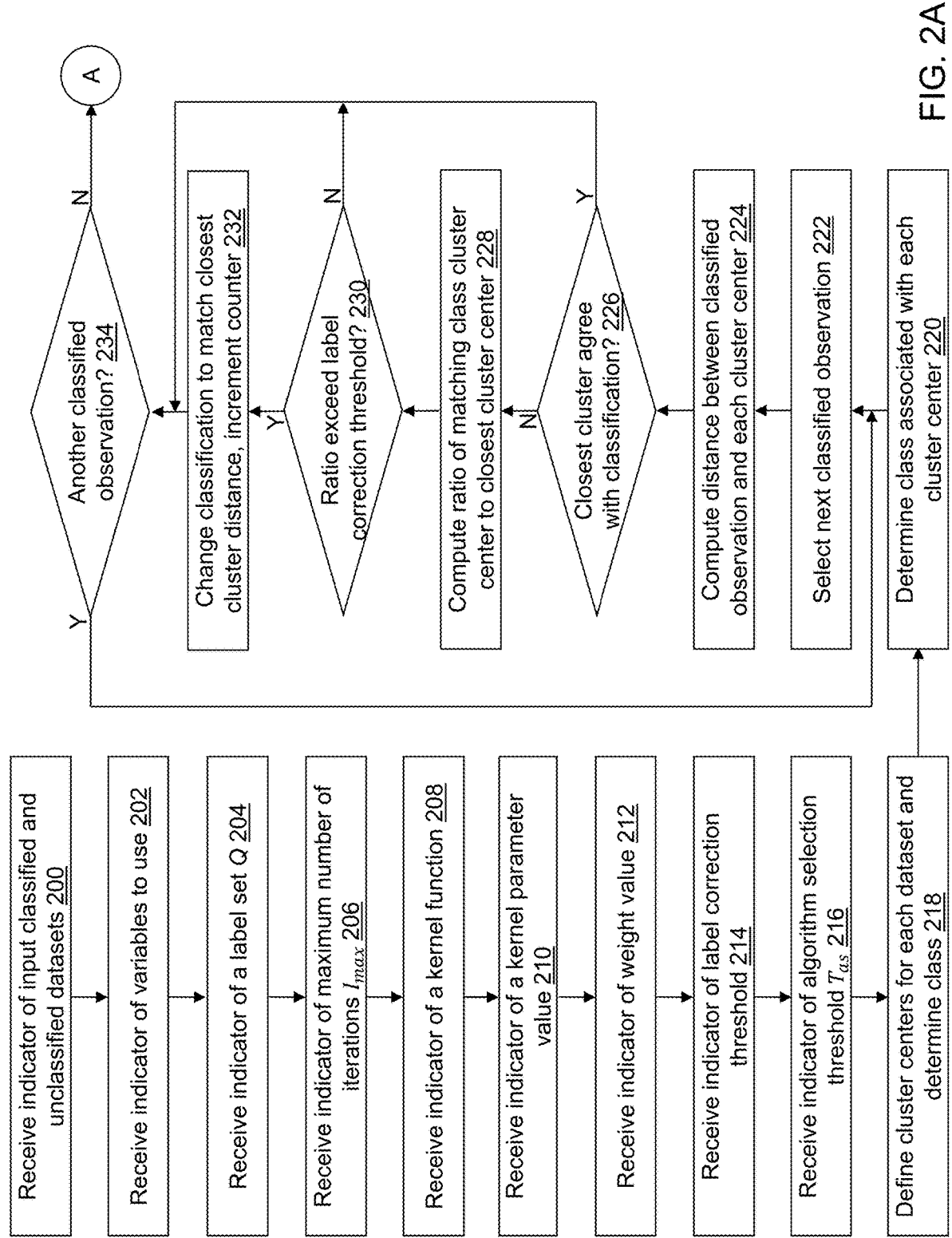
FIGS. 2A and 2B depict a flow diagram illustrating examples of operations performed by a classification application of the classification device of FIG. 1 in accordance with an illustrative embodiment.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by N. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible unique values that the $y_i$-variable (target) value of each observation vector $x_i$ may have. For illustration, if input classified data 124 and input unclassified data 126 include text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". c is a number of classes in label set Q. No $y_i$-variable (target) value or a variable value of zero may indicate that the associated observation vector $x_i$ is not classified when input classified data 124 and input unclassified data 126 are stored together in memory or in a single dataset. The label set Q further may be a binary indicator that indicates the existence or non-existence of a characteristic of each observation vector. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

When input classified data 124 and input unclassified data 126 are stored together in memory or in a single dataset, input classified data 124 may be extracted. Input classified data 124 and input unclassified data 126 together define a point set $\chi = \{x_1, \ldots, x_{n_l}, x_{n_l+1}, \ldots, x_N\}$, where N indicates a total number of data points or observation vectors $x_i$, where the observation vectors $x_i$ ($i \leq n_l$) are labeled such that $y_i \in Q$, and the remaining observation vectors $x_i$ ($n_l < i \leq N$) are unlabeled such that $y_i \notin Q$. Thus, $n_l$ indicates a number of classified data points or observation vectors $x_i$ included in input classified data 124. For illustration, $n_l$ may be a small percentage, such as less than 1% of the total number of observation vectors N.

In an operation 206, a fourth indicator of a maximum number of iterations $I_{max}$ may be received. In an alternative embodiment, the fourth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 208, a fifth indicator of a kernel function may be received. For example, the fifth indicator indicates a name of a kernel function. The seventh indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter.

In an operation 210, a sixth indicator of a kernel parameter value to use with the kernel function may be received. For example, a value for s, the Gaussian bandwidth parameter, may be received for the Gaussian kernel function. In an alternative embodiment, the sixth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

For illustration, the K Nearest Neighbors (KNN) kernel function may also be defined as:

$$\exp\frac{-\|x_i - x_j\|^2}{2s^2}$$

where s is one kernel parameter. The KNN kernel function may also include k that is a number of nearest neighbors and is another hyperparameter for the KNN kernel function.

In an operation 212, a seventh indicator of a weight value g may be received. In an alternative embodiment, the seventh indicator may not be received. For example, a default value may be stored, for example, in computer-readable medium 108 and used automatically. In another alternative embodiment, the value of the weight value g may not be selectable. Instead, a fixed, predefined value may be used. For illustration, a default value of the weight value g may be 0.5 though g may be any value between zero and one.

In an operation 214, an eighth indicator of a label correction threshold $T_{lc}$ may be received. In an alternative embodiment, the eighth indicator may not be received. For example, a default value may be stored, for example, in computer-readable medium 108 and used automatically. In another alternative embodiment, the value of the label correction threshold $T_{lc}$ may not be selectable. Instead, a fixed, predefined value may be used. For illustration, a default value of the label correction threshold $T_{lc}$ may be 2.0 though any value greater than or equal to two may be used. A larger value for label correction threshold $T_{lc}$ indicates greater confidence that the selected labels are going to be wrong and thus noisier.

In an operation 216, a ninth indicator of an algorithm selection threshold $T_{as}$ may be received. In an alternative embodiment, the ninth indicator may not be received. For example, a default value may be stored, for example, in computer-readable medium 108 and used automatically. In another alternative embodiment, the value of the algorithm selection threshold $T_{as}$ may not be selectable. Instead, a fixed, predefined value may be used. For illustration, a default value of algorithm selection threshold $T_{as}$ may be 0.7 though any value may be used. A lower value for algorithm selection threshold $T_{as}$ indicates greater confidence that the selected labels are going to be wrong and thus noisier.

In an operation 218, cluster centers are defined by executing a k-means clustering algorithm to cluster input unclassified data 126 into a number of clusters equal to c the number of classes in label set Q. Each cluster center is defined by computing an average of each observation vector assigned to the same cluster. Class centers are defined by computing an average of each observation vector of input classified data 124 grouped by class or label as defined by the $y_i$-variable (target) value of each observation vector of input classified data 124. Each class center is determined by computing an average of each observation vector of input classified data 124 that has a respective class. In alternative embodiments, different clustering algorithms may be used to define the cluster centers. A number of class centers is also c the number of classes in label set Q.

In an operation 220, a class is determined for each cluster center. For example, a distance is computed between each cluster center of the defined cluster centers and each class center of the class centers. The computed distances are ranked for each cluster center. A class is determined for each cluster center based on the class associated with the class center that is closest or has a minimum distance to each defined cluster center.

In an operation 222, a next classified observation vector is selected from input classified data 124. For example, on a first iteration of operation 222, a first observation vector is selected; on a second iteration of operation 222, a second observation vector is selected; etc.

In an operation 224, a distance is computed between the selected next classified observation vector and each cluster center of the defined cluster centers. For example, a Euclidian distance may be computed.

In an operation 226, a determination is made concerning whether the target variable value of the selected next classified observation vector is the unique class determined for a cluster center having a minimum computed distance value.

When the target variable value of the selected next classified observation vector is the unique class determined for the cluster center having the minimum computed distance value, processing continues in an operation 234. When the target variable value of the selected next classified observation vector is not the unique class determined for the cluster center having the minimum computed distance value, processing continues in an operation 228.

In operation 228, a ratio value $r_v$ is computed between a second distance value and a first distance value, where the first distance value is the minimum computed distance value and the second distance value is the computed distance value to the cluster center having the unique class of the target variable value of the selected next classified observation vector. For example, the ratio value may be computed using $$r_v = \frac{e^{-d_1}}{\sum_{j=1}^{2} e^{-d_j}},$$

where $d_1$ is the first distance value, and $d_2$ is the second distance value. $r_v$ is the probability that the selected next classified observation vector is actually a member of the cluster associated with the minimum computed distance value instead of the cluster associated with the cluster center having the unique class of the target variable value of the selected next classified observation vector. This is the result because the smaller the first distance value is, the larger the probability that the selected next classified observation vector belongs to a specific cluster.

In an operation 230, a determination is made concerning whether the ratio value is greater than the label correction threshold $T_{lc}$. When the ratio value is greater than the label correction threshold $T_{lc}$, processing continues in an operation 232. When the ratio value is less than the label correction threshold $T_{lc}$, processing continues in operation 234.

In operation 232, the target variable value of the selected next classified observation vector is changed to the unique class determined for the cluster center having the minimum computed distance value, and a counter of a number of noisy labels $n_{nl}$ is incremented, for example, using $n_{nl}=n_{nl}+1$, where $n_{nl}$ may have been initialized to zero prior to operation 222.

In operation 234, a determination is made concerning whether input classified data 124 includes another observation vector to process. When input classified data 124 includes another observation vector, processing continues in operation 222 to process the next classified observation vector to determine if it is likely in error and thus a noisy label in need of automatic correction. When input classified data 124 does not include another observation vector, processing continues in operation 240 shown referring to FIG. 2B.

Figure 2B:
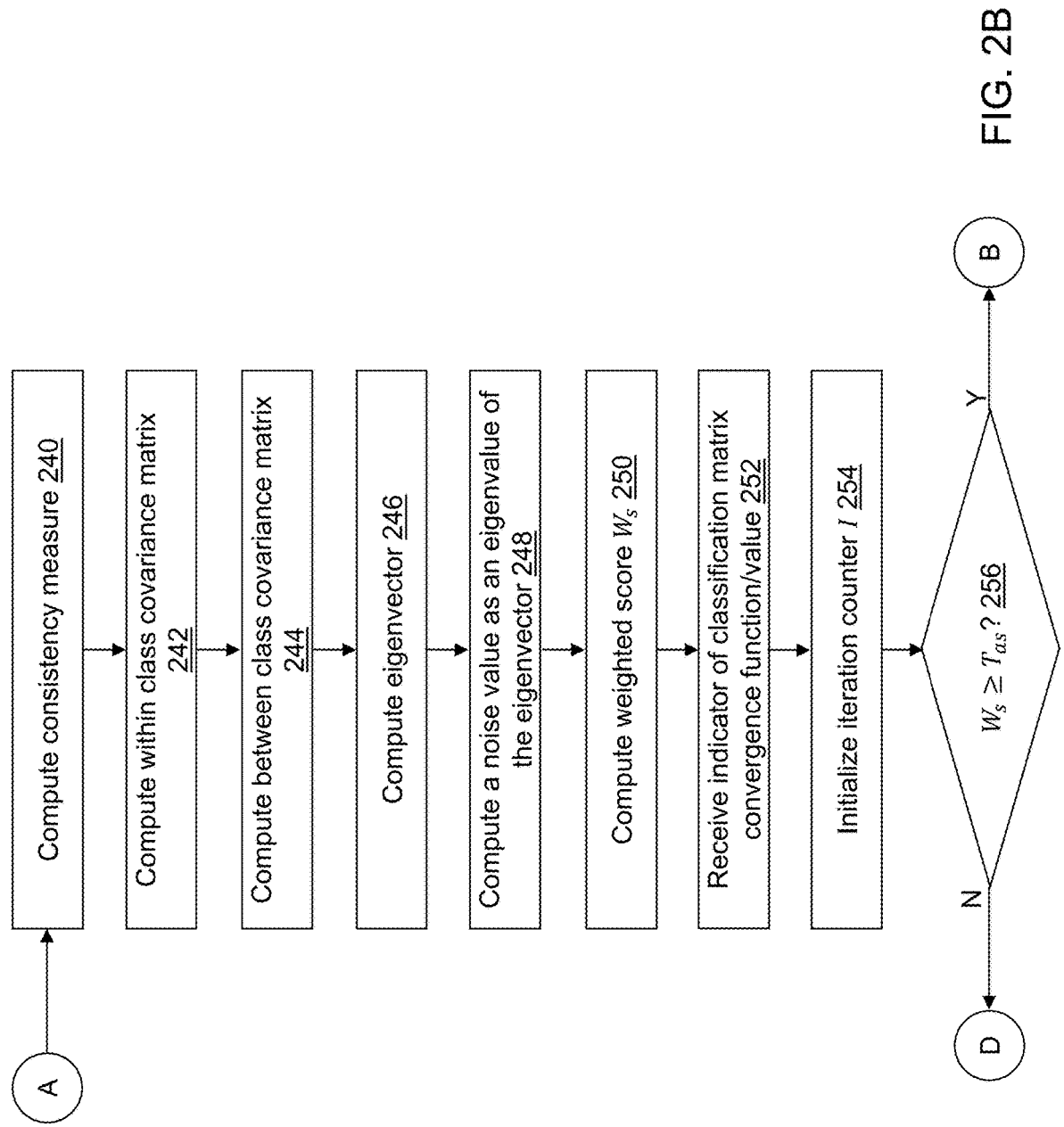

Referring to FIG. 2B, in operation 240, a consistency measure $C_m$ is computed, for example, as a ratio of the number of noisy labels $n_{n1}$ divided by $n_l$ the number of observation vectors included in input classified data 124 or $C_m = n_{n1}/n_l$.

In an operation 242, a within class covariance matrix $S_w$ is computed. For example, the within class covariance matrix is computed using $S_w = \Sigma_{i=1}^{n_l}(x_i - \mu_{y_i})(x_i - \mu_{y_i})^\tau$, where $x_i$ is an $i^{th}$ observation vector of the plurality of classified observation vectors, $y_i$ is the target variable value of $x_i$, $\mu_{y_i}$ is a sample mean vector computed for a subset of the plurality of classified observation vectors having $y_i$ as the target variable value, and T indicates a transpose.

In an operation 244, a between class covariance matrix $S_b$ is computed. For example, the between class covariance matrix is computed using $S_b = \Sigma_{k=1}^{c} n_k(\mu_k - \mu)(\mu_k - \mu)^\tau$, where $n_k$ is a number of observation vectors of the plurality of classified observation vectors having the target variable value associated with a $k^{th}$ class, $\mu_k$ is a sample mean vector computed for a subset of the plurality of classified observation vectors having the target variable value associated with the $k^{th}$ class, and $\mu$ is a sample mean vector computed for the plurality of classified observation vectors.

In an operation 246, an eigenvector w is computed from the within class covariance matrix and the between class covariance matrix. For example, the eigenvector is computed using a generalized eigenvalue problem solver to solve $$\underset{w}{\operatorname{argmax}} \frac{w^T S_b w}{w^T S_w w}.$$

For illustration, a generalized eigenvalue problem solver is described in *Generalized eigenvalue problem* by Ruye Wang and available online Apr. 27, 2015 as part of a Linear Algebra lecture series.

In an operation 248, a noise score value $N_{sv}$ is computed as an eigenvalue of the computed eigenvector.

In an operation 250, a weighted score value $W_s$ is computed using $W_s = N_{sv} + g^* C_m$.

In an operation 252, a tenth indicator of a classification matrix convergence function and/or a classification convergence value may be received. For example, the tenth indicator indicates a name of a classification matrix convergence function. The tenth indicator may be received by classification application 122 after selection from a user interface window or after entry by a user into a user interface window. A default value for the classification matrix convergence function may further be stored, for example, in computer-readable medium 108. As an example, a classification matrix convergence function may be selected from "Num Iterations", "Within Tolerance", etc. For example, a default convergence test may be "Num Iterations". Of course, the classification matrix convergence function may be labeled or selected in a variety of different manners by the user as understood by a person of skill in the art. In an alternative embodiment, the classification matrix convergence function may not be selectable, and a single classification matrix convergence function is implemented by classification application 122. For example, the classification matrix convergence function "Num Iterations" may be used by default or without allowing a selection.

As an example, when the classification matrix convergence function "Num Iterations" is indicated, the classification convergence value is a maximum number of iterations $I_{max}$. Merely for illustration, the number of iterations $I_{max}$ may be defined between 10 and 1000 though the user may determine that other values are more suitable for their application as understood by a person of skill in the art, for example, based on the classification accuracy desired, computing resources available, size of the input unclassified data, etc. As another example, when the classification matrix convergence function "Within Tolerance" is indicated, the classification convergence value may be a tolerance value $c_{th}$. A default value for the classification convergence function may be stored, for example, in computer-readable medium 108 and used automatically when the tenth indicator is not received. In an alternative embodiment, the classification convergence value may not be selectable. Instead, a fixed, predefined value may be used. For illustration, a default value of the convergence threshold value $c_{th}$ may be 0.01 though other values may be used.

In an operation 254, an iteration counter I is initialized, for example, as I=1.

In an operation 256, a determination is made concerning whether the weighted score value $W_s$ is greater than the algorithm selection threshold $T_{as}$. When $W_s \geq T_{as}$, processing continues in an operation 300 shown referring to FIG. 3A. When $W_s < T_{as}$, processing continues in an operation 400 shown referring to FIG. 4.

Figure 3A:
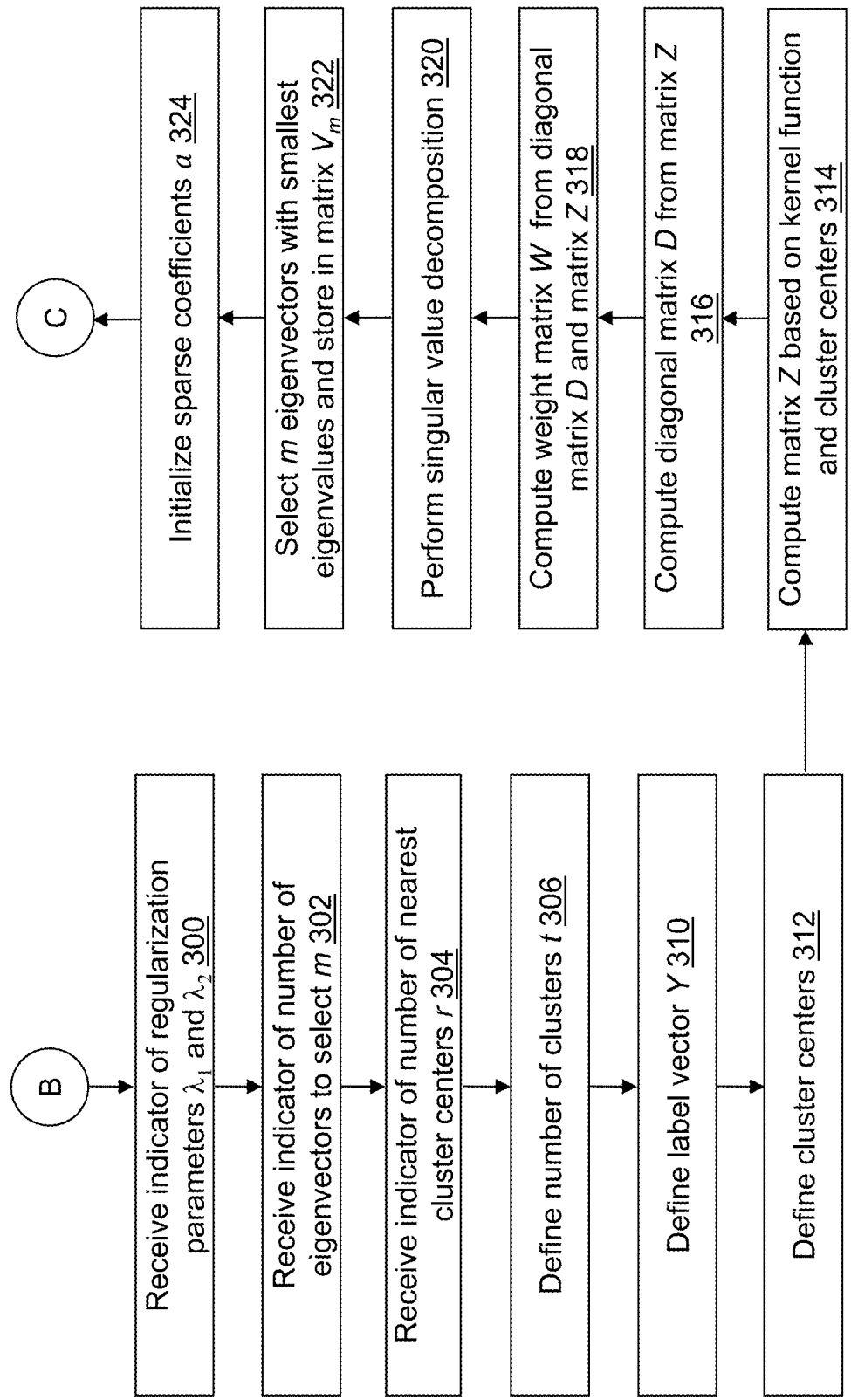
FIGS. 3A and 3B depict a flow diagram illustrating examples of operations performed by a first classification algorithm of the classification device of FIG. 1 in accordance with an illustrative embodiment.

Referring to FIG. 3A, in an operation 300, an eleventh indicator of a first regularization parameter value $\lambda_1$ and a second regularization parameter value $\lambda_2$ may be received. In an alternative embodiment, the eleventh indicator may not be received. For example, default values may be stored, for example, in computer-readable medium 108 and used automatically. In another alternative embodiment, the values of the first regularization parameter $\lambda_1$ and a second regularization parameter $\lambda_2$ may not be selectable. Instead, fixed, predefined values may be used. For illustration, a default value of the first regularization parameter $\lambda_1$ may be 0.7 and a default value of the second regularization parameter $\lambda_2$ may be 0.7 though other values may be used.

In an operation 302, a twelfth indicator of a number of eigenvectors to select m may be received. In an alternative embodiment, the number of eigenvectors to select m may not be received. For example, a default value for the number of eigenvectors to select m may be stored, for example, in computer-readable medium 108 and used automatically. In another alternative embodiment, the value of the number of eigenvectors to select m may not be selectable. Instead, a fixed, predefined value may be used. For illustration, a default value of the number of eigenvectors to select m may be 4 with typical values between two and five though any value may be used.

In an operation 304, a thirteenth indicator of a number of nearest cluster centers r may be received. In an alternative embodiment, the number of nearest cluster centers r may not be received. For example, a default value for the number of nearest cluster centers r may be stored, for example, in computer-readable medium 108 and used automatically. In another alternative embodiment, the value of the number of nearest cluster centers r may not be selectable. Instead, a fixed, predefined value may be used. For illustration, a default value of the number of nearest cluster centers r may be 5 though other values may be used.

In an operation 306, a number of clusters t is defined as t=c the number of classes in label set Q.

In an operation 310, a label vector Y is defined from input classified data 124 and input unclassified data 126. $Y_i=k$ if $x_i$ is labeled as $y_i=k$. Otherwise, $Y_i=0$. As another option for binary data, $Y_i=1$ if $y_i$ indicates true; $Y_i=-1$ if $y_i$ indicates false; otherwise, $Y_i=0$.

In operation 312, t cluster centers $\{u_1, u_2, \ldots, u_t\}$ are defined by executing a k-means clustering algorithm with input classified data 124 and input unclassified data 126. In alternative embodiments, different clustering algorithms may be used to define the t cluster centers.

In an operation 314, a matrix Z is computed using the t cluster centers, the kernel function, the kernel parameter value s, and the number of nearest cluster centers r. For example, using the Gaussian kernel function, the matrix Z is computed using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, \quad i = 1, 2, \ldots, N$$

and j=1, 2, . . . , t,
where $N_r(i)$ is an index to a nearest cluster center to $x_i$ of the number of nearest cluster centers r, $x_i$ is an $i^{th}$ observation vector selected from input classified data 124 and input unclassified data 126, $u_j$ is a $j^{th}$ cluster center selected from the t cluster centers $\{u_1, u_2, \ldots, u_t\}$, and matrix Z is an Nxt matrix.

In an operation 316, a diagonal matrix D is computed from the matrix Z. For example, the diagonal matrix D is a txt matrix and is defined as $D_{jj} = \Sigma_{i=1}^{N}$, j=1, 2, . . . , t and $D_{ij}=0$ if i≠j.

In an operation 318, a weight matrix W is computed using diagonal matrix D and the matrix Z as $W = ZD^{-0.5}D^{-0.5}Z^\tau$, where $W = \hat{Z}\hat{Z}^\tau$.

In an operation 320, a singular value decomposition is applied to $\hat{Z}^\tau\hat{Z}$ to obtain V based on $\hat{Z}^\tau\hat{Z} = U\Sigma\Sigma U^\tau$, where $\hat{Z} = V\Sigma U^\tau$ where each column of U is an eigenvector of $\hat{Z}^\tau\hat{Z}$, and each column of V is an eigenvector of W.

In an operation 322, m eigenvectors having the smallest eigenvalues are selected from the singular value decomposition V and stored in a matrix $V_m$, where $V_m$ is an Nxm matrix.

An optimization is applied to define a classification matrix F using $F = V_m a$, where a is a plurality of sparse coefficients, where the plurality of sparse coefficients includes a coefficient value defined for each of the m eigenvectors. The optimization is defined to minimize $$Q(a) = 0.5\|V_m a - Y\|_2^2 + \lambda_1 \sum_{i=1}^{m} \sum_{ii}^{\frac{1}{2}} |a_i| + \lambda_2 \left(\sum_{i=1}^{m} \sum_{ii}^{\frac{1}{2}} a_i\right)^2 = C_1(a) + C_2(a),$$

where $$C_1(a) = 0.5\|V_m a - Y\|_2^2 + \lambda_2 \left(\sum_{i=1}^{m} \sum_{ii}^{\frac{1}{2}} a_i\right)^2$$

includes the differentiable terms from Q(a), and $$C_2(a) = \lambda_1 \sum_{i=1}^{m} \sum_{ii}^{\frac{1}{2}} |a_i|$$

includes the non-differentiable terms from Q(a). The first term, $0.5\|V_m a - Y\|_2^2$, defines a fitting constraint primarily to ensure the classification function is close enough to the initial classification labels defined by Y. The second term, $$\lambda_1 \sum_{i=1}^{m} \sum_{ii}^{\frac{1}{2}} |a_i|,$$

provides an $L_1$-norm smoothness constraint for Laplacian regularization. The third term, $$\lambda_2 \left( \sum_{i=1}^{m} \sum_{ii}^{\frac{1}{2}} a_i \right)^2,$$

provides an $L_2$-norm constraint for Laplacian regularization. The significance of the third term is two-fold. First, the third term characterizes correlations between variables to fully utilize the interdependency along different dimensions to enhance the classification performance. Second, it makes the loss function strongly convex, which ensures the unique solution to be Lipschitz with respect to classification matrix F.

In an operation 324, the plurality of sparse coefficients a are each initialized, for example, to zero values, where a is an mx1 vector.

Figure 3B:
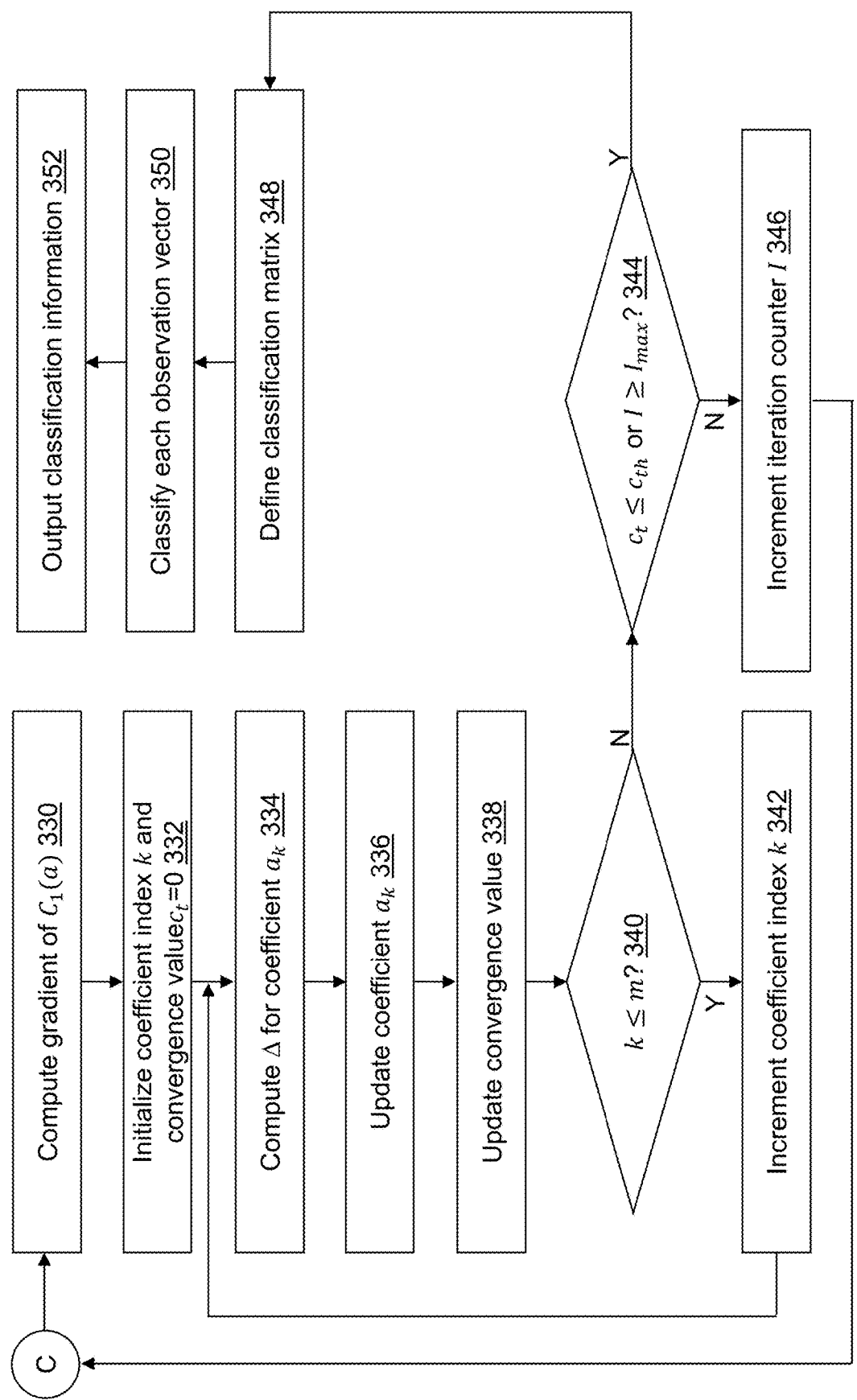

Referring to FIG. 3B, in an operation 330, a gradient of $C_1(a)$ is computed with respect to the plurality of sparse coefficients a. For example, the gradient of $C_1(a)$ is computed as $$\nabla_{a_i}(C_1(a_i)) = C_{3,i} + 2\lambda_2 \sum_{ii}^{\frac{1}{2}} \sum_{i=1}^{m} \sum_{ii}^{\frac{1}{2}} a_i,$$

where $C_3 = V_m^\tau (V_m a - Y)$ is an mx1 vector, and $C_{3,i}$ is an $i^{th}$ element of $C_3$. $\nabla_{a_i}(C_1(a_i))$ is an mx1 vector for a binary label set or an mxc matrix for a label set having c classes.

In an operation 332, a coefficient index k is initialized, for example, as k=1, and a convergence value $c_t$ is initialized, for example, as $c_t=0$.

In an operation 334, a difference value $\Delta_k$ is computed for coefficient $a_k$ using $$\Delta_k = a_k - \frac{\nabla_{a_k}(C_1(a_k))}{\|V_m\|_s^2},$$

where $\|V_m\|_s$ is a spectral norm of the matrix $V_m$.

In operation 336, coefficient $a_k$ is updated, for example, using $$a_k = \max\left\{ |\Delta_k| - \frac{\lambda_1}{\|V_m\|_s}, 0 \right\}.$$

In operation 338, a convergence value is updated, for example, using $c_t = c_t + a_k - a_k'$, where $a_k'$ is a value of $a_k$ prior to the update in operation 336. The convergence value is a sum of a difference between the current $a_k$ and the previous $a_k$ for each coefficient of the sparse coefficients.

In an operation 340, a determination is made concerning whether there is another coefficient of the sparse coefficients to update, for example, using k≤m. If k≤m, processing continues in an operation 342. If k>m, processing continues in an operation 344.

In operation 342, the coefficient index k is incremented, for example, as k=k+1, and processing continues in operation 334 to process the next coefficient.

In operation 344, a determination is made concerning whether convergence has been achieved or the maximum number of iterations have been performed. If $c_t \leq c_{th}$ or $I \geq I_{max}$, processing continues in an operation 348. If $c_t > c_{th}$ and $I < I_{max}$, processing continues in an operation 346.

In operation 346, the iteration counter I is incremented, for example, as I=I+1, and processing continues in operation 330.

In operation 348, the classification matrix F is defined using $F = V_m a$, where classification matrix F is an Nx1 vector for a binary label set or an Nxc matrix for a label set having c classes.

In an operation 350, each of the unclassified observation vectors in input unclassified data 126 is classified and updated in label vector Y. For example, for a binary label set, if $F_i > 0$, the $y_i$-variable (target) value or class of the $i^{th}$ observation vector of input unclassified data 126 is predicted to be 1; whereas, if $F_i \leq 0$, the $y_i$-variable (target) value or class of the $i^{th}$ observation vector of input unclassified data 126 is predicted to be −1. For a label set having c classes, $y_i$ is selected for each observation vector $x_i$ based on $$y_i = \underset{j \leq c}{\mathrm{argmax}} F_{ij}.$$

As a result, a label with a highest classification value as indicated by $$\underset{j \leq c}{\mathrm{argmax}} F_{ij}$$

is selected as the $y_i$-variable (target) value or class for the $i^{th}$ observation vector $x_i$ of input unclassified data 126. The classification or label for each observation vector $x_i$ of input unclassified data 126 may be extracted from label set Q using the value of $y_i$ as an index into label set Q, and label vector Y may be updated with these values.

In an operation 352, the class or label identified for each observation vector $x_i$ included in input unclassified data 126 may be stored in classification output data 128 possibly with the respective observation vector $x_i$.

Figure 4:
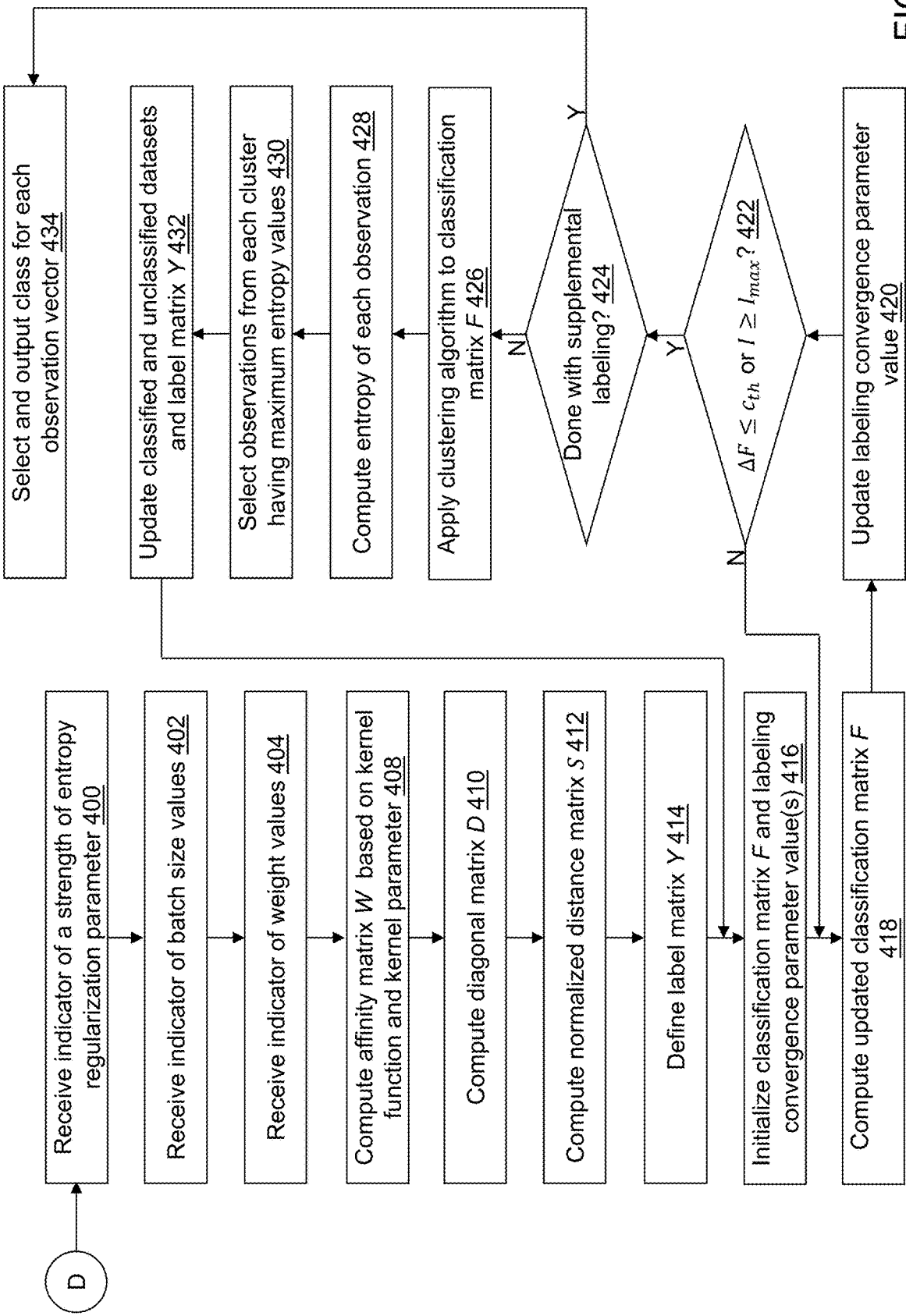
FIG. 4 depicts a flow diagram illustrating examples of operations performed by a second classification algorithm of the classification device of FIG. 1 in accordance with an illustrative embodiment.

Referring to FIG. 4, in operation 400, a fourteenth indicator may be received that indicates a strength of entropy regularization parameter value λ, where λ is selected between zero and one, non-inclusive. In an alternative embodiment, the fourteenth indicator may not be received. For example, a default value may be stored, for example, in computer-readable medium 108 and used automatically when the fourteenth indicator is not received. In an alternative embodiment, the strength of entropy regularization parameter value may not be selectable. Instead, a fixed, predefined value may be used. Merely for illustration, the strength of entropy regularization parameter value λ=0.5 may be used as a default value.

In an operation 402, a fifteenth indicator may be received that indicates a batch size value h. As described further below, each iteration, a batch size number of observation vectors that have been classified are added to input classified data 124 and removed from the input unclassified data. In an alternative embodiment, the fifteenth indicator may not be received. For example, a default value for the batch size value h may be stored, for example, in computer-readable medium 108 and used automatically. In another alternative embodiment, the batch size value h may not be selectable. Instead, a fixed, predefined value may be used.

In an operation 404, a sixteenth indicator may be received that indicates a weight value $\alpha_{weight}$. In an alternative embodiment, the sixteenth indicator may not be received. For example, a default value may be stored, for example, in computer-readable medium 108 and used automatically when the sixteenth indicator is not received. In an alternative embodiment, the weight value $\alpha_{weight}$ may not be selectable. Instead, a fixed, predefined value may be used. Merely for illustration, the weight value $\alpha_{weight}$=0.5 may be used as a default value though other values may be used.

In an operation 408, an affinity matrix W is computed based on the kernel function indicated in operation 208 and the kernel parameter value indicated in operation 210. For example, using the Gaussian kernel function, the affinity matrix W is defined as $$W_{ij} = \exp\frac{-\|x_i - x_j\|^2}{2s^2}$$

if i≠j and $W_{ii}$=0 if i=j, i=1, 2, ..., N and j=1, 2, ..., N where $x_i$ and $x_j$ are observation vectors selected from input classified data 124 and input unclassified data 126. For illustration, where the KNN kernel function is selected, k observation vectors are selected based on having minimum affinity matrix W values. Only the selected k observation vectors are included in the affinity matrix W.

In an operation 410, a diagonal matrix D is computed based on the affinity matrix W. For example, using the Gaussian kernel function, the diagonal matrix D is an NxN matrix and is defined as $D_{ii}=\Sigma_{j=1}^{N}W_{ij}$ if i=j and $D_{ij}$=0 if i≠j, i=1, 2, ..., N and j=1, 2, ..., N.

In an operation 412, a normalized distance matrix S is computed based on the affinity matrix W and the diagonal matrix D. For example, the normalized distance matrix S is an NxN matrix and is defined as $S=D^{-1/2}WD^{-1/2}$.

In an operation 414, a label matrix Y is defined. Label matrix Y is an Nxc matrix with $Y_{ig}$=1 if $x_i$ is labeled as $y_i$=g. Otherwise, $Y_{ig}$=0, where g=1, ..., i=1, ..., N.

In an operation 416, a classification matrix F and one or more labeling convergence parameter values are initialized. Classification matrix F is an Nxc matrix. For example, classification matrix F is initialized as F(0)=Y. One or more labeling convergence parameter values may be initialized based on the labeling convergence test indicated in operation 252. When the labeling convergence test "Within Tolerance" is indicated, a first labeling convergence parameter value ΔF may be initialized to a large number. Either or both convergence tests may be applied. Other convergence tests may further be applied.

In an operation 418, an updated classification matrix F(t+1) is computed using F(t+1)=$\alpha_{weight}$SF(t)+(1−$\alpha_{weight}$)Y, where for a first iteration of operation 418, F(t)=F(0). The updated classification matrix F defines a label probability for each permissible unique value defined in label set Q for each observation vector $x_i$.

In an operation 420, the one or more labeling convergence parameter values are updated. As an example, when the labeling convergence test "Num Iterations" is indicated in operation 526, I=I+1. As another example, when the labeling convergence test "Within Tolerance" is indicated in operation 252, ΔF=F(t+1)−F(t).

In an operation 422, a determination is made concerning whether labeling has converged by evaluating the labeling convergence test. For example, when ΔF≤$c_{th}$ or I≥$I_{max}$, labeling has converged, and processing continues in an operation 418. If ΔF>$c_{th}$ and I<$I_{max}$, labeling has not converged, and processing continues in an operation 424.

In an operation 424, a determination is made concerning whether supplemental labeling is done. When supplemental labeling is done, processing continues in an operation 434. When supplemental labeling is not done, processing continues in an operation 426. For example, supplemental labeling is done based on a number of iterations of operation 416.

In operation 426, a k-means clustering algorithm is applied to updated classification matrix F(t+1) to create a number of clusters equal to the number of classes c included in input classified data 124. The k-means clustering algorithm assigns the classification label distribution of each observation vector to a cluster.

In an operation 428, an entropy value is computed for each observation vector using $$C = -\sum_{j=1}^{c} F_{ij}(t+1)\log(F_{ij}(t+1)), i = 1, ..., N$$

to define an entropy matrix C.

In an operation 430, l number of observation vectors are selected from each cluster of the number of clusters c by identifying the l observation vectors having maximum entropy values defined in entropy matrix C, where l=[h/c] is a largest integer that is not larger than h/c. An index q to the observation vector $x_i$ of input unclassified data 126 associated with each observation vector may be identified as part of the selection. C is an effective measure of class overlap, which characterizes the usefulness of the unclassified data when classification is ambiguous or uncertain. Because the selection of the additional batch size h number of classified observation vectors is conducted within local clusters, the additional batch size h number of classified observation vectors are expected to be selected from different classes instead of choosing most of them from a majority class, which ensures the best trade-off between diversity and uncertainty in active learning.

In an operation 432, the label $$y_q = \underset{j \leq c}{\operatorname{argmax}} F_{qj}(t), q = 1, ..., l*c$$

is assigned to the $y_q$-variable (target) value of the associated observation vector $x_q$, and the associated observation vector $x_q$ with its label $y_q$ is added to input classified data 124. The label matrix Y is updated to include the labels and associated observation vectors. As a result, the number of classified observation vectors included in input classified data 124 has been increased by l*c and the number of unclassified observation vectors has been decreased by l*c by removing them from input unclassified data 126. Processing continues in operation 416 to recompute classification matrix F and label matrix Y with the additional l*c number of classified observation vectors.

In operation 434, the $y_i$-variable (target variable) value of each observation vector $x_i$ not included in input classified data 124 is labeled using F(t). $y_i$ is selected for each observation vector $x_i$ based on $$y_i = \underset{j \leq c}{\operatorname{argmax}} F_{ij}(t), i = 1, ..., n_u,$$

where $n_u$ is a number of observation vectors included in input unclassified data 126. As a result, a label with a highest classification value as indicated by $$\underset{j \leq c}{\operatorname{argmax}} F_{ij}(t)$$

is selected as the $y_i$-variable value or class for the observation vector $x_i$.

Figure 5:
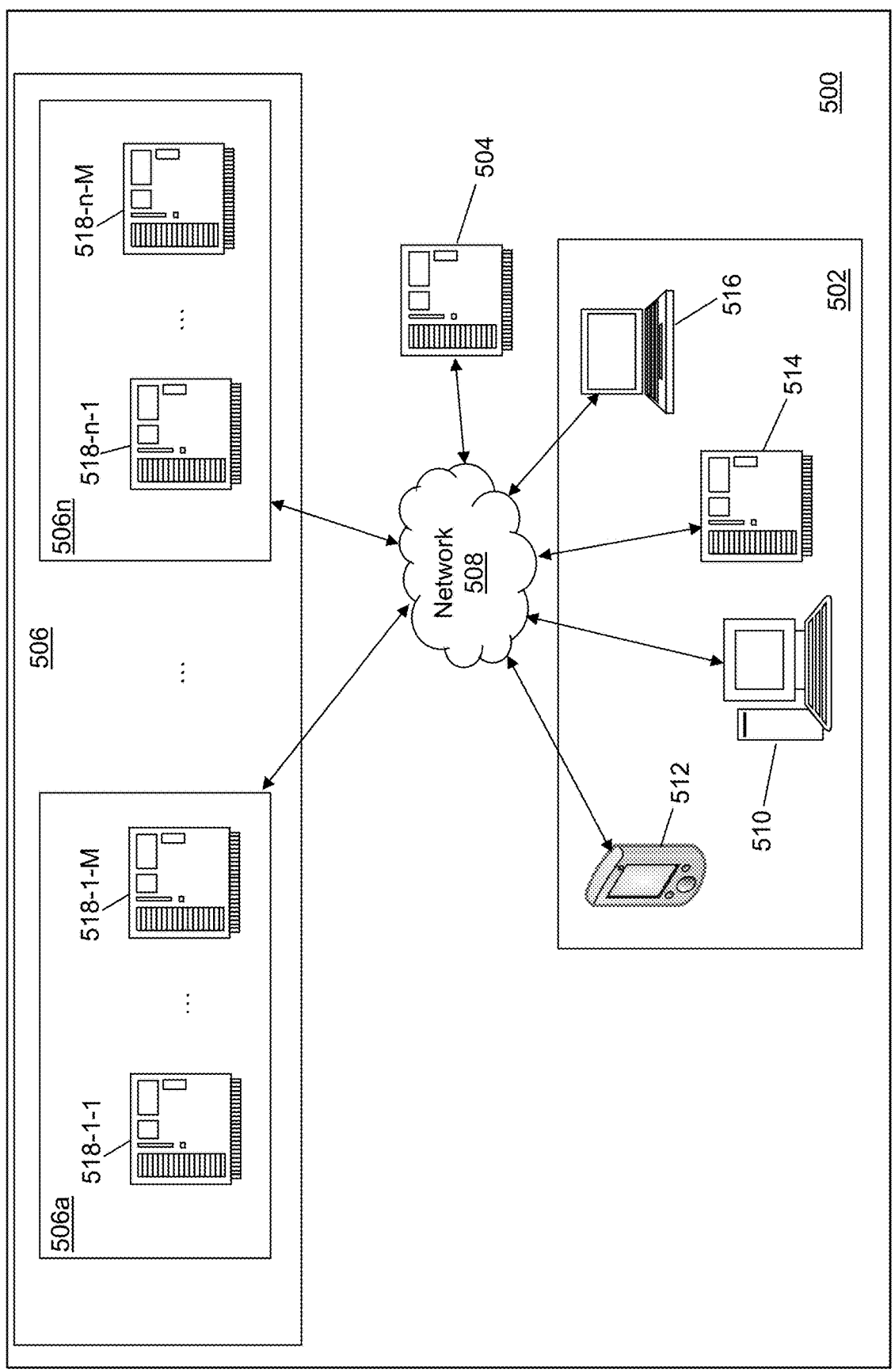
FIG. 5 depicts a block diagram of a classification system in accordance with an illustrative embodiment.

Referring to FIG. 5, a block diagram of a distributed classification system 500 is shown in accordance with an illustrative embodiment. Distributed classification system 500 provides an automated, distributed active machine learning system that jointly minimizes a loss value allowing users to select hyperparameters such as s, m, λ, $λ_1$, $λ_2$, t, h, $α_{weight}$, and/or r automatically.

In an illustrative embodiment, distributed classification system 500 may include a user system 502, a selection manager device 504, a worker system 506, and a network 508. Each of user system 502, selection manager device 504, and worker system 506 may be composed of one or more discrete computing devices in communication through network 508. Alternatively, user system 502, selection manager device 504, and worker system 506 may be integrated into a single computing device capable of computing using a plurality of different threads.

Network 508 may include one or more networks of the same or different types. Network 508 can be any type of wired and/or wireless public or private network including a cellular network, a local area network, a wide area network such as the Internet or the World Wide Web, etc. Network 508 further may comprise sub-networks and consist of any number of communication devices.

The one or more computing devices of user system 502 may include computing devices of any form factor such as a desktop 510, a smart phone 512, a server computer 514, a laptop 516, a personal digital assistant, an integrated messaging device, a tablet computer, etc. User system 502 can include any number and any combination of form factors of computing devices that may be organized into subnets. In general, a "server" computer may include faster processors, additional processors, more disk memory, and/or more RAM than another computer form factor and support multi-threading as understood by a person of skill in the art. The computing devices of user system 502 may send and receive signals through network 508 to/from another of the one or more computing devices of user system 502 and/or to/from selection manager device 504. The one or more computing devices of user system 502 may communicate using various transmission media that may be wired and/or wireless as understood by those skilled in the art. The one or more computing devices of user system 502 may be geographically dispersed from each other and/or co-located.

Figure 6:
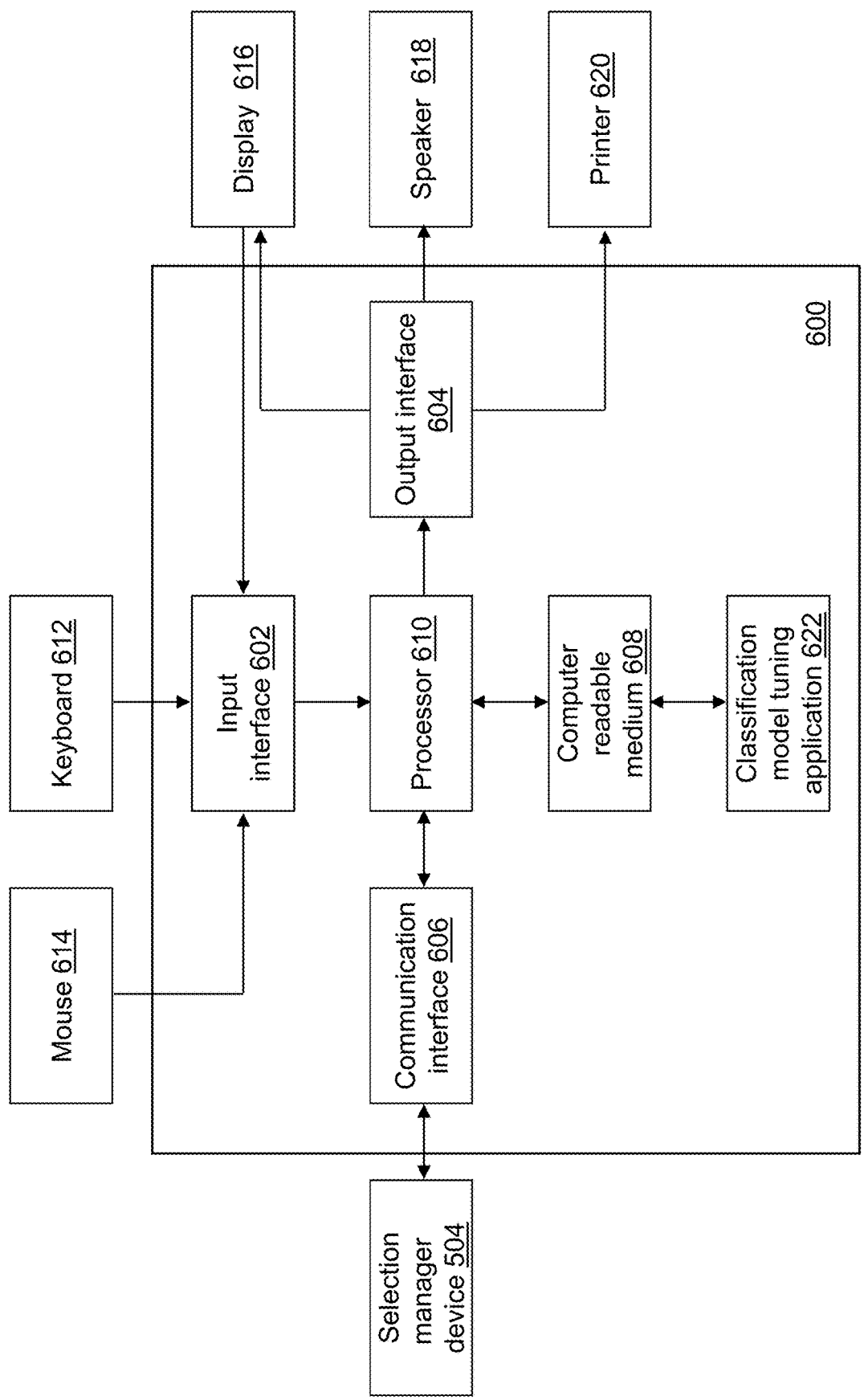
FIG. 6 depicts a block diagram of a user device of the classification system of FIG. 5 in accordance with an illustrative embodiment.

For illustration, referring to FIG. 6, a block diagram of a user device 600 is shown in accordance with an example embodiment. User device 600 is an example computing device of user system 502. For example, each of desktop 510, smart phone 512, server computer 514, and laptop 516 may be an instance of user device 600. User device 600 may include a second input interface 802, a second output interface 804, a second communication interface 806, a second computer-readable medium 808, a second processor 810, and a classification model tuning application 622. Each computing device of user system 502 may be executing classification model tuning application 622 of the same or different type.

Referring again to FIG. 5, selection manager device 504 can include any form factor of computing device. For illustration, FIG. 5 represents selection manager device 504 as a server computer. Selection manager device 504 may send and receive signals through network 508 to/from user system 502 and/or to/from worker system 506. Selection manager device 504 may communicate using various transmission media that may be wired and/or wireless as understood by those skilled in the art. Selection manager device 504 may be implemented on a plurality of computing devices of the same or different type. Distributed classification system 500 further may include a plurality of selection manager devices.

For illustration, referring to FIG. 6, a block diagram of selection manager device 504 is shown in accordance with an illustrative embodiment. Selection manager device 504 may include a third input interface 702, a third output interface 704, a third communication interface 706, a third computer-readable medium 708, a third processor 710, a selection manager application 712, an evaluation list 714, model data 716, and selected model data 718. Evaluation list 714, model data 716, and selected model data 718 are created from results generated by worker system 506. Evaluation list 714 allows the hyperparameter tuning process to remain efficient by only evaluating "close" points once. Evaluation list 714 may be stored in memory using various data structures such as a list, an array, a tree, etc. For example, evaluation list 714 may be stored as a splay tree so that the points that are most recently added are near the root of the tree for faster searching.

Referring again to FIG. 5, the one or more computing devices of worker system 506 may include computers of any form factor that may be organized into one or more sessions, where a number of the one or more sessions is indicated by $N_s$. Worker system 506 may include a number of computing devices indicated by $N_w$. Worker system 506 may include computers of other form factors such as a desktop or a laptop, etc. Worker system 506 can include any number and any combination of form factors of computing devices organized into any number of sessions. For example, in the illustrative embodiment, worker system 506 includes a first worker session 506a, . . . , and an $N_s^{th}$ worker session 506n. Each session may include one or more computing devices, where a number of session computing devices in each session is indicated by M. In the illustrative embodiment, first worker session 506a may include a first computing device 518-1-1, . . . , and an $M^{th}$ computing device 518-1-M, and $N_s^{th}$ worker session 506n may include a first computing device 518-n-1, . . . , and an $M^{th}$ computing device 518-n-M. The number of computing devices indicated by $N_w$ may or may not also include selection manager device 504. A number of threads may be associated with each computing device of worker system 506.

The computing devices of worker system 506 may send and receive signals through network 508 to/from selection manager device 504 and/or to/from user system 502 and/or to/from another computing device of worker system 506. The one or more computing devices of worker system 506 may be geographically dispersed from each other and/or co-located. The one or more computing devices of worker system 506 may communicate using various transmission media that may be wired and/or wireless as understood by those skilled in the art.

Figure 8A:
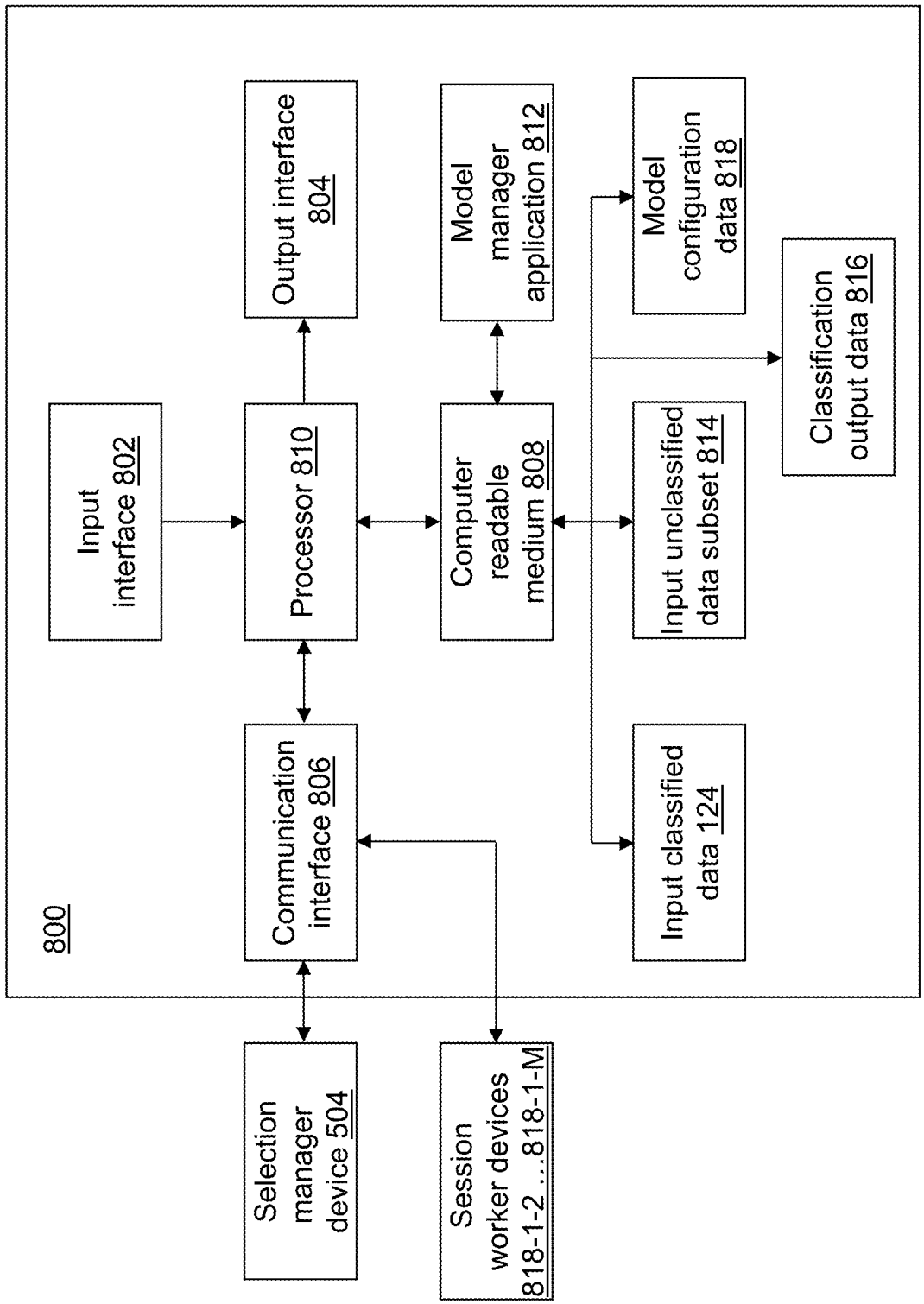
FIG. 8A depicts a block diagram of a session manager device of the classification system of FIG. 5 in accordance with an illustrative embodiment.

For illustration, referring to FIG. 8A, a block diagram of a session manager device 800 is shown in accordance with an example embodiment. Session manager device 800 is an example computing device selected from each session of worker system 506. For example, a first computing device of each session, such as first computing device 518-1-1 of first worker session 506a and first computing device 518-n-1 of $N_s^{th}$ worker session 506n may be an instance of session manager device 800. In the illustrative embodiment of FIG. 8A, session manager device 800 is the session manager device for first worker session 506a and may be referred to as first computing device 518-1-1 that communicates with second computing device 518-1-2, . . . , and $M^{th}$ computing device 518-1-M. Session manager device 800 may include a fourth input interface 802, a fourth output interface 804, a fourth communication interface 806, a fourth computer-readable medium 808, a fourth processor 810, a model manager application 812, input classified data 124, an input unclassified data subset 814, classification output data 816, and model configuration data 818.

Figure 8B:
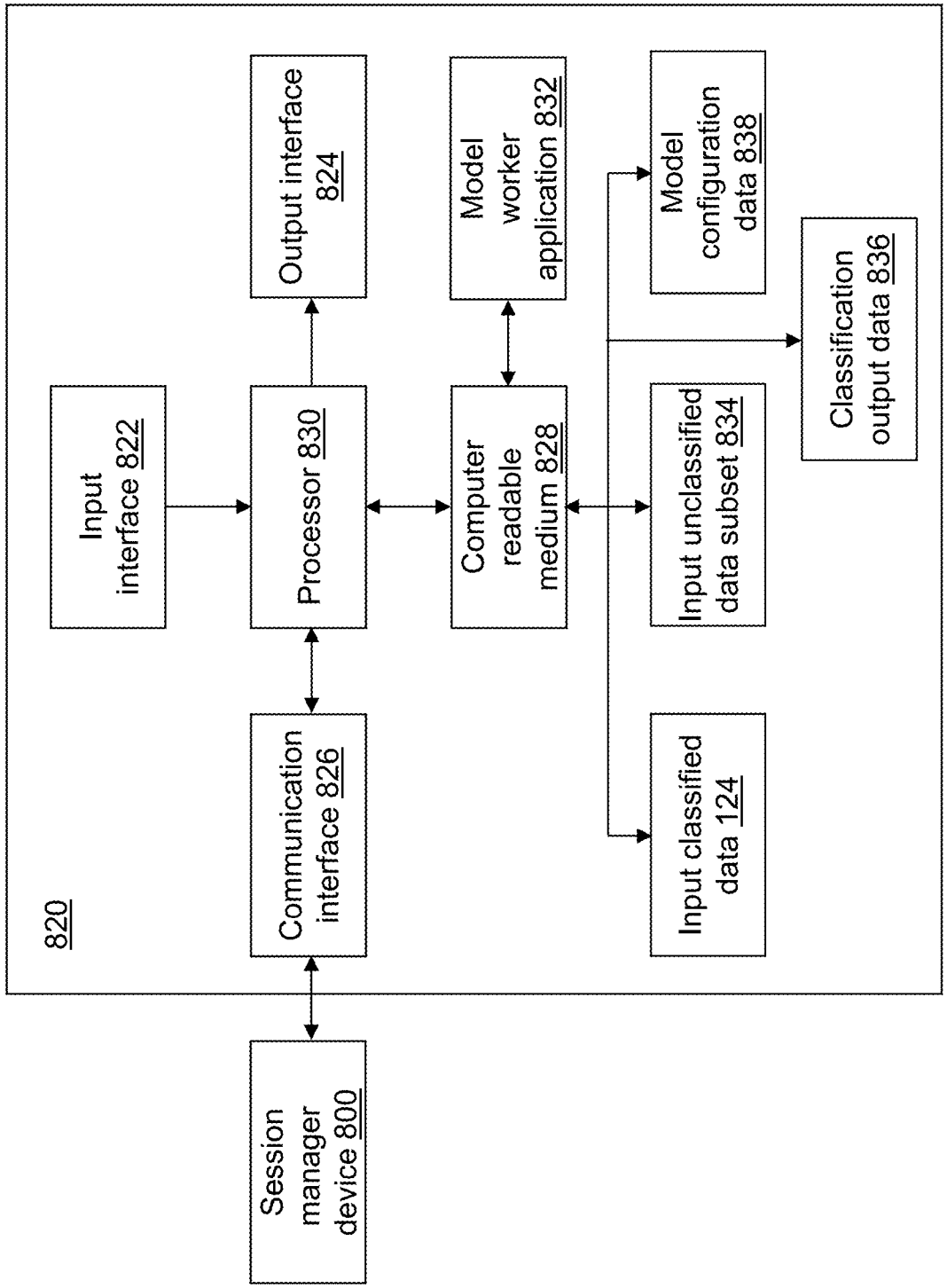
FIG. 8B depicts a block diagram of a session worker device of the classification system of FIG. 5 in accordance with an illustrative embodiment.

For illustration, referring to FIG. 8B, a block diagram of a session worker device 820 is shown in accordance with an example embodiment. Session worker device 820 is an example worker computing device of each session of worker system 506 excluding each session manager device 800. For example, remaining computing devices of each session, such as second computing device 518-1-2, . . . , and $M^{th}$ computing device 518-1-M of first worker session 506a and second computing device 518-n-2, . . . , and $M^{th}$ computing device 518-n-M of $N_s^{th}$ worker session 506n, may each be an instance of session worker device 820. Session worker device 820 may include a fifth input interface 822, a fifth output interface 824, a fifth communication interface 826, a fifth computer-readable medium 828, a fifth processor 830, a model worker application 832, input classified data 124, an input unclassified data subset 834, classification output data 836, and model configuration data 838.

In some implementations, a distributed solution allows applications of big data. For example, scalability is provided with a distributed solution. A copy of input classified data 124 may be sent to each computing device of worker system 506. Because input unclassified data 126 may need to be distributed across a plurality of computing devices, each session may include a plurality of computing devices with one of the computing devices acting as the session manager and referred to as session manager device 800. Input unclassified data 126 first may be distributed into data subsets at each computing device included in a respective session, with each session distributing input unclassified data 126 in a similar manner among its computing devices. For example, if first worker session 106a includes three computing devices, input unclassified data 126 is distributed to each computing device of first worker session 106a that may or may not include a first session manager device 800a of first worker session 506a. $N_s^{th}$ worker session 506n similarly distributes input unclassified data 126 among the computing devices of nth worker session 506n.

Evaluation list 714, model data 716, and selected model data 718 are created from results generated by worker system 506 executing model manager application 812 with input classified data 124 and input unclassified data subset 834. Model manager application 812 may coordinate generation of the classification model using model worker application 832 executing at the one or more session worker devices 620 assigned to the session with input classified data 124 and their allocated subset of input unclassified data 126 designated as input unclassified data subset 834. Session manager device 800 may or may not include input classified data 124 and a portion of input unclassified data 126 divided into input unclassified data subset 814. For example, session manager device 800 may coordinate the distribution of input unclassified data 126 with or without storing a portion of input unclassified data 126 on fourth computer-readable medium 808.

Referring again to FIG. 6, each user device 600 of user system 502 may include the same or different components and combination of components. Fewer, different, and additional components may be incorporated into user device 600. Second input interface 802 provides the same or similar functionality as that described with reference to input interface 102 of classification device 100 though referring to user device 600. Second output interface 804 provides the same or similar functionality as that described with reference to output interface 104 of classification device 100 though referring to user device 600. Second communication interface 806 provides the same or similar functionality as that described with reference to communication interface 106 of classification device 100 though referring to user device 600. Data and messages may be transferred between selection manager device 504 and user device 600 using second communication interface 806. Second computer-readable medium 608 provides the same or similar functionality as that described with reference to computer-readable medium 108 of classification device 100 though referring to user device 600. Second processor 810 provides the same or similar functionality as that described with reference to processor 110 of classification device 100 though referring to user device 600

Classification model tuning application 622 performs operations associated with selecting a hyperparameter configuration for a classification model where the hyperparameter configuration defines a value for each hyperparameter used to train the classification model. The operations may be implemented using hardware, firmware, software, or any combination of these methods. Referring to the example embodiment of FIG. 6, classification model tuning application 622 is implemented in software (comprised of computer-readable and/or computer-executable instructions) stored in second computer-readable medium 608 and accessible by second processor 610 for execution of the instructions that embody the operations of classification model tuning application 622. Classification model tuning application 622 may be written using one or more programming languages, assembly languages, scripting languages, etc. Classification model tuning application 622 may be implemented as a Web application.

Figure 7:
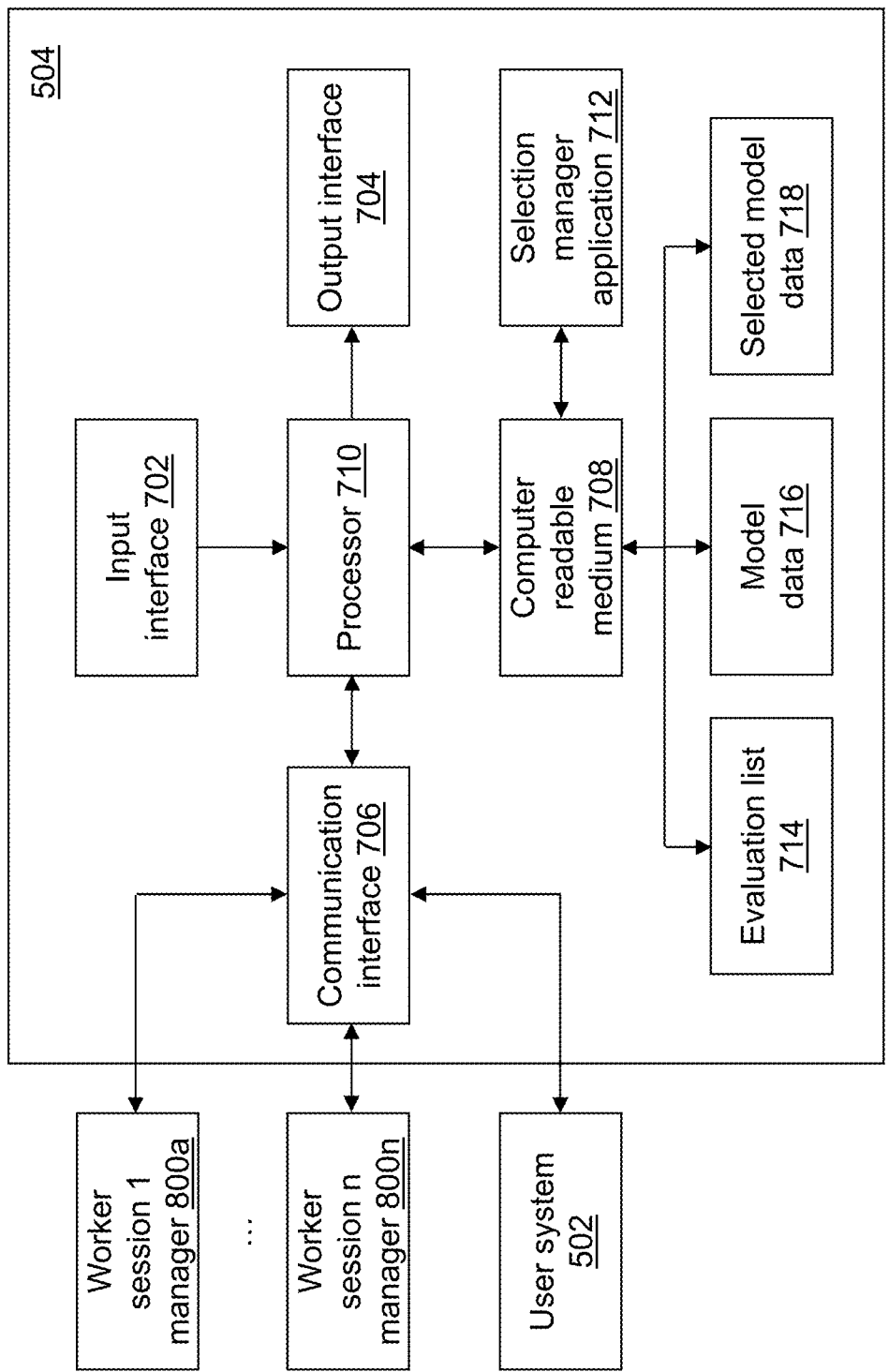
FIG. 7 depicts a block diagram of a selection manager device of the classification system of FIG. 5 in accordance with an illustrative embodiment.

Referring again to FIG. 7, fewer, different, or additional components may be incorporated into selection manager device 504. Third input interface 702 provides the same or similar functionality as that described with reference to input interface 102 of classification device 100 though referring to selection manager device 504. Third output interface 704 provides the same or similar functionality as that described with reference to output interface 104 of classification device 100 though referring to selection manager device 504. Third communication interface 706 provides the same or similar functionality as that described with reference to communication interface 106 of classification device 100 though referring to selection manager device 504. Data and messages may be transferred between selection manager device 504 and/or user device 600 and session manager device 800 using third communication interface 706. Third computer-readable medium 708 provides the same or similar functionality as that described with reference to computer-readable medium 108 of classification device 100 though referring to selection manager device 504. Third processor 710 provides the same or similar functionality as that described with reference to processor 110 of classification device 100 though referring to selection manager device 504.

Selection manager application 712 performs operations associated with selecting sets of hyperparameter configurations to evaluate based on inputs provided by user device 600. Selection manager application 712 requests that the computing devices of worker system 506 generate a trained classification model for each hyperparameter configuration in the selected sets of hyperparameter configurations. The operations may be implemented using hardware, firmware, software, or any combination of these methods. Referring to the example embodiment of FIG. 7, selection manager application 712 is implemented in software (comprised of computer-readable and/or computer-executable instructions) stored in third computer-readable medium 708 and accessible by third processor 710 for execution of the instructions that embody the operations of selection manager application 712. Selection manager application 712 may be written using one or more programming languages, assembly languages, scripting languages, etc. Selection manager application 712 may be implemented as a Web application.

Referring again to FIG. 8A, fewer, different, and additional components may be incorporated into session manager device 800. Each session manager device 800 of each session of worker system 506 may include the same or different components or combination of components.

Fourth input interface 802 provides the same or similar functionality as that described with reference to input interface 102 of classification device 100 though referring to session manager device 800. Fourth output interface 804 provides the same or similar functionality as that described with reference to output interface 104 of classification device 100 though referring to session manager device 800. Fourth communication interface 806 provides the same or similar functionality as that described with reference to communication interface 106 of classification device 100 though referring to session manager device 800. Data and messages may be transferred between session manager device 800 and session worker device 820 using fourth communication interface 806. Fourth computer-readable medium 808 provides the same or similar functionality as that described with reference to computer-readable medium 108 of classification device 100 though referring to session manager device 800. Fourth processor 810 provides the same or similar functionality as that described with reference to processor 110 of classification device 100 though referring to session manager device 800.

Referring again to FIG. 8B, fewer, different, and additional components may be incorporated into session worker device 820. Each session worker device 820 of each session of worker system 506 may include the same or different components or combination of components.

Fifth input interface 822 provides the same or similar functionality as that described with reference to input interface 102 of classification device 100 though referring to session worker device 820. Fifth output interface 824 provides the same or similar functionality as that described with reference to output interface 104 of classification device 100 though referring to session worker device 820. Fifth communication interface 826 provides the same or similar functionality as that described with reference to communication interface 106 of classification device 100 though referring to session worker device 820. Data and messages may be transferred between session manager device 800 and session worker device 820 using fifth communication interface 826. Fifth computer-readable medium 828 provides the same or similar functionality as that described with reference to computer-readable medium 108 of classification device 100 though referring to session worker device 820. Fifth processor 830 provides the same or similar functionality as that described with reference to processor 110 of classification device 100 though referring to session worker device 820.

Model worker application 832 may be integrated with other analytic tools and may be integrated with model manager application 812 to generate a classification model using input classified data 124 and input unclassified data 126 distributed across the worker computing devices of each session. Classification model tuning application 622, selection manager application 712, model manager application 812, and/or model worker application 832 may be the same or different applications that are integrated in various manners to select a hyperparameter configuration for a classification model using input classified data 124 and input unclassified data 126 in a single computing device or a plurality of distributed computing devices. As an example, classification model tuning application 622, selection manager application 712, model manager application 812, and/or model worker application 832 may be integrated in a single computing device such as classification device 100. Classification model tuning application 622, selection manager application 712, model manager application 812, and/or model worker application 832 further may be part of an integrated data analytics software application and/or software architecture such as that offered by SAS Institute Inc. of Cary, N.C., USA. For example, classification model tuning application 622, selection manager application 712, model manager application 812, and/or model worker application 832 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, classification model tuning application 622, selection manager application 712, model manager application 812, and/or model worker application 832 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Classification model tuning application 622, selection manager application 712, model manager application 812, and/or model worker application 832 may be used in a variety of industries. For example, a classification model trained using classification model tuning application 622, selection manager application 712, model manager application 812, and/or model worker application 832 may be used to recognize text, text meaning, a voice, speech, to recognize characteristics of images such as medical images, equipment diagnostic images, terrain images, etc., to recognize types of web pages, to predict whether an event has occurred, such as an equipment failure, to classify a microarray gene expression, etc. Classification model tuning application 622, selection manager application 712, model manager application 812, and/or model worker application 832 may automatically process data generated as part of operation of an enterprise, facility, system, device, etc., to classify the data and possibly provide a warning or alert associated with the classification using, for example, second input interface 802, second output interface 804, and/or second communication interface 806 so that appropriate action can be initiated in response to the labeling, recognition, or classification. For example, medical images that include a tumor may be recognized in input unclassified data 126 that triggers the sending of a notification message to a clinician that a tumor has been identified based on a "tumor" label determined for the image data.

Figure 9A:
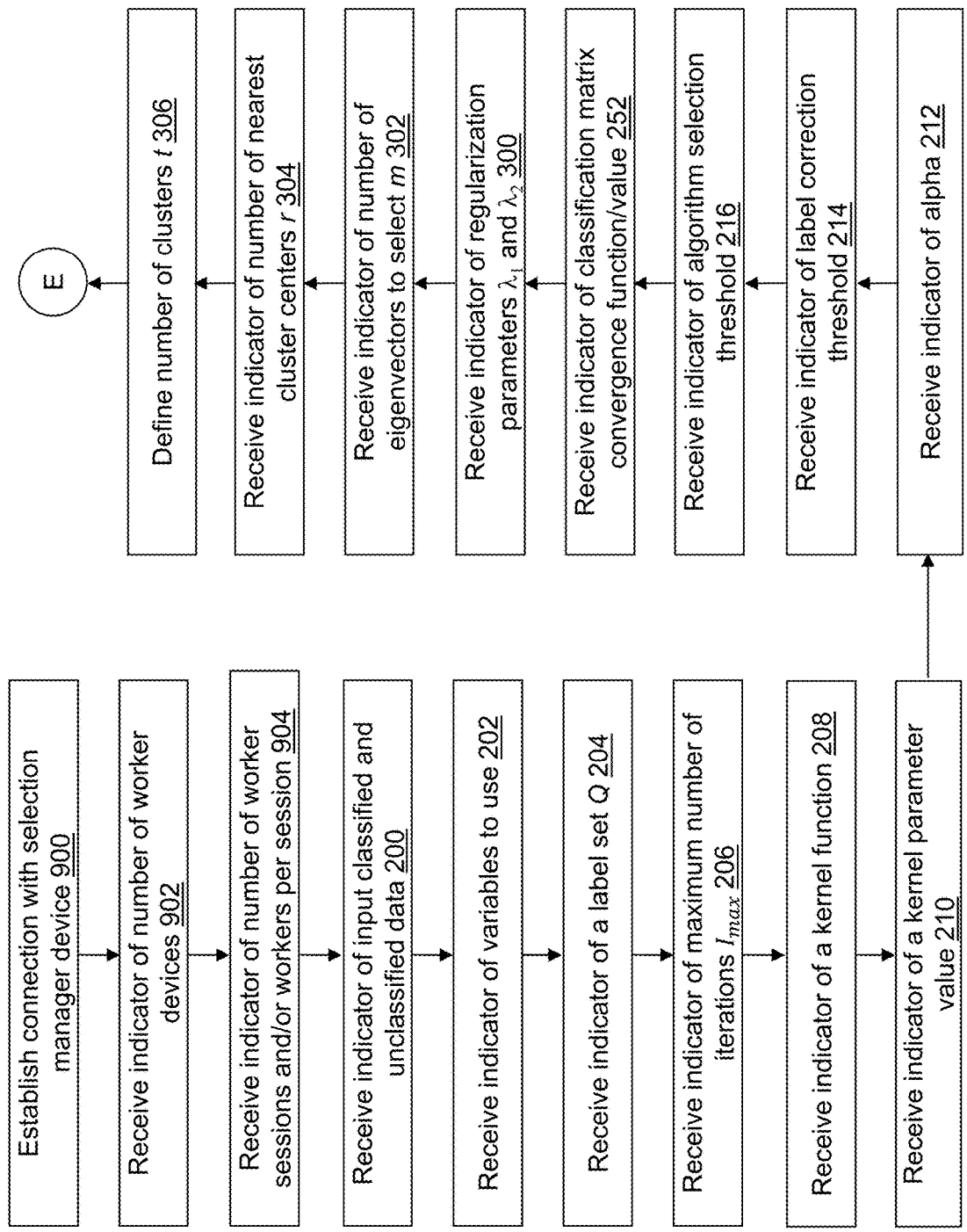
FIGS. 9A and 9B depict a flow diagram illustrating examples of operations performed by the user device of FIG. 6 in accordance with an illustrative embodiment.
Figure 9B:
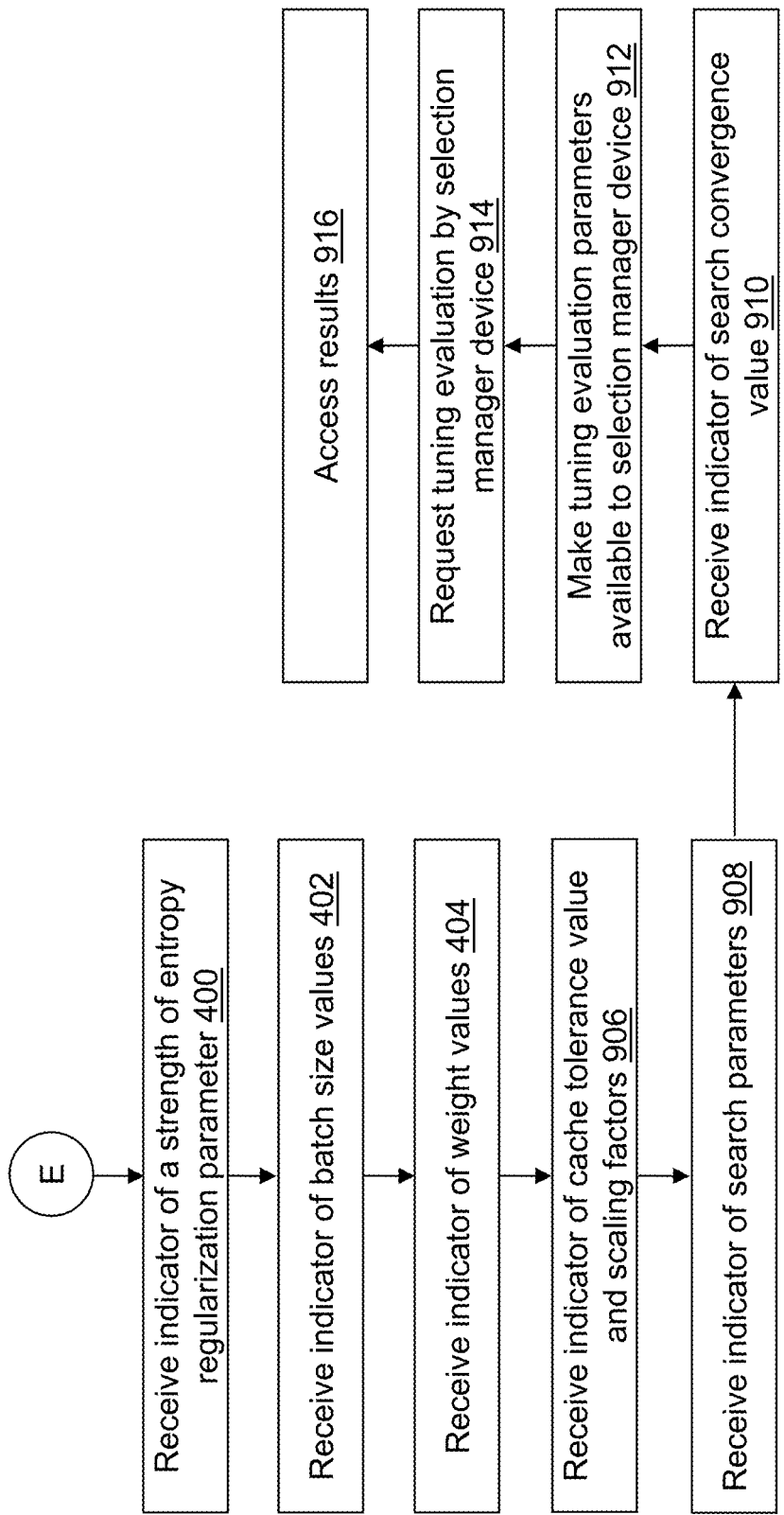

Referring to FIGS. 9A and 9B, example operations associated with classification model tuning application 622 are described. Additional, fewer, or different operations may be performed depending on the embodiment. The order of presentation of the operations of FIGS. 9A and 9B is not intended to be limiting. A user can interact with one or more user interface windows presented to the user in display 616 under control of classification model tuning application 622 independently or through a browser application in an order selectable by the user. Although some of the operational flows are presented in sequence, the various operations may be performed in various repetitions, concurrently, and/or in other orders than those that are illustrated. For example, a user may execute classification model tuning application 622, which causes presentation of a first user interface window, which may include a plurality of menus and selectors such as drop-down menus, buttons, text boxes, hyperlinks, etc. associated with classification model tuning application 622 as understood by a person of skill in the art.

In an operation 900, a connection is established with selection manager device 504. User device 600 accepts commands from a user and relays necessary instructions to selection manager device 504.

In an operation 902, a seventeenth indicator may be received that indicates a value of $N_w$ the number of computing devices or nodes of worker system 506 that may include selection manager device 504 (for example, the same or another indicator may indicate whether to include selection manager device 504 or it may or may not be included by default). The seventeenth indicator may further indicate whether selection manager device 504 is configured in a single-machine mode or a distributed mode. In an alternative embodiment, the seventeenth indicator may not be received. For example, a default value may be stored, for example, in second computer-readable medium 608 and used automatically. In another alternative embodiment, $N_w$ may not be selectable. Instead, a fixed, predefined value may be used. The value further may be automatically determined based on a number of computing devices connected to selection manager device 504.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 504. More simply, single-machine mode means multithreading on selection manager device 504. Single-machine mode uses the number of CPUs (cores) on selection manager device 504 to determine the number of concurrent threads. For example, one thread per core may be used though a number of threads on any computing device may be changed under control of the user. A grid host may be specified for a distributed mode and identify a domain name system (DNS) or IP address of selection manager device 504, when selection manager device 504 is a separate device from user device 600.

In an operation 904, an eighteenth indicator may be received that indicates the value of $N_s$ the number of the one or more sessions and/or the value of M the number of computing devices included in each session. Within each session, each computing device of that session may also use multiple threads. In an alternative embodiment, the eighteenth indicator may not be received. For example, default values may be stored, for example, in second computer-readable medium 608 and used automatically. In another alternative embodiment, M or $N_s$ may not be selectable. Instead, a fixed, predefined value may be used. The value(s) further may be automatically determined based on W and other criteria as described further below such that the user does not specify either or only one of $N_s$ the number of the one or more sessions and M the number of computing devices included in each session.

Similar to classification device 100, user device 600 may request values to define the various input parameters/hyperparameters of operations 200 through 216, 252, 300 through 306, and 400 through 404. One or more values may be input for each hyperparameter such as the Gaussian bandwidth parameter s, the number of eigenvectors to select m, first regularization parameter $\lambda_1$, second regularization parameter $\lambda_2$, the number of clusters t, the number of nearest cluster centers r, number of nearest neighbors k, batch size value h, and/or weight value $\alpha_{weight}$. The one or more values for each hyperparameter may be used to search for optimum hyperparameter values by selection manager device 504. For example, one or more values for s may be received. Alternatively, one or more default values for s may be stored, for example, in second computer-readable medium 608 and used automatically. In another alternative embodiment, the one or more values of s may not be selectable. Instead, one or more fixed, predefined values may be used. The one or more values of s may be defined in various manners such as using a list of possible values or using a minimum s value, a maximum s value, and an s step value. For example, a list of s values may be created that includes the minimum s value and each subsequent value adding the s step value up to and including the maximum s value.

In an operation 906, a nineteenth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the nineteenth indicator may not be received. For example, default value may be stored, for example, in second computer-readable medium 608 and used automatically. An illustrative default value for the cache tolerance value is 1.0e-9. An illustrative default value for the scaling factor value for each hyperparameter is one. In another alternative embodiment, the cache tolerance value and the scaling factor value for each hyperparameter may not be selectable. Instead, fixed, predefined values may be used.

In an operation 908, a twentieth indicator may be received that defines values for one or more search parameters associated with a tuning search method. For example, a maximum number of configuration evaluations $n_b$, a population size $n_p$, a number of centers $n_c < n_p$, an initial step size value Δ, and/or a decrease criterion value β∈(0,1), etc. may be defined by the twentieth indicator. The tuning search method may be "LHS+GA/GSS" in which a Latin hypercube sampling (LHS) search method is used to generate a first set of hyperparameter configurations that are each executed to generate a cost function value. The cost function values and the hyperparameter configuration associated with each are used to initialize a genetic algorithm (GA). Each population of the GA search method may be enhanced with a "growth step" in which a genetic set search (GSS) search method is used to locally improve some of the more promising members of the GA population.

For illustration, the LHS search method generates uniform hyperparameter values across the range of each the one or more values of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameters are modified to temporarily fix integer hyperparameters to their current setting. These additional growth steps may be performed each iteration to permit selected hyperparameter configurations of the population (based on diversity and fitness) to benefit from local optimization over the continuous variables.

In an operation 910, a twenty-first indicator of a search convergence value $c_s$ may be received. For illustration, a convergence criterion may be that a total sum of a difference between the hyperparameters selected in two adjacent iterations is smaller than search convergence value $C_s$. In an alternative embodiment, the twenty-first indicator may not be received. For example, a default value may be stored, for example, in second computer-readable medium 608 and used automatically when the twenty-first indicator is not received. In an alternative embodiment, the search convergence value $C_s$ may not be selectable. Instead, a fixed, predefined value may be used. Merely for illustration, the search convergence value $C_s=0.1$ may be used as a default value.

In an operation 912, the tuning evaluation parameters that may include the parameters indicated in operations 902 through 908 and 200 through 216, 252, 300 through 306, and 400 through 404 are made available to selection manager device 504. For example, the values of any of the parameters that are not default values may be sent to selection manager device 504. As another option, a location of the values of any of the parameters that are not default values may be sent to selection manager device 504. As still another option, a location of the values of any of the parameters that are not default values may be provided to selection manager device 504 in a computer memory location that is known to selection manager device 504.

In an operation 914, a tuning evaluation to select hyperparameters is requested of selection manager device 504 using the tuning evaluation parameters.

In an operation 916, tuning evaluation results are accessed. For example, an indicator may be received that indicates that the tuning process is complete. For example, one or more output tables may be presented on second display 616 when the tuning process is complete. As another option, second display 616 may present a statement indicating that the tuning process is complete. The user can access the output tables in the specified location. For example, the user can select the hyperparameters included in a "Best Configuration" output table.

Referring to FIGS. 10A through 10D, example operations associated with selection manager application 712 are described. Additional, fewer, or different operations may be performed depending on the embodiment. The order of presentation of the operations of FIGS. 10A through 10D is not intended to be limiting. Selection manager device 504 establishes communication with the computing devices of worker system 506, sends instructions to each session manager device 800 associated with each session established by selection manager device 504, collects and aggregates the results of computations from each session, and communicates final results to user device 600. Selection manager device 504 may utilize itself as a worker computing device of worker system 506. The computing devices of worker system 506 receive instructions from selection manager device 504, store and process data, and send the results of computations back to selection manager device 504 under control of session manager device 800 associated with each session. The worker computing devices of each session may also communicate to each other directly to complete tasks.

In an operation 1000, tuning evaluation parameters obtained by classification model tuning application 622 are accessed. For example, values for parameters indicated in operations 902 through 908 and 200 through 216, 252, 300 through 306, and 400 through 404 and made available to selection manager device 504 in operation 710 are accessed based on the provision method.

In an operation 1001, the number of workers per session M and the number of sessions $N_s$ are determined. For example, when the second indicator specifies $N_s$, that value is used for the number of sessions, or when the second indicator specifies M, that value is used for the number of workers per session. If $N_w$ is equal to all of the workers that are connected to selection manager device 504 and there are at least 16 worker computing devices included in worker system 506, $N_s$ may be limited to eight so that the number of workers per session M is at least two. 902

Optionally, the nineteenth indicator may indicate that M is set based on a size of input classified data 124 and input unclassified data 126. For example, M may be set based on a number of rows $N_r$ and a number of columns $N_c$ of input classified data 124 and input unclassified data 126 and a distribution factor d. For illustration, $M=1+N_rN_cd$. An illustrative value of $d=2e^{-8}$ may be used so that another session worker device 820 is added to each session for every 50 million data values. The value of d may be selected by a user of user device 600. The number of columns $N_v$ further may be the number of variables to use instead of a total number of columns. The number of rows $N_r$ further may be the number of rows included in input unclassified data 126.

$N_s$ may be determined as either one less than a population size specified for the GA tuning search method because one hyperparameter configuration is carried forward each iteration. The best point is carried forward so that if the next iteration does not find an improvement, the returned set of evaluations still includes the current best for consideration in generating the next iteration of hyperparameter configurations. For the GSS tuning search method, twice the number of hyperparameters is added to the value of N. For the LHS tuning search method, M is determined as one less than a sample size. $N_s$ may then be limited by a configuration of selection manager device 504. When selection manager device 504 is configured in single-machine mode and $N_s$ is greater than four and not specified by the nineteenth indicator, $N_s$ is limited to four. When selection manager device 504 is configured in single-machine mode and $N_s$ is specified by the nineteenth indicator, $N_s$ may be limited to 32 or a number of threads of selection manager device 504. When selection manager device 504 is configured in distributed mode, and $N_s$ is not specified by the nineteenth indicator, $N_s \leq N_w/M$ may be used. When selection manager device 504 is configured in distributed mode and M is specified by the nineteenth indicator, $N_s \leq 2N_w/M$ may be applied.

For illustration, if a population size specified for a GA search method is ten, even if $N_w=100$ and $M=2$ based on a size of input classified data 124 and input unclassified data 126, $N_s=10$ instead of $N_s=50$ because the GA population size (number of hyperparameter configurations created each iteration by the GA search method) limits the number of hyperparameter configurations created each iteration.

When $N_s$ is greater than one and M is equal to one, selection manager application 712 is executed in a model parallel mode; when M is greater than one and $N_s$ is equal to one, selection manager application 712 is executed in a data parallel mode; and when both M and $N_s$ are greater than one, selection manager application 712 is executed in a data and model parallel mode. In an automatic mode, $N_s$ may be selected to be as large as possible with M as small as possible subject to the size of input classified data 124 and input unclassified data 126 because model parallel is more efficient than data parallel.

In an operation 1002, the number of sessions $N_s$ are created to include the number of workers per session M with session manager device 800 selected for each created session. Input unclassified data 126 is randomly allocated to each session to define input unclassified data subset 814 and/or input unclassified data subset 834. A copy of input classified data 124 is provided to each session as well.

In an operation 1003, a thread is allocated from an available thread pool to each created session. The allocated threads each manage the communications between selection manager device 504 and each session manager device 800.

In an operation 1004, a data structure is created for each session through which each session is notified of the hyperparameter values for the assigned hyperparameter configuration, etc. A hyperparameter configuration includes a value for each hyperparameter such as a value for each of the Gaussian bandwidth parameter s, the number of eigenvectors to select m, first regularization parameter $\lambda_1$, second regularization parameter $\lambda_2$, the number of clusters t, the number of nearest cluster centers r, number of nearest neighbors k, batch size value h, and/or weight value $\alpha_{weight}$. An illustrative data structure includes a thread identifier that links the data structure to each thread, a session handle for the thread, a parameter list, the hyperparameter configuration assigned to the thread, a completion indicator, etc. The session handle contains information about the session that was started in a new process to run actions.

Figure 11A:
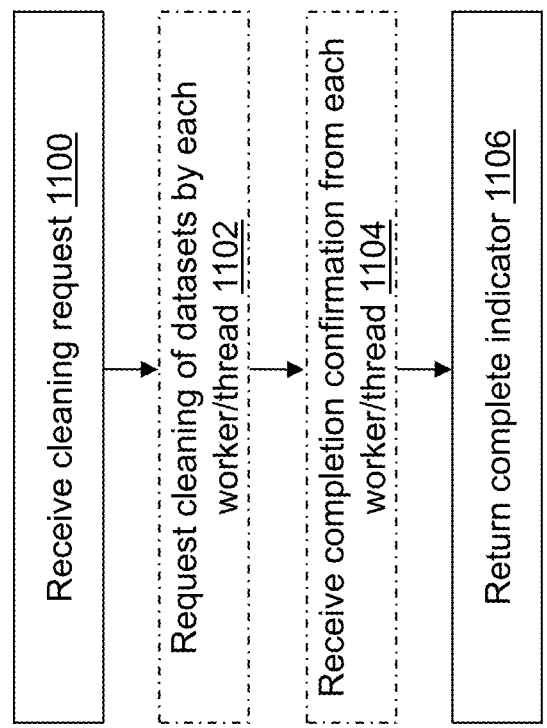
FIGS. 11A to 11C depict a flow diagram illustrating examples of operations performed by the session manager device of FIG. 8A in accordance with an illustrative embodiment.

In an operation 1005, each session is requested to clean input classified data 124 and input unclassified data subset 814 and/or input unclassified data subset 834. FIG. 11A describes the operations performed by each session in response to the cleaning request. Session manager device 800 may set the completion indicator to indicate done in the data structure associated with it.

In an operation 1006, a session of the number of sessions $N_s$ is selected to perform a determination of the semi-supervised classification algorithm to execute.

Figure 11B:
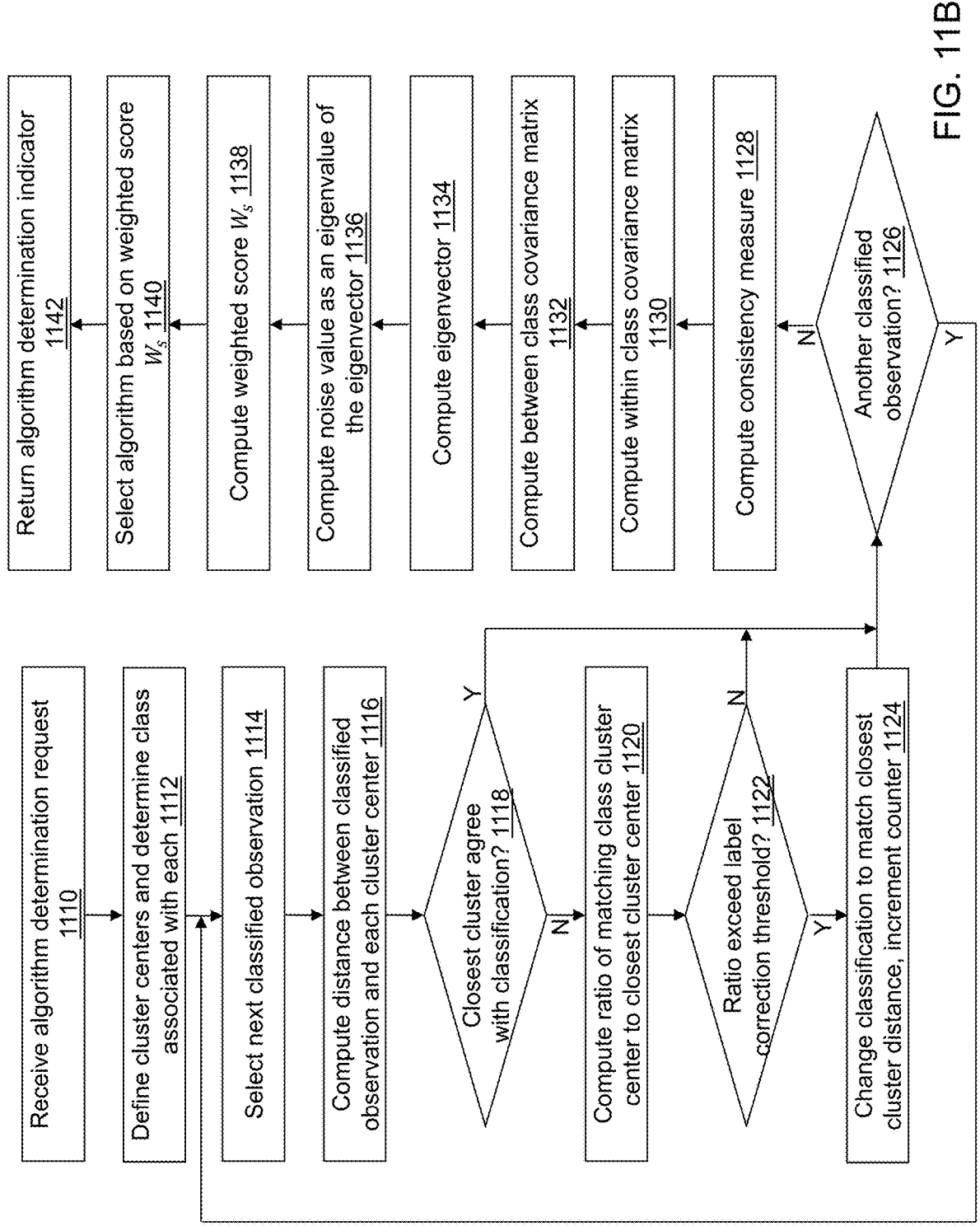

In an operation 1007, the selected session is requested to determine the semi-supervised classification algorithm to execute in a manner similar to that described in operations 218 through 252 though with input unclassified data 126 distributed into input unclassified data subset 814 and/or input unclassified data subset 834. FIG. 11B describes the operations performed the selected session in response to the request to determine the semi-supervised classification algorithm to execute.

In an operation 1008, an indicator of the semi-supervised classification algorithm to execute is accessed. For example, a name of the semi-supervised classification algorithm such as "noise robust SSL" (NRSSL) or "label spreading SSL" (LSSSL) may be accessed using the data structure. Session manager device 800 of the selected session may set the completion indicator to indicate done in the data structure associated with it.

In an operation 1009, the first configuration list is defined using LHS and its associated parameters. The first configuration list includes a plurality of hyperparameter configurations where each hyperparameter configuration includes a value for each hyperparameter to evaluate $\{s, m, \lambda_1, \lambda_2, t, r\}$ when the semi-supervised classification algorithm NRSSL is indicated or $\{s, h, \alpha_{weight}\}$ when the semi-supervised classification algorithm LSSSL is indicated. The hyperparameters may further include any additional parameters used by the kernel function selected such as number of nearest neighbors k when the KNN kernel function is selected. A set of hyperparameter configurations includes a plurality of hyperparameter configurations selected for evaluation before a next set of hyperparameter configurations is selected for evaluation based on the tuning search method and the cost function values computed for each hyperparameter configuration.

In an operation 1010, a single configuration is selected from the first configuration list and assigned to each created session by loading the values in the data structure associated with the selected session. Depending on the number of created sessions $N_s$ relative to the number of configurations included on the first configuration list, all of the configurations defined in the first configuration list may be assigned or less than all of the configurations may be assigned.

Figure 11C:
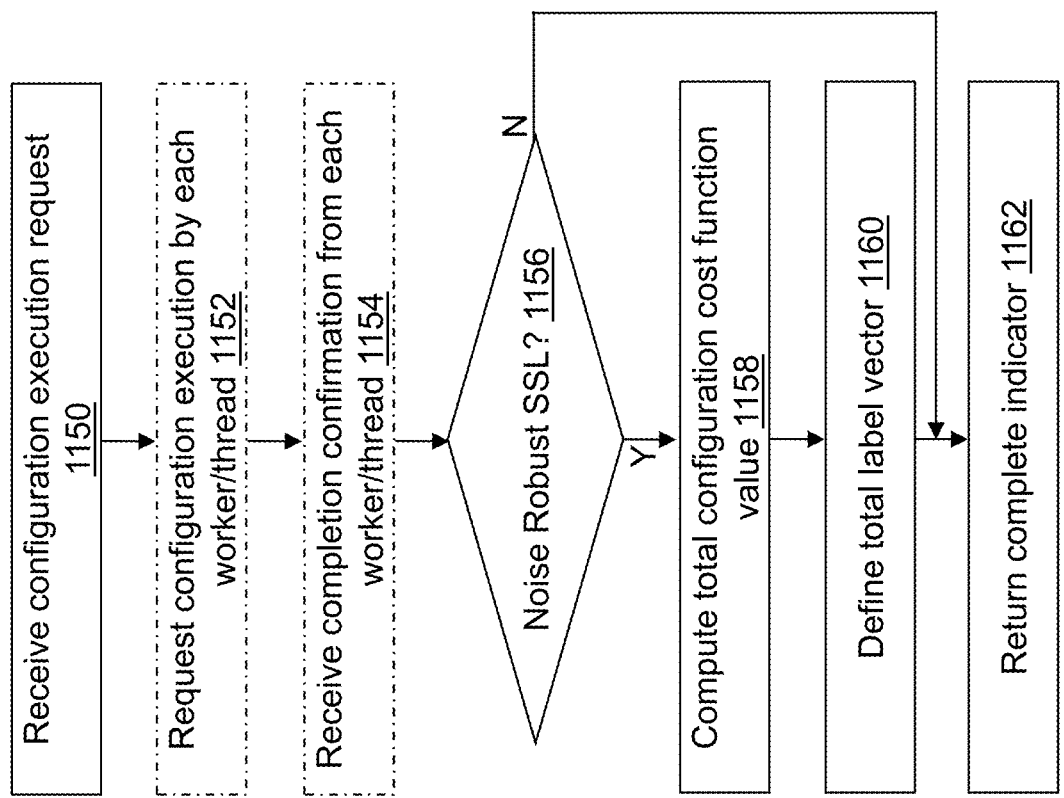

In an operation 1011, each session is requested to execute its assigned hyperparameter configuration based on the parameter values in the data structure. The handle to the session process stored in the data structure associated with the selected session may be used to make this request or call. FIG. 11C describes the operations performed by each session in response to the request configuration execution request.

In an operation 1012, a determination is made concerning whether any execution is done. For example, session manager device 800 may set the completion indicator to indicate done in the data structure associated with it. If no execution is done, processing continues in operation 1012 until indication that a session is done is received. If any execution is done, processing continues in an operation 1013. For illustration, selection manager device 504 loops through each of its thread handles, checking to see if that particular thread is busy or free. When a session finishes evaluating its assigned hyperparameter configuration, session manager device 800 returns the computed values back to selection manager device 504 and sets its completion indicator indicating that it is free to receive a new hyperparameter configuration for evaluation.

In operation 1013, results from the configuration execution are accessed in association with the set of hyperparameter values defined in the configuration assigned to the session that has completed its computations. For example, a cost function value C and label vector Y may be accessed using the data structure when the semi-supervised classification algorithm NRSSL is indicated or the cost function value C, a classification matrix F, and a label matrix Y may be accessed using the data structure when the semi-supervised classification algorithm LSSSL is indicated.

In an operation 1014, the results including the cost function value C and set of hyperparameter values defined for the assigned hyperparameter configuration may be stored in evaluation list 714. The cost function value C and label vector Y may be stored in model data 716 in association with the set of hyperparameter values when the semi-supervised classification algorithm NRSSL is indicated or the cost function value C, classification matrix F, and label matrix Y may be stored in model data 716 in association with the set of hyperparameter values when the semi-supervised classification algorithm LSSSL is indicated.

In an operation 1015, a determination is made concerning whether the first configuration list includes another hyperparameter configuration to evaluate that has not been assigned to a session. If the first configuration list includes another hyperparameter configuration to evaluate, processing continues in an operation 1016. If the first configuration list does not include another hyperparameter configuration to evaluate, processing continues in an operation 1019 shown referring to FIG. 10B.

In operation 1016, a next hyperparameter configuration is selected from the first configuration list and assigned to the now free session.

In an operation 1017, the data structure associated with the now free session is updated to include the next assigned hyperparameter configuration.

In an operation 1018, a request is sent to session manager device 800 associated with the now free session to execute model manager application 812 with the hyperparameter configuration included in the data structure, and processing continues in operation 1012 to continue to monitor for sessions that have completed their assigned hyperparameter configuration evaluation.

Figure 10A:
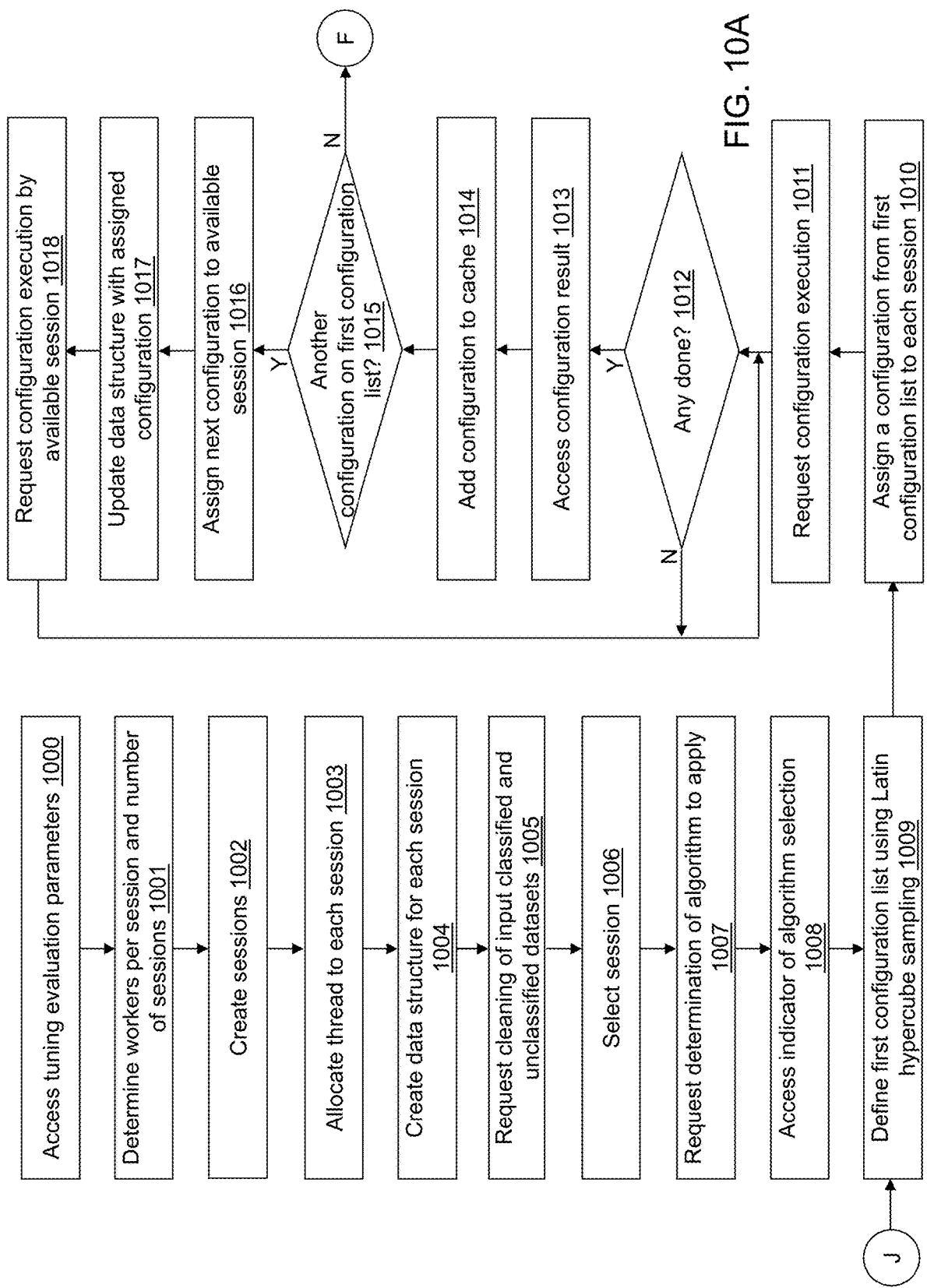
FIGS. 10A to 10D depict a flow diagram illustrating examples of operations performed by the selection manager device of FIG. 7 in accordance with an illustrative embodiment.
Figure 10B:
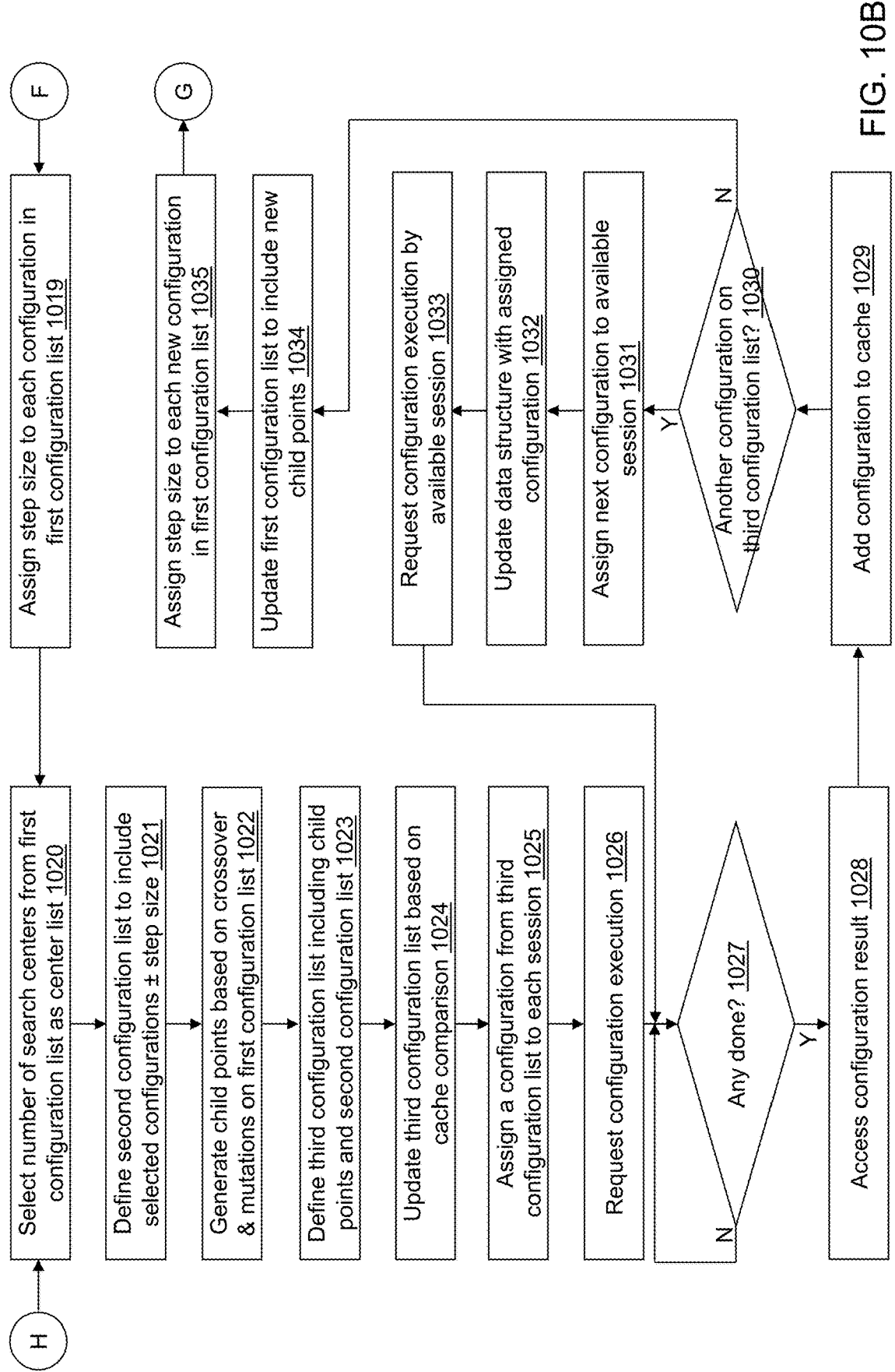

Referring to FIG. 10B, in operation 1019, a step size is assigned to each configuration included in the first configuration list using the initial step size value $\Delta$.

In an operation 1020, a number of search centers n, is selected from the first configuration list to define a center list. Similar to the first configuration list, the center list includes a plurality of hyperparameter configurations where each hyperparameter configuration includes a value for each hyperparameter to evaluate such as $\{s, m, \lambda 1, \lambda 2, t, r\}$ or $\{s, h, \alpha_{weight}\}$. The center list includes n, number of configurations randomly selected from first configuration list.

In an operation 1021, a second configuration list is defined that includes $p+\Delta_p e_i$ and $p-\Delta_p e_i$, where p is each configuration on the center list, $\Delta_p$ is the step size value assigned to the $p^{th}$ configuration, and $e_i$ is a predefined decay parameter used in machine learning for optimization. An illustrative value for $e_i=0.95$ such that, as the iteration increases, the search step size becomes smaller to identify an optimal solution.

In an operation 1022, child points are generated based on crossover and mutations of the configurations of the configurations on the first configuration list using the GA search method and its associated parameters and the cost function value C computed from each configuration execution. For example, a paper by Koch et al., *Autotune: A Derivative-free Optimization Framework for Hyperparameter Tuning* KDD 2018 (Aug. 2, 2018) describes a process for generating child points. Each child point is a new configuration of hyperparameter values that includes a value for each hyperparameter to evaluate such as $\{s, m, \lambda 1, \lambda_2, t, r\}$ or $\{s, h, \alpha_{weight}\}$.

In an operation 1023, a third configuration list is defined that includes the configurations defined by the child points and included in the second configuration list.

In an operation 1024, the third configuration list is updated based on a comparison of each hyperparameter configuration included in the third configuration list with each hyperparameter configuration included in evaluation list 714. For example, each hyperparameter configuration in the third configuration list is compared to previously evaluated hyperparameter configurations to determine if they are "close enough" to hyperparameter configuration values that have already been evaluated, where "close enough" is evaluated based on the cache tolerance value. If so, the hyperparameter configuration is removed from the third configuration list to avoid expending computing resources reevaluating a too similar hyperparameter configuration. The cost function value of the "close" point may be defined as the cost function value of the point removed from the third configuration list in evaluation list 714.

Similar to operation 1010, in an operation 1025, a single configuration is selected from the third configuration list and assigned to each created session by loading the values in the data structure associated with the selected session.

Similar to operation 1011, in an operation 1026, each session is requested to execute its assigned hyperparameter configuration based on the parameter values in the data structure. The handle to the session process stored in the data structure associated with the selected session may be used to make this request or call.

Similar to operation 1012, in an operation 1027, a determination is made concerning whether any execution is done. If no execution is done, processing continues in operation 1027 until indication that a session is done is received. If any execution is done, processing continues in an operation 1028.

Similar to operation 1013, in operation 1028, results including the cost function value C and label vector Y when the semi-supervised classification algorithm NRSSL is indicated or the cost function value C, a classification matrix F, and a label matrix Y when the semi-supervised classification algorithm LSSSL is indicated that were computed from the hyperparameter configuration execution are accessed in association with the set of hyperparameter values defined in the configuration assigned to the session that has completed its computations.

Similar to operation 1014, in an operation 1029, the results including the cost function value C and set of hyperparameter values defined for the assigned hyperparameter configuration may be stored in evaluation list 714. The cost function value C and label vector Y may be stored in model data 716 in association with the set of hyperparameter values when the semi-supervised classification algorithm NRSSL is indicated or the cost function value C, classification matrix F, and label matrix Y may be stored in model data 716 in association with the set of hyperparameter values when the semi-supervised classification algorithm LSSSL is indicated.

Similar to operation 1015, in an operation 1030, a determination is made concerning whether the third configuration list includes another hyperparameter configuration to evaluate that has not been assigned to a session. If the third configuration list includes another hyperparameter configuration to evaluate, processing continues in an operation 1031. If the third configuration list does not include another hyperparameter configuration to evaluate, processing continues in an operation 1034.

Similar to operation 1016, in an operation 1031, a next hyperparameter configuration is selected from the third configuration list and assigned to the now free session.

Similar to operation 1017, in an operation 1032, the data structure associated with the now free session is updated to include the next assigned hyperparameter configuration.

Similar to operation 1018, in an operation 1033, a request is sent to session manager device 800 associated with the now free session to execute model manager application 812 with the hyperparameter configuration included in the data structure, and processing continues in operation 1027 to continue to monitor for sessions that have completed their assigned hyperparameter configuration evaluation.

In operation 1034, child points are generated based on crossover and mutations of the configurations on the first configuration list using the GA/GSS search method and its associated parameters. The first configuration list is updated to include the generated child points.

Figure 10C:
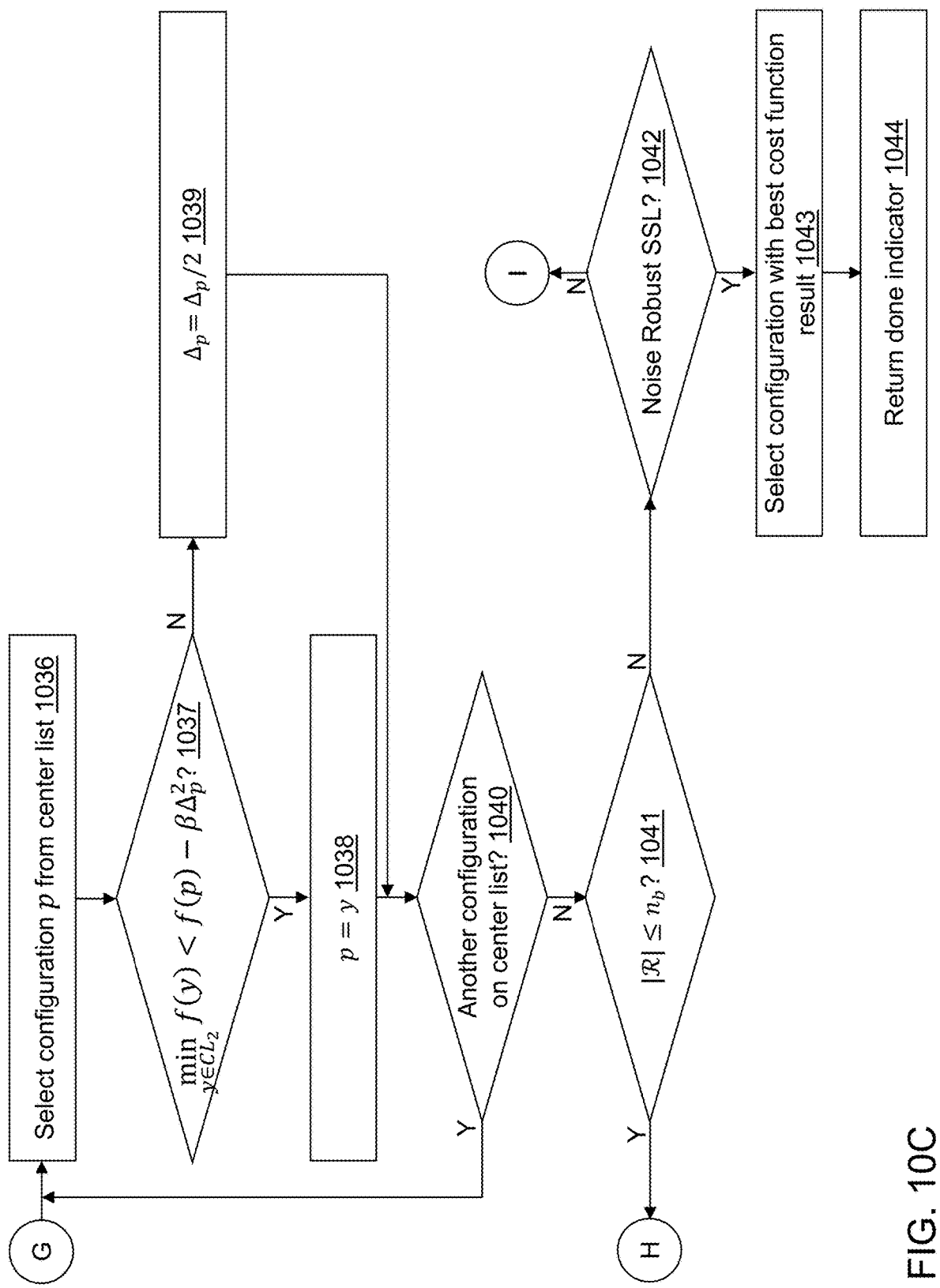
Figure 10D:
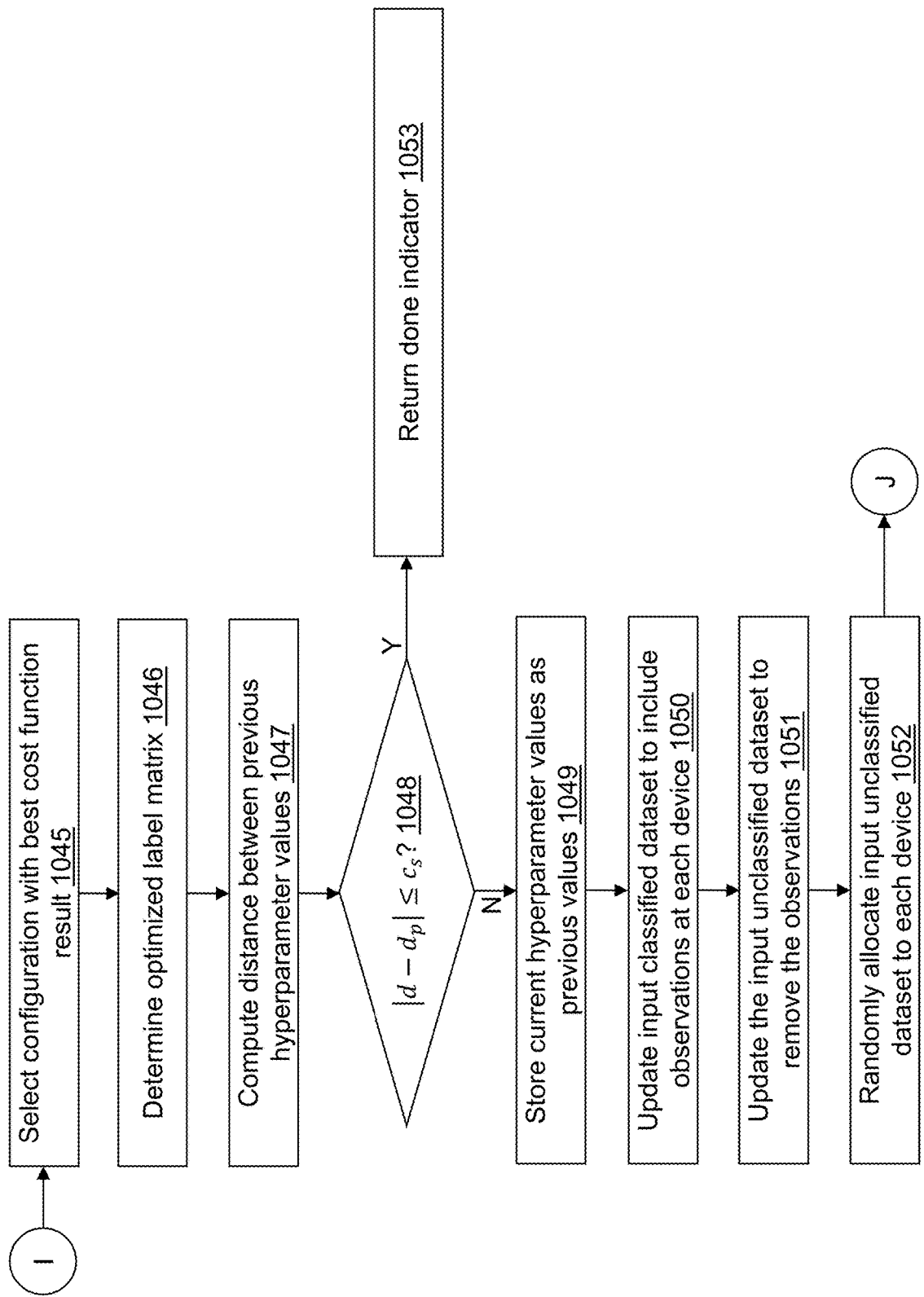

Similar to operation 1019, in an operation 1035, a step size is assigned to each configuration included in the first configuration list using the initial step size value Δ, and processing continues in an operation 1036 shown referring to FIG. 10C.

In operation 1036, a hyperparameter configuration p is selected from the center list.

In an operation 1037, a determination is made concerning whether $$\min_{y \in \mathcal{T}_p} f(y) < f(p) - \beta \Delta_p^2,$$

where y is a hyperparameter configuration selected from the second configuration list indicated by $\tau_p$, and β is the decrease criterion value. If $$\min_{y \in \mathcal{T}_p} f(y) < f(p) - \beta \Delta_p^2,$$

processing continues in an operation 1038. If $$\min_{y \in \mathcal{T}_p} f(y) \geq f(p) - \beta \Delta_p^2,$$

processing continues in an operation 1039.

In operation 1038, the pattern search about hyperparameter configuration p has been successful, and p=y such that the hyperparameter configuration p is replaced with hyperparameter configuration y in the center list.

In operation 1039, the pattern search about hyperparameter configuration p was unsuccessful, and $\Delta_p = \Delta_p/2$ such that the step size for hyperparameter configuration p is reduced by half.

In an operation 1040, a determination is made concerning whether the center list includes another hyperparameter configuration. If the center list includes another hyperparameter configuration, processing continues in operation 1036. If the center list does not include another hyperparameter configuration, processing continues in an operation 1041.

In operation 1041, a determination is made concerning whether $|\mathcal{R}| \leq n_b$, where $|\mathcal{R}|$ indicates a number of hyperparameter configurations included on evaluation list 714, and $n_b$ is a number of hyperparameter configurations budgeted for processing. When $|\mathcal{R}| \leq n_b$, processing continues in operation 1020 to process additional hyperparameter configurations. When $|\mathcal{R}| > n_b$, processing continues in an operation 1042.

In operation 1042, a determination is made concerning whether the semi-supervised classification algorithm NRSSL is indicated. When the semi-supervised classification algorithm NRSSL is indicated, processing continues in operation 1043. When the semi-supervised classification algorithm NRSSL is not indicated, processing continues in an operation 1045 shown referring to FIG. 10D.

In operation 1043, the hyperparameter configuration that resulted in the smallest cost function value is selected from evaluation list 714 and is indicated as an optimized hyperparameter configuration $\{s^o, m^o, \lambda_1^o, \lambda_2^o, t^o, r^o\}$ that may be stored in selected model data 718 or returned to user device 600 in some other manner. The optimized label vector $Y^o$ may be extracted from model data 716 based on identification of the label vector Y associated with the optimized hyperparameter configuration $\{s^o, m^o, \lambda_1^o, \lambda_2^o, t^o, r^o\}$ and stored in selected model data 718 or returned to user device 600 in some other manner.

The observation vectors in input classified data 124 and/or input unclassified data subset 814 and/or input unclassified data subset 834 may further be stored in selected model data 718 in association with a respective value for the target variable included in the optimized label vector $Y^o$. The optimized label vector $Y^o$ includes a label or class defined for each observation vector included in input unclassified data 126. $\{s^o, m^o, \lambda_1^o, \lambda_2^o, t^o, r^o\}$ are the selected hyperparameters for classifying input unclassified data subset 814 and/or input unclassified data subset 834.

In an alternative embodiment, the label vector Y may not be stored in association with each hyperparameter configuration. Instead, a session may be requested to execute with the optimized hyperparameter configuration $\{s^o, m^o, \lambda_1^o, \lambda_2^o, t^o, r^o\}$ and return or store its computed label vector Y as the optimized label vector $Y^o$.

In an operation 1044, an indicator that processing is complete may be returned to user device 600.

In operation 1045, the hyperparameter configuration that resulted in the smallest cost function value is selected from evaluation list 714 and is indicated as $[s^o, k^o, h^o, \alpha_{weight}]$. The cost function value is a total loss/entropy value C computed in an operation 1248 for a hyperparameter configuration.

In an operation 1046, an optimized label matrix $Y^o$ is computed using classification matrix F and label matrix Y associated with the hyperparameter configuration selected in operation 1045, and an integer programming problem solver where $$Y^o = \operatorname{argmax} \frac{\mu^o}{2} \sum_{i=1}^{N} \sum_{j=1}^{c} F_{i,j} Y_{i,j}$$

subject to label matrix Y, where N is a number of observation vectors in input classified data 124 and in input unclassified data 126, and $$\mu^o = \frac{1}{\alpha_{weight}^o} - 1,$$

where $\alpha_{weight}^o$ is e weight value $\alpha_{weight}$ associated with the smallest cost function value in operation 1045. Note that the initial label matrix Y includes input classified data 124 and the batch size $h^o$ number of additionally labeled observation vectors, whereas optimized label matrix $Y^o$ includes a label assigned to each observation vector based on the optimization. The initial label matrix Y are constraints when solving the optimization problem. For illustration, the integer programming problem solver may be designed to solve a 0-1 knapsack problem, for example, as described in Knapsack problem printed on Feb. 26, 2020 from https://en.wikipedia.org/wiki/Knapsack_problem.

The optimization results in a first loss value computed as $$C_1 = \frac{\mu^o}{2} \sum_{i=1}^{n} \|F_i - Y_i\|^2.$$

When $F_{i,j}$ and $Y_{i,j}$ are too large for selection manager 504 to process, selection manager 504 may select a session to perform the optimization and request that the selected session perform the optimization and store the resulting optimized label matrix $Y^o$, and the first loss value in association with $[s^o, k^o, h^o, \alpha_{weight}^o]$.

In an operation 1047, a Euclidian distance d is computed between $[s^o, k^o, h^o, \alpha_{weight}^o]$ and $[s_p^o, k_p^o, h_p^o, \alpha_{weight,p}^o]$ where $[s_p^o, k_p^o, h_p^o, \alpha_{weight,p}^o]$ are the optimized values that resulted from a previous iteration of operations 1009 to 1046.

In an operation 1048, a determination is made concerning whether $|d-d_p| \leq c_s$, where $c_s$ is the search convergence value indicated in operation 910. When $|d-d_p| \leq c_s$, processing continues in an operation 1053. When $|d-d_p| > c_s$, processing continues in an operation 1049 to compute an additional optimized hyperparameter configuration. Of course, operation 1048 may also include a test that confirms that the current iteration of operation 1048 is not the first because there are no initial values for $[s_p^o, h_p^o, k_p^o, \alpha_{weight,p}^o]$ or for $d_p$.

In operation 1049, $[s_p^o, k_p^o, h_p^o, \alpha_{weight,p}^o]$ is replaced with $[s^o, k^o, h^o, \alpha_{weight}^o]$, and the current Euclidian distance d is stored as a previous Euclidian distance $d_p$ for comparison on a next iteration of operation 1048.

In an operation 1050, input classified data 124 is updated to include the batch size $h^o$ number of additionally labeled observation vectors.

In an operation 1051, the batch size $h^o$ number of additionally labeled observation vectors are removed from input unclassified data 126.

In an operation 1052, input unclassified data 126 is randomly allocated to each session to replace the previous allocation. A copy of the updated input classified data 124 is provided to each session as well.

In operation 1053, an indicator that processing is complete may be returned to user device 600. The optimized label matrix $Y^o$ may be stored in model data 716. The optimized label matrix $Y^o$ includes a label or class defined for each observation vector included in input unclassified data 126. $[s^o, k^o, h^o, \alpha_{weight}^o]$ further may be stored in model data 716 as the selected hyperparameters for classifying input unclassified data subset 814 and/or input unclassified data subset 834. The optimized label matrix $Y^o$ may be stored in classification output data 816 and/or classification output data 836. The observation vectors in input classified data 124 and/or input unclassified data subset 814 and/or input unclassified data subset 834 may further be stored in classification output data 816 and/or classification output data 836 in association with a respective value for the target variable included in the optimized label matrix $Y^o$.

Referring to FIG. 11A, example operations associated with model manager application 812 that are performed by session manager device 800 in requesting cleaning of input classified data 124 and input unclassified data 126 are described. Additional, fewer, or different operations may be performed depending on the embodiment. The order of presentation of the operations of FIG. 11A is not intended to be limiting.

In an operation 1100, a request for cleaning is received from selection manager device 504. The request may be received as a result of execution of operation 1005.

In an operation 1102, each session worker device 820 associated with the respective session manager device 800 is requested to clean the observations stored in input classified data 124 and input unclassified data subset 834 distributed to each session worker device 820 of the respective session. As discussed above, session manager device 800 may also act as a session worker device 820 and clean the observations stored in input classified data 124 and input unclassified data subset 814. In response to receipt of the request, each session worker device 820 may perform operations to clean their respective copy of input classified data 124 and input unclassified data subset 834.

In an operation 1104, a completion confirmation may be received from each session worker device 820.

In an operation 1106, a complete indicator may be sent to selection manager device 504.

Referring to FIG. 11B, example operations associated with model manager application 812 that are performed by the selected session manager device 800 in determining the semi-supervised classification algorithm to execute are described. Additional, fewer, or different operations may be performed depending on the embodiment. The order of presentation of the operations of FIG. 11B is not intended to be limiting.

In an operation 1110, a request to determine the semi-supervised classification algorithm to execute is received from selection manager device 504. The request may be received as a result of execution of operation 1007.

Similar to operation 218, in an operation 1112, cluster centers are defined by executing a k-means clustering algorithm to cluster input unclassified data 126 that is distributed into input unclassified data subset 834 stored on each session worker device 820 associated with the selected session manager device 800 and optionally into input unclassified data subset 814. Class centers are defined by computing an average of each observation vector of input classified data 124 grouped by class or label as defined by the $y_i$-variable (target) value of each observation vector of input classified data 124. Each class center is determined by computing an average of each observation vector of input classified data 124 that has a respective class. Additionally, similar to operation 220, a class is determined for each defined cluster center.

Similar to operation 222, in an operation 1114, a next classified observation vector is selected from input classified data 124. For example, on a first iteration of operation 1114, a first observation vector is selected; on a second iteration of operation 1114, a second observation vector is selected; etc.

Similar to operation 224, in an operation 1116, a distance is computed between the selected next classified observation vector and each cluster center of the defined cluster centers. For example, a Euclidian distance may be computed.

Similar to operation 226, in an operation 1118, a determination is made concerning whether the target variable value of the selected next classified observation vector is the unique class determined for a cluster center having a minimum computed distance value. When the target variable value of the selected next classified observation vector is the unique class determined for the cluster center having the minimum computed distance value, processing continues in an operation 1126. When the target variable value of the selected next classified observation vector is not the unique class determined for the cluster center having the minimum computed distance value, processing continues in an operation 1120.

Similar to operation 228, in an operation 1120, a ratio value $r_v$ is computed between a second distance value and a first distance value, where the first distance value is the minimum computed distance value and the second distance value is the computed distance value to the cluster center having the unique class of the target variable value of the selected next classified observation vector. For example, the ratio value may be computed using $$r_v = \frac{e^{-d_1}}{\sum_{j=1}^{2} e^{-d_j}},$$

where $d_1$ is the first distance value, and $d_2$ is the second distance value.

Similar to an operation 230, in an operation 1122, a determination is made concerning whether the ratio value is greater than the label correction threshold $T_{lc}$. When the ratio value is greater than the label correction threshold $T_{lc}$, processing continues in an operation 1124. When the ratio value is less than the label correction threshold $T_{lc}$, processing continues in operation 1126.

Similar to operation 232, in operation 1124, the target variable value of the selected next classified observation vector is changed to the unique class determined for the cluster center having the minimum computed distance value, and a counter of a number of noisy labels $n_{nl}$ is incremented, for example, using $n_{nl}=n_{nl}+1$, where $n_l$ may have been initialized to zero prior to operation 1114.

Similar to operation 234, in an operation 1126, a determination is made concerning whether input classified data 124 includes another observation vector to process. When input classified data 124 includes another observation vector, processing continues in operation 1114 to process the next classified observation vector to determine if it is likely in error and thus a noisy label in need of automatic correction. When input classified data 124 does not include another observation vector, processing continues in an operation 1128.

Similar to operation 240, in operation 1128, a consistency measure is computed as a ratio of the number of noisy labels $n_{nl}$ divided by $n_l$ the number of observation vectors included in input classified data 124.

Similar to operation 242, in an operation 1130, a within class covariance matrix $S_w$ is computed. For example, the within class covariance matrix is computed using $S_w=\Sigma_{i=1}^{nl} (x_i-\mu_{y_i})(x_i-\mu_{y_i})^\tau$, where $x_i$ is an $i^{th}$ observation vector of the plurality of classified observation vectors, $y_i$ is the target variable value of $x_i$, $\mu_{y_i}$ is a sample mean vector computed for a subset of the plurality of classified observation vectors having $y_i$ as the target variable value, and T indicates a transpose.

Similar to operation 244, in an operation 1132, a between class covariance matrix $S_b$ is computed. For example, the between class covariance matrix is computed using $S_b=\Sigma_{k=1}^{c} n_k(\mu_k-\mu)(\mu_k-\mu)^T$, where $n_k$ is a number of observation vectors of the plurality of classified observation vectors having the target variable value associated with a $k^{th}$ class, $\mu_k$ is a sample mean vector computed for a subset of the plurality of classified observation vectors having the target variable value associated with the $k^{th}$ class, and $\mu$ is a sample mean vector computed for the plurality of classified observation vectors.

Similar to operation 246, in an operation 1134, an eigenvector w is computed from the within class covariance matrix and the between class covariance matrix. For example, the eigenvector is computed using a generalized eigenvalue problem solver $$\mathrm{argmax}_w \frac{w^T S_b w}{w^T S_w w}.$$

Similar to operation 248, in an operation 1136, a noise score value $N_{sv}$ is computed as an eigenvalue of the computed eigenvector.

Similar to operation 250, in an operation 1138, a weighted score value $W_s$ is computed using $W_s=N_{sv}+g*C_m$.

Similar to operation 252, in an operation 1140, when $W_s \geq T_{as}$, the semi-supervised classification algorithm selected is NRSSL; otherwise, the semi-supervised classification algorithm selected is LSSSL.

In an operation 1142, an algorithm indicator for the selected semi-supervised classification algorithm may be sent to selection manager device 504 or otherwise provided to selection manager device 504.

Referring to FIG. 11C, example operations associated with model manager application 812 that are performed by session manager device 800 in executing a hyperparameter configuration to compute the cost function value C and label vector Y when the semi-supervised classification algorithm selected is NRSSL or the cost function value C, classification matrix F, and label matrix Y when the semi-supervised classification algorithm selected is LSSSL are described. Additional, fewer, or different operations may be performed depending on the embodiment. The order of presentation of the operations of FIG. 11C is not intended to be limiting.

In an operation 1150, a request for execution is received from selection manager device 504. The data describing the process including the hyperparameter configuration assigned and the semi-supervised classification algorithm selected is accessed. For example, data in the data structure associated with the thread is accessed. Alternatively, the values may be included with the request or provided in other manners to the session. The request may be received as a result of execution of any of operations 1011, 1018, 1026, or 1033.

In an operation 1152, each session worker device 820 associated with the respective session manager device 800 is requested to execute the assigned hyperparameter configuration based on the parameter values in the data structure and the observations stored in input classified data 124 and input unclassified data subset 834 distributed to each session worker device 820 of the respective session. As discussed above, session manager device 800 may also act as a session worker device 820 and execute the assigned hyperparameter configuration and the observations stored in input classified data 124 and input unclassified data subset 814. The assigned hyperparameter configuration varies based on the semi-supervised classification algorithm selected.

In an operation 1154, results from the configuration execution at each session worker device 820 are received. For example, a cost function value $C_{sw}$ and a label vector $Y_{sw}$ may be received from each session worker device 820 that may include session manager device 800 when the semi-supervised classification algorithm selected is NRSSL, or the cost function value $C_{sw}$, classification matrix $F_{sw}$, and label matrix $Y_{sw}$ may be received from each session worker device 820 that may include session manager device 800 when the semi-supervised classification algorithm selected is LSSSL.

In an operation 1156, a determination is made concerning whether the semi-supervised classification algorithm selected is NRSSL. When the semi-supervised classification algorithm selected is NRSSL, processing continues in an operation 1158. When the semi-supervised classification algorithm selected is not NRSSL, processing continues in an operation 1162.

In operation 1158, a total cost function value is computed using $C = \sum_{i=1}^{M} C_{sw,i}$.

In an operation 1160, each of the unclassified observation vectors in input unclassified data 126 is classified by concatenating each label vector $Y_{sw}$ received from each session worker device 820 to define label vector Y in the original order stored in input unclassified data 126.

In operation 1162, a completion indicator of the data structure is set to notify selection manager device 504 that processing of the hyperparameter configuration is complete. The total cost function value C and/or defined label vector Y are made available to selection manager device 504, for example, by including them in the data structure and/or updating a globally accessible table.

Figure 12A:
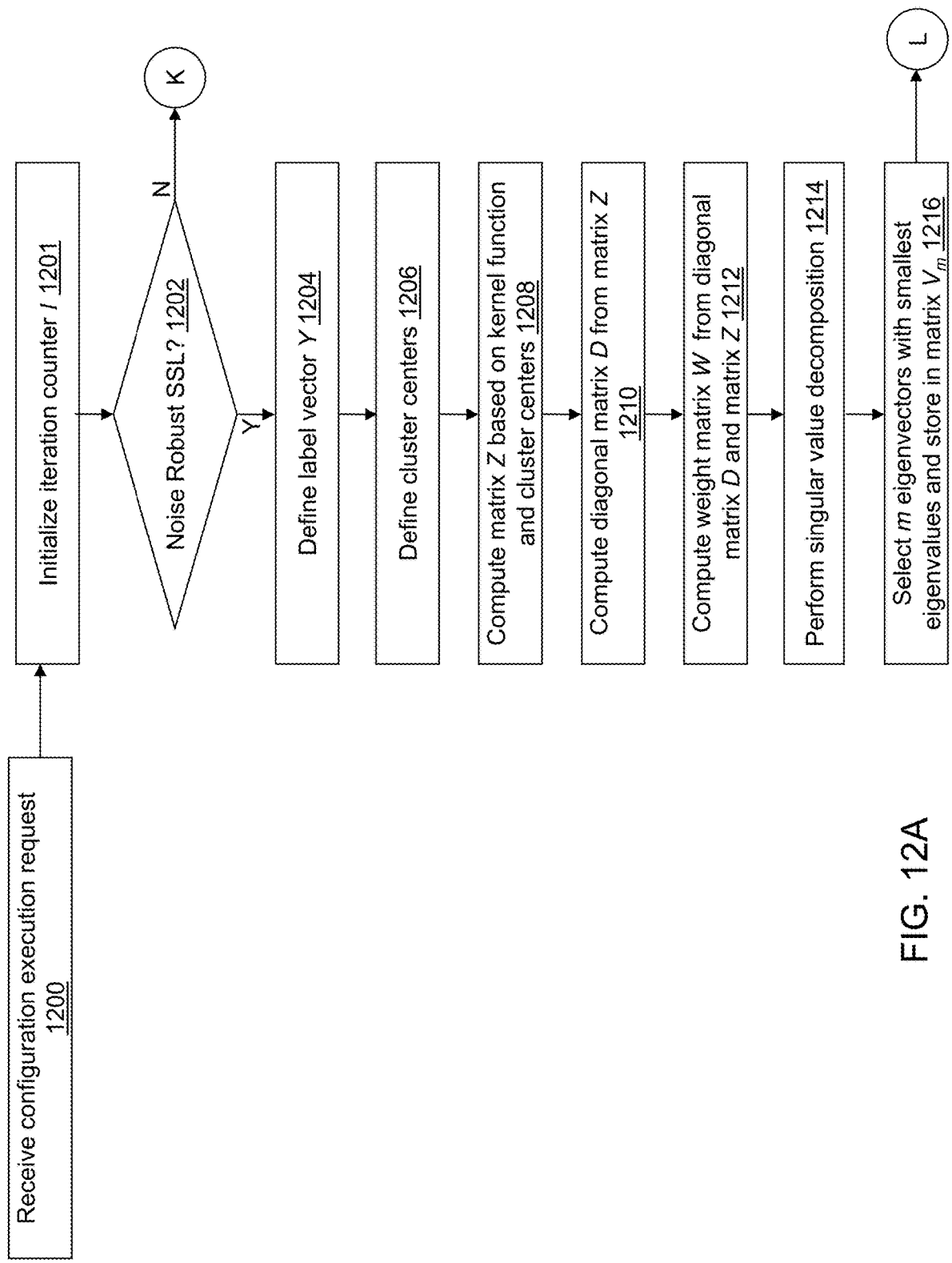
Figure 12B:
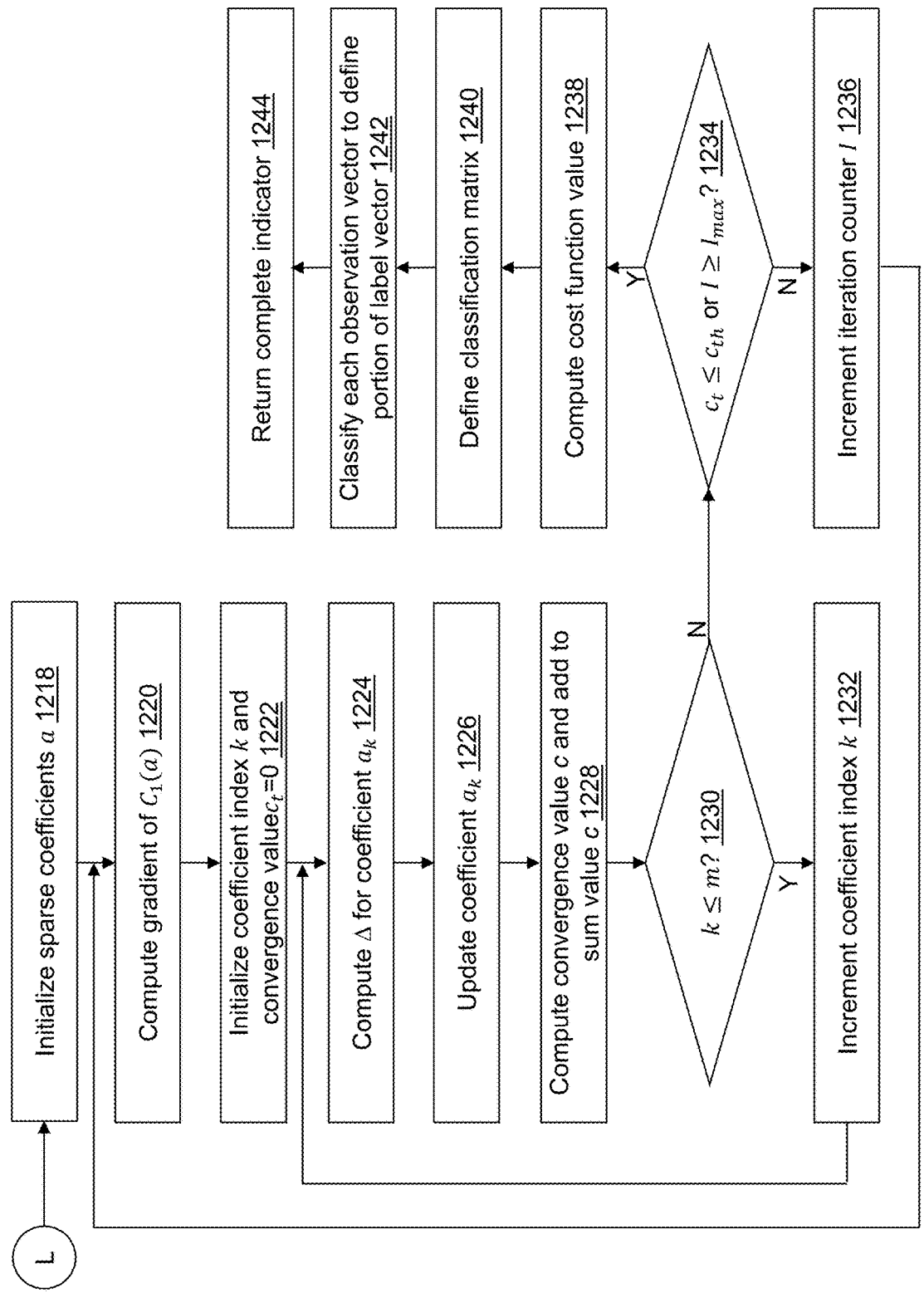

Referring to FIGS. 12A through 12C, example operations associated with model worker application 832 in executing a hyperparameter configuration to compute the cost function value $C_{sw}$ and label vector $Y_{sw}$ or to compute the cost function value C, classification matrix F, and label matrix Y are described. Additional, fewer, or different operations may be performed depending on the embodiment. The order of presentation of the operations of FIGS. 12A through 12C is not intended to be limiting.

In an operation 1200, a request for execution is received from session manager device 800. The data describing the process including the hyperparameter configuration and the semi-supervised classification algorithm selected may be received with the request or accessed in another manner such as in a known memory location.

Similar to operation 254, in an operation 1201, an iteration counter I is initialized, for example, as I=1.

In an operation 1202, a determination is made concerning whether the semi-supervised classification algorithm selected is NRSSL. When the semi-supervised classification algorithm selected is NRSSL, processing continues in an operation 1204. When the semi-supervised classification algorithm selected is not NRSSL, processing continues in an operation 1250 shown referring to FIG. 12C.

Similar to operation 310, in operation 1204, label vector $Y_{sw}$ is defined from input classified data 124 and input unclassified data subset 814 or input unclassified data subset 834. $Y_i=k$ if $x_i$ is labeled as $y_i=k$. Otherwise, $Y_i=0$. As another option for binary data, $Y_i=1$ if $y_i$ indicates true; $Y_i=-1$ if $y_i$ indicates false; otherwise, $Y_i=0$.

Similar to operation 312, in an operation 1206, t cluster centers $\{u_1, u_2, \ldots, u_t\}$ are defined by executing a k-means clustering algorithm with input classified data 124 and input unclassified data subset 814 or input unclassified data subset 834. In alternative embodiments, different clustering algorithms may be used to define the t cluster centers.

Similar to operation 314, in an operation 1208, a matrix Z is computed using the t cluster centers, the kernel function, the kernel parameter value, and the number of nearest cluster centers r. For example, using the Gaussian kernel function, the matrix Z is computed using $$Z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)},$$

$i = 1, 2, \ldots, n$ and $j = 1, 2, \ldots, t$, where $N_r(i)$ is an index to the number of nearest cluster centers r to $x_i$, s is the kernel parameter value, $x_i$ is an $i^{th}$ observation vector selected from input classified data 124 and input unclassified data subset 814 or input unclassified data subset 834, $u_j$ is a $j^{th}$ cluster center selected from the t cluster centers $\{u_1, u_2, \ldots, u_t\}$, n is a number of observation vectors included in input classified data 124 and input unclassified data subset 834 (or input unclassified data subset 814 when session manager device 800 is executing the operations of FIGS. 12A through 12C), and matrix Z is an nxt matrix.

Similar to operation 316, in an operation 1210, a diagonal matrix D is computed based on the matrix Z. For example, the diagonal matrix D is a txt matrix and is defined as $D_{jj} = \sum_{i=1}^{n} z_{ij}$, $j=1, 2, \ldots, t$ and $D_{ij}=0$ if $i \neq j$.

Similar to operation 318, in an operation 1212, a weight matrix W is computed using diagonal matrix D and the matrix Z as $W = ZD^{-0.5}D^{-0.5}Z$, where $W = \hat{Z}^\tau \hat{Z}$.

Similar to operation 320, in an operation 1214, a singular value decomposition is applied to $\hat{Z}^\tau \hat{Z}$ to obtain V based on $\hat{Z}^\tau \hat{Z} = V \Sigma V^\tau$.

Similar to operation 322, in an operation 1216, m eigenvectors having the smallest eigenvalues are selected from the singular value decomposition V and stored in a matrix $V_m$, and processing continues in an operation 1218 shown referring to FIG. 12B.

Referring to FIG. 12B, similar to operation 324, in operation 1218, sparse coefficients a are each initialized, for example, to zero values, where a is an mx1 vector.

Similar to operation 330, in an operation 1220, a gradient of $C_1(a)$ is computed with respect to the plurality of sparse coefficients a.

Similar to operation 332, in an operation 1222, a coefficient index k is initialized, for example, as k=1, and a convergence value $c_t$ is initialized, for example, as $c_t=0$.

Similar to operation 334, in an operation 1224, a difference value $\lambda_k$ is computed for coefficient $\alpha_k$ using $$\Delta_k = a_k - \frac{\nabla_{a_k}(C_1(a_k))}{\|V_m\|_s^2},$$

where $\|V_m\|_s$ is a spectral norm of the matrix $V_m$.

Similar to operation 336, in an operation 1226, coefficient $\alpha_k$ is updated, for example, using $$a_k = \max\left\{|\Delta_k| - \frac{\lambda_1}{\|V_m\|_s}, 0\right\}.$$

Similar to operation 338, in an operation 1228, the convergence value $c_t$ is updated, for example, using $c_t = c_t + \alpha_k - \alpha_k'$, where $\alpha_k'$ is a value of $\alpha_k$ prior to the update in operation 1226. The convergence value is a sum of a difference between the current $\alpha_k$ and the previous $\alpha_k$ for each coefficient of the sparse coefficients.

Similar to operation 340, in an operation 1230, a determination is made concerning whether there is another coefficient of the sparse coefficients to update, for example, using k≤m. If k≤m, processing continues in an operation 1232. If k>m, processing continues in an operation 1234.

Similar to operation 342, in operation 1232, the coefficient index k is incremented, for example, as k=k+1, and processing continues in operation 1224 to process the next coefficient.

Similar to operation 344, in an operation 1234, a determination is made concerning whether labeling has converged by evaluating the labeling convergence test. For example, when $c_t \leq c_{th}$ or $I \geq I_{max}$, processing continues in an operation 1238. When $c_t > c_{th}$ and $I < I_{max}$, processing continues in an operation 1236.

Similar to operation 346, in operation 1236, the iteration counter I is incremented, for example, as I=I+1, and processing continues in operation 1220.

In operation 1238, a cost function value is computed using $$C_{sw} = 0.5\|V_m a - Y\|_2^2 + \lambda_1 \left(\sum_{i=1}^{m} \sum_{ii}^{\frac{1}{2}} |a_i|\right) + \lambda_2 \left(\sum_{i=1}^{m} \sum_{ii}^{\frac{1}{2}} a_i\right)^2.$$

Similar to operation 348, in an operation 1240, a classification matrix F is defined, for example, using $F = V_m a$, where classification matrix F is an nx1 vector for a binary label set or an Nnxc matrix for a label set having c classes.

Similar to operation 350, in an operation 1242, each of the unclassified observation vectors in input unclassified data subset 814 or input unclassified data subset 834 is classified. For example, for a binary label set, if $F_i > 0$, the $y_{sw,i}$-variable (target) value or class of the $i^{th}$ observation vector of input unclassified data subset 814 or input unclassified data subset 834 is predicted to be 1; whereas, if $F_i \leq 0$, the $y_{sw,i}$-variable (target) value or class of the $i^{th}$ observation vector of input unclassified data subset 814 or input unclassified data subset 834 is predicted to be −1. For a label set having c classes, $y_{sw,i}$ is selected for each observation vector $x_i$ based on $$y_{sw,i} = \underset{j \leq c}{\operatorname{argmax}} F_{ij}.$$

As a result, a label with a highest classification value as indicated by $$\underset{j \leq c}{\operatorname{argmax}} F_{ij}$$

is selected as the $y_{sw,i}$-variable (target) value or class for the $i^{th}$ observation vector $x_i$ of input unclassified data subset 814 or input unclassified data subset 834. The classification or label for each observation vector $x_i$ of input unclassified data subset 814 or input unclassified data subset 834 may be extracted from label set Q using the value of $y_{sw,i}$ as an index into label set Q and label vector $Y_{sw}$ may be updated with these values.

In an operation 1244, a completion indicator is sent to session manager device 800 that processing of the hyperparameter configuration on input unclassified data subset 814 or input unclassified data subset 834 is complete. The cost function value $C_{sw}$ and/or updated label vector $Y_{sw}$ are returned or otherwise made available to session manager device 800, for example, by updating a table accessible by session manager device 800.

Referring to FIG. 12C, similar to operation 408, in operation 1250, an affinity matrix W is computed based on the kernel function indicated in operation 208 and the kernel parameter value s in the assigned hyperparameter configuration. For example, using the Gaussian kernel function, the affinity matrix W is defined as $$W_{ij} = \exp\frac{-\|x_i - x_j\|^2}{2s^2} \text{ if } i \neq j$$

and $W_{ii}=0$ if i=i=j, i=1, ..., n and j=1, ..., n where $x_i$ and $x_j$ are observation vectors selected from input classified data 124 and input unclassified data subset 834 (or input unclassified data subset 814 when session manager device 800 is executing the operations of FIGS. 12A through 12C), and n is a number of observation vectors included in input classified data 124 and input unclassified data subset 834 (or input unclassified data subset 814 when session manager device 800 is executing the operations of FIGS. 12A through 12C). For illustration, where the KNN kernel function is selected, k observation vectors are selected based on having minimum affinity matrix W values, where the kernel parameter value k is included in the assigned hyperparameter configuration. Only the selected k observation vectors are included in the affinity matrix W.

Similar to operation 410, in an operation 1252, a diagonal matrix D is computed based on the affinity matrix W. For example, using the Gaussian kernel function, the diagonal matrix D is an nxn matrix and is defined as $D_{ii}=\Sigma_{j=1}^{n}W_{ij}$ if i=j and $D_{ij}=0$ if i≠j, i=1, ..., n and j=1, ..., n.

Similar to operation 412, in an operation 1254, a normalized distance matrix S is computed based on the affinity matrix W and the diagonal matrix D. For example, the normalized distance matrix S is an nxn matrix and is defined as $S=D^{-1/2}WD^{-1/2}$.

Similar to operation 414, in an operation 1256, a label matrix Y is defined. Label matrix Y is an nxc matrix with $Y_{ig}=1$ if $x_i$ is labeled as $y_i=g$. Otherwise, $Y_{ig}=0$, where g=1, ..., c, i=1, ..., n.

Similar to operation 416, in an operation 1258, a classification matrix F and one or more labeling convergence parameter values are initialized. Classification matrix F is an nxc matrix. For example, classification matrix F is initialized as F(0)=Y. One or more labeling convergence parameter values may be initialized based on the labeling convergence test indicated from operation 252. As an example, when the labeling convergence test "Num Iterations" is indicated from operation 252, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$. As another example, when the labeling convergence test "Within Tolerance" is indicated from operation 252, a first labeling convergence parameter value ΔF may be initialized to a large number and associated with the tolerance value τ. Either or both convergence tests may be applied. Other convergence tests may further be applied.

Similar to operation 418, in an operation 1260, an updated classification matrix F(t+1) is computed using F(t+1)=$\alpha_{weight}$SF(t)+(1-$\alpha_{weight}$)Y, where for a first iteration of operation 1260, F(t)=F(0).

Similar to operation 420, in an operation 1262, the one or more labeling convergence parameter values are updated. As an example, when the labeling convergence test "Num Iterations" is indicated in operation 252, I=I+1. As another example, when the labeling convergence test "Within Tolerance" is indicated in operation 252, ΔF=F(t+1)−F(t).

Similar to operation 422, in an operation 1264, a determination is made concerning whether labeling has converged by evaluating the labeling convergence test. For example, when ΔF≤$c_{th}$ or I≥$I_{max}$, processing continues in an operation 1238. When ΔF>$c_{th}$ and I<$I_{max}$, processing continues in an operation 1236.

Similar to operation 424, in an operation 1268, a determination is made concerning whether supplemental labeling is done. When supplemental labeling is done, processing continues in an operation 1276. When supplemental labeling is not done, processing continues in an operation 1268. For example, supplemental labeling is done on a second iteration of 1266.

Similar to operation 426, in operation 1268, a k-means clustering algorithm is applied to updated classification matrix F(t+1) to create a number of clusters equal to the number of classes c included in input classified data 124. The k-means clustering algorithm assigns the classification label distribution of each observation vector to a cluster.

Similar to operation 428, in an operation 1270, an entropy value is computed for each observation vector using $$C = -\sum_{j=1}^{c} F_{ij}(t+1)\log(F_{ij}(t+1)), i = 1, \ldots, n$$

to define an entropy matrix C.

Similar to operation 430, in an operation 1272, l number of observation vectors are selected from each cluster of the number of clusters c by identifying the l observation vectors having maximum entropy values defined in entropy matrix C, where l=[h/c] is a largest integer that is not larger than h/c. An index q to the observation vector $x_i$ of input unclassified data subset 834 (or input unclassified data subset 814 when session manager device 800 is executing the operations of FIGS. 12A through 12C) associated with each observation vector may be identified as part of the selection. C is an effective measure of class overlap, which characterizes the usefulness of the unclassified data when classification is ambiguous or uncertain. Because the selection of the additional batch size h number of classified observation vectors is conducted within local clusters, the additional batch size h number of classified observation vectors are expected to be selected from different classes instead of choosing most of them from a majority class, which ensures the best trade-off between diversity and uncertainty in active learning.

Similar to operation 432, in an operation 1274, the label $$y_q = \operatorname*{argmax}_{j \leq c} F_{qj}(t), q = 1, \ldots, l*c$$

is assigned to the $y_q$-variable (target) value of the associated observation vector $x_q$, and the associated observation vector $x_q$ with its label $y_q$ is added to input classified data 124. The label matrix Y is updated to include the labels and associated observation vectors. As a result, the number of classified observation vectors has been increased by l*c and the number of unclassified observation vectors has been decreased by l*c by removing them from input unclassified data subset 834 (or input unclassified data subset 814 when session manager device 800 is executing the operations of FIGS. 12A through 12C). Processing continues in operation 1258 to recompute classification matrix F and label matrix Y with the additional l*c number of classified observation vectors.

Similar to operation 434, in operation 1276, the $y_i$-variable (target variable) value of each observation vector $x_i$ not included in input classified data 124 is labeled using F(t). $y_i$ is selected for each observation vector $x_i$ based on $$y_i = \underset{j \leq c}{\mathrm{argmax}} F_{ij}(t), i = 1, \ldots, n_u,$$

where $n_u$ is a number of observation vectors included in input unclassified data 126. As a result, a label with a highest classification value as indicated by $$\underset{j \leq c}{\mathrm{argmax}} F_{ij}(t)$$

is selected as the $y_i$-variable value or class for the observation vector $x_i$.

In an operation 1278, a second loss value $C_2$, an entropy loss value $C_e$, and a total loss/entropy value C are computed, for example, using $$C_2 = \frac{1}{2} \sum_{i=1}^{n} \sum_{j=1}^{n} W_{i,j} \left\| \frac{1}{\sqrt{D_{i,i}}} F_i - \frac{1}{\sqrt{D_{j,j}}} F_j \right\|^2, C_e = -\lambda \sum_{q=1}^{l*c} C_q$$

and $C=C_2+C_e$, where $C_q$ is the entropy value computed for each observation vector selected in operation 1270.

In an operation 1280, a completion indicator of the data structure is set to notify selection manager device 104 that processing of the hyperparameter configuration is complete. The total loss/entropy value C, updated classification matrix F(t+1), and updated label matrix Y are made available to selection manager device 104, for example, by including them in the data structure and/or updating a globally accessible table and/or storing them in model configuration data 818 and/or in model configuration data 838.

Experimental results were generated using the operations of classification application 122 with a 2-dimensional (2-D) synthetic two moon dataset. Input unclassified data 126 included 1500 observation vectors. Input classified data 124 included 20 classified observation vectors. A number of noisy labeled observation vectors varied from 10% (2 observation vectors labeled incorrectly) to 25% (5 observation vectors labeled incorrectly). The results in percent are shown in Table I below:

TABLE I

| Noise Level | 10% | 15% | 20% | 25% |
|---|---|---|---|---|
| Without label correction | 87.3 | 85.6 | 82.6 | 81.2 |
| With label correction | 91.5 | 91.5 | 87.3 | 85.6 |
| Reduced noise level with label correction | 5 | 5 | 10 | 15 |

Without applying label correction based on operation 232, the results are shown in the first row for successive levels of noise. With applying label correction based on operation 232, the results are shown in the second row for successive levels of noise. The noise level reduction as a result of application of label correction in operation 232 is shown in the third row for successive levels of noise.

Experimental results were generated using the operations of classification model tuning application 622 with synthetic data that includes transactions made by credit cards in September 2013 by European cardholders. The synthetic data presents transactions that occurred in two days, where we have 492 fraudulent transactions out of 284,807 transactions. The synthetic data is highly unbalanced such that the positive class (fraudulent transactions) account for 0.172% of all the transactions.

The synthetic data includes only numerical input variables which are the result of a principal components analysis (PCA) transformation. Features V1, V2, . . . , V28 are the principal components obtained with PCA, the only features which were not transformed with PCA are 'Time' and 'Amount'. Feature 'Time' contains the seconds elapsed between each transaction and the first transaction in the dataset. The feature 'Amount' is the transaction Amount, this feature can be used for example-dependent cost-sensitive learning. Feature 'Class' is the response variable and it has a value of 1 for a fraudulent transaction and 0 otherwise. The results are shown in Table II below:

TABLE II

| Noise Level | 0% | 10% | 15% | 20% | 25% |
|---|---|---|---|---|---|
| Weighted score value $W_s$ | 0.015 | 0.142 | 0.226 | 0.273 | 0.409 |
| Classifier Selection | LSSSL | NRSSL | NRSSL | NRSSL | NRSSL |
| Accuracy with NRSSL | 95.6% | 91.5% | 87.3% | 85.6% | 81.2% |
| Accuracy with LSSSL | 99.3% | 86.5% | 79.2% | 78.4% | 76.7% |

Weighted score value $W_s$ was normalized to the range of [0,1] and the runs were conducted with five splits of data, the best hyperparameter sets for both LSSSL and NRSSL, and the average numbers are shown in Table II. The best performing algorithm was selected based on the value of weighted score value $W_s$.

Experimental results were generated using the operations of classification model tuning application 622 with a credit card dataset with credit card transaction information to classify transactions as fraud or not fraud. Input unclassified data 126 included 100,000 observation vectors. Input classified data 124 included 100 classified observation vectors. The credit card dataset is highly imbalanced such that the fraudulent transactions only account for 0.192% of the total data. There were 28 variables. The results are shown in Table III below for various noise levels applies to input classified data 124:

TABLE III

| Noise Level | 0% | 10% | 15% | 20% | 25% |
|---|---|---|---|---|---|
| Weighted score value $W_s$ | 0.026 | 0.175 | 0.231 | 0.353 | 0.425 |
| Classifier Selection | LSSSL | NRSSL | NRSSL | NRSSL | NRSSL |
| F-score with NRSSL | 0.826 | 0.815 | 0.792 | 0.781 | 0.769 |
| F-score with LSSSL | 0.847 | 0.751 | 0.735 | 0.705 | 0.673 |

Weighted score value $W_s$ was normalized to the range of [0,1] and the runs were conducted with five splits of data, the best hyperparameter sets for both LSSSL and NRSSL, and the average numbers are shown in Table III. F-score is a harmonic mean of a precision and a recall value. The best performing algorithm was selected based on the value of weighted score value $W_s$.

Distributed classification system 500 predicts the label/class, target variable y, for unclassified observation vectors in input unclassified data subset 814 and/or input unclassified data subset 834, where unclassified observation vectors were not labeled by an expert process or a human while determining the optimum values for the hyperparameters. Distributed classification system 500 supports improved classification accuracy performance in a faster manner using the plurality of worker computing devices of worker system 506 that perform operations on their portion of input unclassified data subset 814 or input unclassified data subset 834. Input classified data 124 is used at all of the computing devices of worker system 506. Selection manager device 504 controls the execution using different values of the hyperparameters by the plurality of worker computing devices of worker system 506. Distributed classification system 500 can be applied to computer vision, machine learning, pattern recognition, etc. In the application of medical imaging diagnosis, there may be a large number of unlabeled medical images that are distributed due to their geographic locations.

Supervised learning requires that the target (dependent) variable y be classified or labeled in training data so that a model can be built to predict the class of new unclassified data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Distributed classification system 500 solves this problem by providing a cost effective, accurate, and fast process for classifying unclassified data while improving the accuracy of the classification by identifying optimum values for the hyperparameters. The now classified observations of input unclassified data subset 814 and/or input unclassified data subset 834 provide observation vectors for training a predictive model that previously would have been discarded resulting in improved models and more accurate predictions as shown in the results presented below.

Classification application 122 and classification model tuning application 622 exploit distributed computing resources for scalability to big data. In addition, classification application 122 and classification model tuning application 622 have a linear time and space complexity with respect to the number of observations, which enhances the scalability to large datasets.

The explosion of digital data is generating many opportunities for big data analytics, which in turn provides many opportunities for tuning classification models to capitalize on the information contained in the data—to make better predictions that lead to better decisions. Distributed classification system 500 support better decision making by providing a system that can identify and evaluate many more hyperparameter configurations in parallel by allocating the computing devices of worker system 506 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

access a plurality of observation vectors, wherein the plurality of observation vectors includes a plurality of unclassified observation vectors and a plurality of classified observation vectors;

define cluster centers for the plurality of unclassified observation vectors using a clustering algorithm, wherein a number of the cluster centers is a number of unique values of a target variable value of the plurality of classified observation vectors, wherein the target variable value is defined to represent a class of each respective observation vector of the plurality of classified observation vectors, wherein the target variable value is not defined to represent the class of each respective observation vector of the plurality of unclassified observation vectors;

determine a unique class for each cluster of the defined cluster centers, wherein the unique class is selected from a plurality of classes that each represent unique values of the target variable value of the plurality of classified observation vectors;

(A) select a next classified observation vector from the plurality of classified observation vectors;

(B) compute a distance value between the selected next classified observation vector and each cluster center of the defined cluster centers;

(C) when the target variable value of the selected next classified observation vector is not the unique class determined for a cluster center having a minimum computed distance value, select a first distance value as the minimum computed distance value;

select a second distance value as the computed distance value to the cluster center having the unique class of the target variable value of the selected next classified observation vector;

compute a ratio value between the selected second distance value and the selected first distance value; and change the target variable value of the selected next classified observation vector to the unique class determined for the cluster center having the minimum computed distance value when the computed ratio value satisfies a predefined label correction threshold;

(D) repeat (A) through (C) until each observation vector of the plurality of classified observation vectors is selected in (A);

(E) define a classification matrix using the plurality of observation vectors;

(F) determine the target variable value for each observation vector of the plurality of unclassified observation vectors based on the defined classification matrix; and (G) output the target variable value for each observation vector of the plurality of observation vectors, wherein the target variable value selected for each observation vector of the plurality of observation vectors is defined to represent the class for a respective observation vector.

2. The non-transitory computer-readable medium of claim 1, wherein the cluster centers are defined using a k-means clustering algorithm with the number of the cluster centers.

3. The non-transitory computer-readable medium of claim 1, wherein the distance value is a Euclidian distance.

4. The non-transitory computer-readable medium of claim 1, wherein the ratio value is computed using $$r_v = \frac{e^{-d_1}}{\sum_{j=1}^{2} e^{-d_j}},$$

where $r_v$ is the ratio value, $d_1$ is the selected first distance value, and $d_2$ is the selected second distance value.

5. The non-transitory computer-readable medium of claim 4, wherein the computed ratio value satisfies the predefined label correction threshold when the computed ratio value is greater than the predefined label correction threshold.

6. The non-transitory computer-readable medium of claim 1, wherein defining the cluster centers comprises:

executing the clustering algorithm to assign each observation vector of the plurality of unclassified observation vectors to a cluster of the number of the cluster centers; and computing an average of each observation vector assigned to a common cluster to define a cluster center for the common cluster.

7. The non-transitory computer-readable medium of claim 6, wherein determining the unique class for each cluster of the defined cluster centers comprises:

defining a class center for each unique value of the target variable value of the plurality of classified observation vectors by computing an average of each observation vector of the plurality of classified observation vectors having a common unique value of the target variable value; and computing a cluster distance value between each cluster center of the defined cluster centers and each defined class center to define cluster distance values for each respective cluster center;

wherein the unique class determined for each cluster center of the defined cluster centers is the unique value of the target variable value associated with the defined class center that has a minimum value of the cluster distance values defined for each respective cluster center.

8. The non-transitory computer-readable medium of claim 7, wherein the computed cluster distance value is a Euclidian distance.

9. The non-transitory computer-readable medium of claim 1, wherein after (D) and before (E), the computer-readable instructions further cause the computing device to:

compute a consistency measure based on a number of times the computed ratio value did not satisfy the label correction threshold;

compute a within class covariance matrix from the plurality of classified observation vectors;

compute a between class covariance matrix from the plurality of classified observation vectors;

compute an eigenvector of a quotient of the computed between class covariance matrix and the computed within class covariance matrix;

define a noise score value as an eigenvalue of the computed eigenvector; and compute a weighted score value from the computed consistency measure and the defined noise score value, wherein an algorithm used to define the classification matrix in (E) is selected based on the computed weighted score value.

10. The non-transitory computer-readable medium of claim 9, wherein the consistency measure is computed as the number of times the computed ratio value satisfies the predefined label correction threshold divided by a number of the plurality of classified observation vectors.

11. The non-transitory computer-readable medium of claim 9, wherein the within class covariance matrix is computed using $S_w = \sum_{i=1}^{n_I}(x_i-\mu_{y_i})(x_i-\mu_{y_i})^\tau$, where $S_w$ is the within class covariance matrix, $n_I$ is a number of the plurality of classified observation vectors, $x_i$ is an $i^{th}$ observation vector of the plurality of classified observation vectors, $y_i$ is the target variable value of $x_i$, $\mu_{y_i}$ is a sample mean vector computed for a subset of the plurality of classified observation vectors having $y_i$ as the target variable value, and T indicates a transpose.

12. The non-transitory computer-readable medium of claim 9, wherein the between class covariance matrix is computed using $S_b = \sum_{k=1}^{c} n_k(\mu_k-\mu)(\mu_k-\mu)^\tau$, where $S_b$ is the between class covariance matrix, c is the number of unique values of the target variable value of the plurality of classified observation vectors, $n_k$ is a number of observation vectors of the plurality of classified observation vectors having the target variable value associated with a $k^{th}$ class, $\mu_k$ is a sample mean vector computed for a subset of the plurality of classified observation vectors having the target variable value associated with the $k^{th}$ class, $\mu$ is a sample mean vector computed for the plurality of classified observation vectors, and $\tau$ indicates a transpose.

13. The non-transitory computer-readable medium of claim 9, wherein the eigenvector is computed using $$\operatorname*{argmax}_{w} \frac{w^\tau S_b w}{w^\tau S_w w},$$

where w is the eigenvector, $S_b$ is the between class covariance matrix, $S_w$ is the within class covariance matrix, and $\tau$ indicates a transpose.

14. The non-transitory computer-readable medium of claim 9, wherein the weighted score value is computed using $W_s = N_{sv} + \alpha * C_m$, where $W_s$ is the weighted score value, $N_{sv}$ is the defined noise score value, $C_m$ is the computed consistency measure, and a is a predefined weight value.

15. The non-transitory computer-readable medium of claim 9, wherein a first algorithm to define the classification matrix in (E) is selected when the computed weight score is greater than a predefined algorithm selection threshold and a second algorithm to define the classification matrix in (E) is selected when the computed weight score is less than the predefined algorithm selection threshold.

16. The non-transitory computer-readable medium of claim 15, wherein defining the classification matrix in (E) using the first algorithm comprises:
  (H) computing a weight matrix using a kernel function applied to the plurality of observation vectors;
  (I) performing a decomposition of the computed weight matrix to define a decomposition matrix;
  (J) selecting a predefined number of eigenvectors from the defined decomposition matrix to define a second decomposition matrix, wherein the predefined number of eigenvectors have smallest eigenvalues relative to other eigenvectors not selected from the decomposed weight matrix;
  (K) computing a gradient value as a function of the defined second decomposition matrix, a plurality of sparse coefficients, and a label vector defined from the plurality of observation vectors based on the target variable value;
  (L) updating a value of each coefficient of the plurality of sparse coefficients based on the computed gradient value;
  (M) repeating (K) and (L) until a convergence parameter value indicates the plurality of sparse coefficients have converged,
  wherein the classification matrix is defined using the converged plurality of sparse coefficients.

17. The non-transitory computer-readable medium of claim 16, wherein the gradient value is computed using $\nabla_{a_i} = C_{3,i} + L_2$, where $\nabla_{a_i}$ is the gradient value for $\alpha_i$, $\alpha_i$ is an $i^{th}$ coefficient of the plurality of sparse coefficients, $C_3 = V_m^\tau(V_m a - Y)$ is an m×1 vector, m is the predefined number of eigenvectors, $C_{3,i}$ is an $i^{th}$ element of $C_3$, $V_m$ is the defined second decomposition matrix, a is the plurality of sparse coefficients, Y is the label vector, T indicates a transpose, and $L_2$ is an $L_2$-norm term.

18. The non-transitory computer-readable medium of claim 17, wherein $$L_2 = 2\lambda_2 \sum_{ii}^{\frac{1}{2}} \sum_{i=1}^{m} \sum_{ii}^{\frac{1}{2}} a_i,$$

where $\lambda_2$ is a first predefined regularization parameter value.

19. The non-transitory computer-readable medium of claim 16, wherein the classification matrix is defined using $F = V_m a$, where F is the classification matrix, $V_m$ is the defined second decomposition matrix, m is the predefined number of eigenvectors, and a is the plurality of sparse coefficients.

20. The non-transitory computer-readable medium of claim 16, wherein updating the value of each coefficient of the plurality of sparse coefficients comprises:
  computing a difference value using the defined decomposition matrix and the computed gradient value;
  wherein the value is updated using $$a_k = \max\left\{|\Delta_k| - \frac{\lambda_1}{\|v_m\|_s}, 0\right\},$$

where $\alpha_k$ is a $k^{th}$ coefficient of the plurality of sparse coefficients, $\Delta_k$ is the computed difference value for the $k^{th}$ coefficient of the plurality of sparse coefficients, $\lambda_1$ is a predefined regularization parameter value, $V_m$ is the defined second decomposition matrix, m is the predefined number of eigenvectors, $|\Delta_k|$ indicates an absolute value of $\Delta_k$, and $\|V_m\|_s$ indicates a spectral norm of $V_m$.

21. The non-transitory computer-readable medium of claim 20, wherein the difference value is computed using $$\Delta_k = a_k - \frac{\nabla_{a_k}(C_1(a_k))}{\|v_m\|_s^2},$$

where $\nabla_{a_k} C_1(\alpha_k))$ is the gradient value for the $k^{th}$ coefficient of the plurality of sparse coefficients.

22. The non-transitory computer-readable medium of claim 16, wherein computing the weight matrix comprises:
  computing a first matrix using the kernel function and the plurality of observation vectors; and
  computing a diagonal matrix by summing each row of the computed first matrix, wherein the sum of each row is stored in a diagonal of a respective row with zeroes in remaining positions of the respective row;
  wherein the weight matrix is computed using the first matrix and the diagonal matrix.

23. The non-transitory computer-readable medium of claim 22, wherein the weight matrix is computed using $W = ZD^{-1/2}D^{-1/2}Z$, where W is the weight matrix, D is the computed diagonal matrix, and Z is the computed first matrix.

24. The non-transitory computer-readable medium of claim 23, wherein the decomposition of the computed weight matrix is a singular value decomposition.

25. The non-transitory computer-readable medium of claim 22, wherein the first matrix is computed using $$z_{ij} = \frac{\exp\left(\frac{-\|x_i - u_j\|^2}{2s^2}\right)}{\sum_{k \in N_r(i)} \exp\left(\frac{-\|x_i - u_k\|^2}{2s^2}\right)}, i = 1, 2, \ldots, N \text{ and } j = 1, 2, \ldots, t,$$

where $z_{ij}$ is an $i,j^{th}$ entry of the first matrix, s is a predefined kernel parameter value, $x_i$ is an $i^{th}$ observation vector of the plurality of observation vectors, r is a predefined number of nearest cluster centers, $N_r(i)$ is an index to a nearest cluster center to $x_i$ of the predefined number of nearest cluster centers, t is the number of unique values of the target variable value of the plurality of classified observation vectors, $u_j$ is a $j^{th}$ cluster center selected from the t cluster centers, and N is a number of the plurality of observation vectors.

26. The non-transitory computer-readable medium of claim 25, wherein the t cluster centers are determined using a k-means clustering algorithm to cluster the plurality of observation vectors.

27. The non-transitory computer-readable medium of claim 15, wherein defining the classification matrix in (E) using the second algorithm comprises:
  computing an affinity matrix using a kernel function with a predefined kernel parameter value and the plurality of observation vectors;
  computing a diagonal matrix by summing each row of the computed affinity matrix, wherein the sum of each row is stored in a diagonal of the row with zeroes in remaining positions of the row;

computing a normalized distance matrix using the computed affinity matrix and the computed diagonal matrix; and defining a label matrix using the target variable value of each observation vector of the plurality of classified observation vectors; and computing a converged classification matrix by updating the defined label matrix, wherein the converged classification matrix defines a class probability for each unique class of the plurality of classes, wherein the classification matrix is defined using the converged classification matrix.

28. The non-transitory computer-readable medium of claim 27, wherein the classification matrix is converged using $F(t+1)=\alpha SF(t)+(1-\alpha)Y$, where $F(t+1)$ is a next classification matrix, $\alpha$ is a predefined weight value, S is the computed, normalized distance matrix, $F(t)$ is the classification matrix, Y is the defined label matrix, and t is an iteration number of computing the converged classification matrix.

29. A computing device comprising:
   a processor; and
   a computer-readable medium operably coupled to the processor, the computer-readable medium having computer-readable instructions stored thereon that, when executed by the processor, cause the computing device to
      access a plurality of observation vectors, wherein the plurality of observation vectors includes a plurality of unclassified observation vectors and a plurality of classified observation vectors;
      define cluster centers for the plurality of unclassified observation vectors using a clustering algorithm, wherein a number of the cluster centers is a number of unique values of a target variable value of the plurality of classified observation vectors, wherein the target variable value is defined to represent a class of each respective observation vector of the plurality of classified observation vectors, wherein the target variable value is not defined to represent the class of each respective observation vector of the plurality of unclassified observation vectors;
      determine a unique class for each cluster of the defined cluster centers, wherein the unique class is selected from a plurality of classes that each represent unique values of the target variable value of the plurality of classified observation vectors;
   (A) select a next classified observation vector from the plurality of classified observation vectors;
   (B) compute a distance value between the selected next classified observation vector and each cluster center of the defined cluster centers;
   (C) when the target variable value of the selected next classified observation vector is not the unique class determined for a cluster center having a minimum computed distance value,
      select a first distance value as the minimum computed distance value;
      select a second distance value as the computed distance value to the cluster center having the unique class of the target variable value of the selected next classified observation vector;
      compute a ratio value between the selected second distance value and the selected first distance value; and
      change the target variable value of the selected next classified observation vector to the unique class determined for the cluster center having the minimum computed distance value when the computed ratio value satisfies a predefined label correction threshold;
   (D) repeat (A) through (C) until each observation vector of the plurality of classified observation vectors is selected in (A);
   (E) define a classification matrix using the plurality of observation vectors;
   (F) determine the target variable value for each observation vector of the plurality of unclassified observation vectors based on the defined classification matrix; and
   (G) output the target variable value for each observation vector of the plurality of observation vectors, wherein the target variable value selected for each observation vector of the plurality of observation vectors is defined to represent the class for a respective observation vector.

30. A method of classifying data using semi-supervised data, the method comprising:
   accessing, by a computing device, a plurality of observation vectors, wherein the plurality of observation vectors includes a plurality of unclassified observation vectors and a plurality of classified observation vectors;
   defining, by the computing device, cluster centers for the plurality of unclassified observation vectors using a clustering algorithm, wherein a number of the cluster centers is a number of unique values of a target variable value of the plurality of classified observation vectors, wherein the target variable value is defined to represent a class of each respective observation vector of the plurality of classified observation vectors, wherein the target variable value is not defined to represent the class of each respective observation vector of the plurality of unclassified observation vectors;
   determining, by the computing device, a unique class for each cluster of the defined cluster centers, wherein the unique class is selected from a plurality of classes that each represent unique values of the target variable value of the plurality of classified observation vectors;
   (A) selecting, by the computing device, a next classified observation vector from the plurality of classified observation vectors;
   (B) computing, by the computing device, a distance value between the selected next classified observation vector and each cluster center of the defined cluster centers;
   (C) when the target variable value of the selected next classified observation vector is not the unique class determined for a cluster center having a minimum computed distance value,
      selecting, by the computing device, a first distance value as the minimum computed distance value;
      selecting, by the computing device, a second distance value as the computed distance value to the cluster center having the unique class of the target variable value of the selected next classified observation vector;
      computing, by the computing device, a ratio value between the selected second distance value and the selected first distance value; and
      changing, by the computing device, the target variable value of the selected next classified observation vector to the unique class determined for the cluster center having the minimum computed distance value when the computed ratio value satisfies a predefined label correction threshold;

(D) repeating, by the computing device, (A) through (C) until each observation vector of the plurality of classified observation vectors is selected in (A);
(E) defining, by the computing device, a classification matrix using the plurality of observation vectors;
(F) determining, by the computing device, the target variable value for each observation vector of the plurality of unclassified observation vectors based on the defined classification matrix; and
(G) outputting, by the computing device, the target variable value for each observation vector of the plurality of observation vectors, wherein the target variable value selected for each observation vector of the plurality of observation vectors is defined to represent the class for a respective observation vector.

* * * * *

UNITED STATES PATENT AND TRADEMARK OFFICE
CERTIFICATE OF CORRECTION

PATENT NO. : 10,929,762 B1  
APPLICATION NO. : 16/940501  
DATED : February 23, 2021  
INVENTOR(S) : Xu Chen et al.

Page 1 of 5

It is certified that error appears in the above-identified patent and that said Letters Patent is hereby corrected as shown below:

In the Specification

Column 10, Line 31:
Delete the phrase "may be indicated by N." and replace with --may be indicated by $N_v$.--.

Column 13, Line 64:
Delete the phrase "$S_w = \Sigma_{i=1}{}^{n_l}(x_i - \mu_{y_i})(x_i - \mu_{y_i})^\tau$," and replace with --$S_w = \sum_{i=1}^{n_l}(x_i - \mu_{y_i})(x_i - \mu_{y_i})^\mathsf{T}$,--.

Column 14, Line 5:
Delete the phrase "$S_b = \Sigma_{k=1}{}^c n_k(\mu_k - \mu)(\mu_k - \mu)^\tau$," and replace with --$S_b = \sum_{k=1}^{c} n_k(\mu_k - \mu)(\mu_k - \mu)^\mathsf{T}$,--.

Column 16, Line 17:
Delete the phrase "$D_{jj} = \Sigma_{i=1}{}^N z_{ij}$," and replace with --$D_{jj} = \sum_{i=1}^{N} z_{ij}$,--.

Column 16, Line 21:
Delete the phrase "$W = \hat{Z}\hat{Z}^\tau$." and replace with --$W = \hat{Z}\hat{Z}^\mathsf{T}$.--.

Column 16, Lines 23-24:
Delete the phrase "$\hat{Z}^\tau\hat{Z}$ to obtain $V$ based on $\hat{Z}^\tau\hat{Z} = U\Sigma\Sigma U^\tau$, where $\hat{Z} = V\Sigma U^\tau$ where each column of $U$ is an eigenvector of $\hat{Z}^\tau\hat{Z}$," and replace with --$\hat{Z}^\mathsf{T}\hat{Z}$ to obtain $V$ based on $\hat{Z}^\mathsf{T}\hat{Z} = U\Sigma\Sigma U^\mathsf{T}$, where $\hat{Z} = V\Sigma U^\mathsf{T}$ where each column of $U$ is an eigenvector of $\hat{Z}^\mathsf{T}\hat{Z}$,--.

Column 16, Line 58:
Delete the phrase "$0.5\|V_m a - Y\|_2^2$," and replace with --$0.5\|V_m a - Y\|_2^2$,--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)

Column 17, Line 33:
Delete the phrase "$C_3 = V_m{}^\tau(V_m a - Y)$" and replace with --$C_3 = V_m^\intercal(V_m a - Y)$--.

Column 17, Line 34:
Delete the phrase "$C_3 \cdot \nabla_{a_i}(C_1(a_i))$," and replace with --$C_3 \cdot \nabla_{a_i}(C_1(a_i))$--.

Column 19, Line 34:
Delete the phrase "$D_{ii} = \sum_{j=1}^{N} W_{ij}$," and replace with --$D_{ii} = \sum_{j=1}^{N} W_{ij}$--.

Column 22, Line 46:
Delete the phrase "$N_s{}^{th}$" and replace with --$N_s^{th}$--.

Column 23, Line 8:
Delete the phrase "$N_s{}^{th}$" and replace with --$N_s^{th}$--.

Column 23, Line 30:
Delete the phrase "$N_s{}^{th}$" and replace with --$N_s^{th}$--.

Column 23, Line 55:
Delete the phrase "$N_s{}^{th}$" and replace with --$N_s^{th}$--.

Column 30, Line 7:
Delete the phrase "$C_s$" and replace with --$c_s$--.

Column 30, Line 13:
Delete the phrase "$C_s$" and replace with --$c_s$--.

Column 30, Line 15:
Delete the phrase "$C_s = 0.1$" and replace with --$c_s = 0.1$--.

Column 31, Line 35:
Delete the phrase "the value of N" and replace with --the value of $N_s$--.

Column 34, Lines 23-24:
Delete the phrase "$\{s, m, \lambda 1, \lambda 2, t, r\}$ or $\{s, h, \alpha_{weight}\}$. The center list includes n, number" and replace with --$\{s, m, \lambda_1, \lambda_2, t, r\}$ or $\{s, h, \alpha_{weight}\}$. The center list includes $n_c$ number--.

Column 34, Line 44:
Delete the phrase "$\{s, m, \lambda 1, \lambda 2, t, r\}$ or $\{s, h, \alpha_{weight}\}$." and replace with --$\{s, m, \lambda_1, \lambda_2, t, r\}$ or $\{s, h, \alpha_{weight}\}$.--.

CERTIFICATE OF CORRECTION (continued)
U.S. Pat. No. 10,929,762 B1

Column 36, Line 60:
Delete the phrase "$\{s^o, m^o, \lambda_1^o, \lambda_2^o, t^o, r^o\}$," and replace with --$\{s^o, m^o, \lambda_1^o, \lambda_2^o, t^o, r^o\}$--.

Column 36, Line 65:
Delete the phrase "$\{s^o, m^o, \lambda_1^o, \lambda_2^o, t^o, r^o\}$," and replace with --$\{s^o, m^o, \lambda_1^o, \lambda_2^o, t^o, r^o\}$--.

Column 37, Line 8:
Delete the phrase "$\{s^o, m^o, \lambda_1^o, \lambda_2^o, t^o, r^o\}$" and replace with --$\{s^o, m^o, \lambda_1^o, \lambda_2^o, t^o, r^o\}$--.

Column 37, Lines 15-16:
Delete the phrase "$\{s^o, m^o, \lambda_1^o, \lambda_2^o, t^o, r^o\}$" and replace with --$\{s^o, m^o, \lambda_1^o, \lambda_2^o, t^o, r^o\}$--.

Column 37, Line 46:
Delete the phrase "$\alpha_{weight}^o$ is e weight value" and replace with --$\alpha_{weight}^o$ is the weight value--.

Column 38, Line 3:
Delete the phrase "$[s^o, k^o, h^o, a_{weight}^o]$." and replace with --$[s^o, k^o, h^o, \alpha_{weight}^o]$.--.

Column 38, Lines 5-6:
Delete the phrase "$[s^o, k^o, h^o, \alpha_{weight}^o]$ and $[s_p^o, k_p^o, h_p^o, \alpha_{weight,p}^o]$, where $[s_p^o, k_p^o, h_p^o, \alpha_{weight,p}^o]$" and replace with --$[s^o, k^o, h^o, \alpha_{weight}^o]$ and $[s_p^o, k_p^o, h_p^o, \alpha_{weight,p}^o]$, where $[s_p^o, k_p^o, h_p^o, \alpha_{weight,p}^o]$--.

Column 38, Line 17:
Delete the phrase "$[s_p^o, h_p^o, k_p^o, \alpha_{weight,p}^o]$" and replace with --$[s_p^o, h_p^o, k_p^o, \alpha_{weight,p}^o]$--.

Column 38, Lines 19-20:
Delete the phrase "$[s_p^o, k_p^o, h_p^o, \alpha_{weight,p}^o]$ is replaced with "$[s^o, k^o, h^o, \alpha_{weight}^o]$" and replace with --$[s_p^o, k_p^o, h_p^o, \alpha_{weight,p}^o]$ is replaced with $[s^o, k^o, h^o, \alpha_{weight}^o]$,--.

Column 38, Line 38:
Delete the phrase "$[s^o, k^o, h^o, \alpha_{weight}^o]$" and replace with --$[s^o, k^o, h^o, \alpha_{weight}^o]$--.

Column 40, Lines 39-40:
Delete the phrase "$S_w = \sum_{i=1}^{n_l}(x_i - \mu_{y_i})(x_i - \mu_{y_i})^\tau$," and replace with --$S_w = \sum_{i=1}^{n_l}(x_i - \mu_{y_i})(x_i - \mu_{y_i})^\mathrm{T}$,--.

Column 40, Line 49:
Delete the phrase "$S_b = \sum_{k=1}^{c} n_k(\mu_k - \mu)(\mu_k - \mu)^T$," and replace with --$S_b = \sum_{k=1}^{c} n_k(\mu_k - \mu)(\mu_k - \mu)^\mathrm{T}$,--.

CERTIFICATE OF CORRECTION (continued)
U.S. Pat. No. 10,929,762 B1

Column 41, Line 67:
Delete the phrase "$C = \sum_{i=1}^{M} C_{sw,i}$" and replace with --$C = \sum_{i=1}^{M} C_{sw,i}$--.

Column 43, Line 12:
Delete the phrase "$D_{jj} = \sum_{i=1}^{n} z_{ij}, j = 1, 2, \ldots, t$" and replace with --$D_{jj} = \sum_{i=1}^{n} z_{ij}, j = 1, 2, \ldots, t$--.

Column 43, Line 15:
Delete the phrase "$W = \hat{Z}\hat{Z}^{\tau}$." and replace with --$W = \hat{Z}\hat{Z}^{T}$.--.

Column 43, Lines 17-18:
Delete the phrase "$\hat{Z}^{\tau}\hat{Z}$ to obtain $V$ based on $\hat{Z}^{\tau}\hat{Z} = V\Sigma V^{\tau}$." and replace with --$\hat{Z}^{T}\hat{Z}$ to obtain $V$ based on $\hat{Z}^{T}\hat{Z} = V\Sigma V^{T}$.--.

Column 43, Lines 34-35:
Delete the phrase "a difference value $\lambda_k$ is computed for coefficient $\alpha_k$" and replace with --a difference value $\Delta_k$ is computed for coefficient $a_k$--.

Column 43, Line 43:
Delete the phrase "$\alpha_k$" and replace with --$a_k$--.

Column 43, Lines 51-52:
Delete the phrase "$c_t = c_t + \alpha_k - \alpha_k$, where $\alpha'_k$ is a value of $\alpha_k$" and replace with --$c_t = c_t + a_k - a'_k$, where $a'_k$ is a value of $a_k$--.

Column 43, Line 54:
Delete the phrase "the current $\alpha_k$ and the previous $\alpha_k$" and replace with --the current $a_k$ and the previous $a_k$--.

Column 45, Line 5:
Delete the phrase "$W_{ii} = 0$ if i = i = j, i = 1," and replace with --$W_{ii} = 0$ if $i = j$, $i = 1$,--.

Column 45, Line 24:
Delete the phrase "$D_{ii} = \sum_{j=1}^{n} W_{ij}$" and replace with --$D_{ii} = \sum_{j=1}^{n} W_{ij}$--.

In the Claims

Claim 11, Column 52, Line 23:
Delete the phrase "$S_w = \sum_{i=1}^{n_l}(x_i - \mu_{y_i})(x_i - \mu_{y_i})^{\tau}$," and replace with --$S_w = \sum_{i=1}^{n_l}(x_i - \mu_{y_i})(x_i - \mu_{y_i})^{T}$,--.

CERTIFICATE OF CORRECTION (continued)
U.S. Pat. No. 10,929,762 B1

Claim 12, Column 52, Line 33:
Delete the phrase "$S_b = \sum_{k=1}^{c} n_k(\mu_k - \mu)(\mu_k - \mu)^\tau,$" and replace with --$S_b = \sum_{k=1}^{C} n_k(\mu_k - \mu)(\mu_k - \mu)^T,$--.

Claim 12, Column 52, Line 44:
Delete the phrase "and τ indicates a transpose." and replace with --and T indicates a transpose.--.

Claim 13, Column 52, Lines 54-55:
Delete the phrase "and τ indicates a transpose." and replace with --and T indicates a transpose.--.

Claim 14, Column 52, Line 60:
Delete the phrase "and a is a predefined weight value." and replace with --and $\alpha$ is a predefined weight value.--.

Claim 17, Column 53, Line 30:
Delete the phrase "$\nabla a_i = C_{3,i} + L_2$, where $\nabla a_i$ is the gradient value for $a_i$, $a_i$ is" and replace with --$\nabla a_i = C_{3,i} + L_2$, where $\nabla a_i$ is the gradient value for $a_i$, $a_i$ is--.

Claim 17, Column 53, Line 32:
Delete the phrase "$C_3 = V_m{}^\tau(V_m\alpha - Y)$" and replace with --$C_3 = V_m^T(V_m a - Y)$--.

Claim 20, Column 53, Line 64:
Delete the phrase "where $\alpha_k$ is a $k^{th}$ coefficient" and replace with --where $a_k$ is a $k^{th}$ coefficient--.

Claim 21, Column 54, Line 12:
Delete the phrase "$\nabla a_k(C_1(\alpha_k))$" and replace with --$\nabla a_k(C_1(a_k))$--.